(12) United States Patent
Nishikawa

(10) Patent No.: US 8,107,163 B2
(45) Date of Patent: Jan. 31, 2012

(54) PROJECTION OPTICAL SYSTEM AND PROJECTION IMAGE DISPLAY APPARATUS

(75) Inventor: Jun Nishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 11/868,783

(22) Filed: Oct. 8, 2007

(65) Prior Publication Data

US 2008/0158439 A1     Jul. 3, 2008

(30) Foreign Application Priority Data

Nov. 6, 2006    (JP) ............................... P2006-299808

(51) Int. Cl.
*G02B 17/08* (2006.01)
(52) U.S. Cl. ....................................... 359/364; 359/791
(58) Field of Classification Search ................... 359/362, 359/364, 780, 784, 791
See application file for complete search history.

(56) References Cited

U.S. PATENT DOCUMENTS

| | | | |
|---|---|---|---|
| 6,513,935 B2 | 2/2003 | Ogawa | |
| 6,626,541 B2 | 9/2003 | Sunaga | |
| 6,771,427 B1 | 8/2004 | Matsuo | |
| 6,879,444 B2 | 4/2005 | Matsuo | |
| 6,947,221 B2 | 9/2005 | Matsuo | |
| 6,950,240 B2 | 9/2005 | Matsuo | |
| 7,048,388 B2 | 5/2006 | Takaura et al. | |
| 7,123,420 B2 | 10/2006 | Matsuo | |
| 2004/0246598 A1* | 12/2004 | Amanai | 359/784 |
| 2007/0184368 A1* | 8/2007 | Nishikawa et al. | 430/30 |

FOREIGN PATENT DOCUMENTS

| | | |
|---|---|---|
| EP | 1 806 612 A1 | 7/2007 |
| JP | 5-80418 | 4/1993 |
| JP | 5-100312 | 4/1993 |
| JP | 2001-255462 | 9/2001 |
| JP | 2002-40326 | 2/2002 |
| JP | 2004-258620 | 9/2004 |
| JP | 2006-235516 | 9/2006 |
| JP | 2008-96983 | 4/2008 |
| JP | 2008-96984 | 4/2008 |
| WO | WO 01/06295 | 1/2001 |
| WO | WO 2005/111688 A1 | 11/2005 |
| WO | WO 2006/043666 A1 | 4/2006 |
| WO | WO 2006/058884 A1 | 6/2006 |

* cited by examiner

*Primary Examiner* — Derek S Chapel
(74) *Attorney, Agent, or Firm* — Oblon, Spivak, McClelland, Maier & Neustadt, L.L.P.

(57) ABSTRACT

A projection optical system for magnifying an image on a primary imaging plane onto a secondary imaging plane includes a first optical system for forming an intermediate image and a second optical system including a concave reflecting surface disposed between the intermediate image and the secondary plane. The first optical system includes first and second groups respectively having negative and positive power, an aperture, and a third group having positive power from the intermediate image. The surfaces of the first and second optical systems have rotational symmetry about a light axis. A ray traveling from the center of the primary plane to the center of the secondary plane intersects the light axis, is reflected off the reflecting surface, intersects the light axis again, and reaches the secondary plane. The following conditions are satisfied: $0.5 < \phi1/\phi2 < 3$, $1 < AST/ASS < 5$, $|AST|/L12 < 1$, and $-3 < K\_rel$.

7 Claims, 42 Drawing Sheets

250.00 MM

PROJECTION OPTICAL SYSTEM AND PROJECTION IMAGE DISPLAY APPARATUS

CROSS REFERENCES TO RELATED APPLICATIONS

The present invention contains subject matter related to Japanese Patent Application JP 2006-299808 filed in the Japanese Patent Office on Nov. 6, 2006, the entire contents of which are incorporated herein by reference.

BACKGROUND OF THE INVENTION

1. Field of the Invention

The present invention relates to a projection optical system and a projection image display apparatus and, in particular, to technology for reducing the depths of the projection optical system and the projection image display apparatus and reducing the heights of the upper and lower portions above and below a screen while maintaining a high resolution and low distortion of an image.

2. Description of the Related Art

Recently, the need for projection television systems has been rapidly increasing. Projection television systems have features common to flat televisions, such as liquid crystal displays (LCDs) and plasma display panels (PDPs). As compared with LCDs and PDPs, projection television systems can provide a large screen at low cost because projection television systems project an image displayed on an image display element having a size of about one inch while enlarging the image. In addition, such an image display element can relatively easily support a high resolution of a full high definition (HD) signal, such as a broadcast satellite (BS) broadcasting signal or a terrestrial digital broadcasting signal.

However, projection television systems include a light source, an illumination optical system, and a projection optical system. Projection television systems further include a large rear-mounted mirror for projecting an image onto a screen. Accordingly, as shown in FIG. 38, when projection television systems project an image using a known method in which a light axis "a" passes through the center of an image display element b and the center of a screen "c", a depth "d" and a size "e" of a portion below a screen cannot be reduced at the same time.

In order to achieve a thin size of projection television systems (reduction in size in the depth direction), some optical systems obliquely project an image onto a screen (hereinafter referred to as "oblique projection").

For example, Japanese Unexamined Patent Application Publication No. 5-100312 (hereinafter referred to as "Patent Document 1") describes a projection system that includes a projection optical system having a very wide-angle lens, an image display element, and a screen. The image display element and the screen are disposed so as to be offset from the light axis of the projection optical system. By using the edge portion of the angle of view of the wide-angle lens, oblique projection is achieved (refer to FIG. 39).

In addition, Japanese Unexamined Patent Application Publication No. 5-80418 (hereinafter referred to as "Patent Document 2") describes a projection system including first and second projection optical systems. The first projection optical system forms an intermediate image from imaging light based on a light valve. The second projection optical system projects the intermediate image onto a screen while enlarging the intermediate image. The light axes of the two projection optical systems are appropriately inclined so that oblique projection is achieved (refer to FIG. 40).

Furthermore, recently, a projection optical system has been developed that achieves oblique projection by employing a reflecting surface in order to prevent the occurrence of chromatic aberration due to a wide angle of view.

PCT Japanese Translation Patent Re-Publication No. WO01/006295 (hereinafter referred to as "Patent Document 3") describes a projection optical system that achieves oblique projection by employing an optical system mainly composed of a refractive optical system g and a convex reflecting surface f. FIG. 41 schematically illustrates the optical system described in Patent Document 3.

In addition, Japanese Unexamined Patent Application Publication No. 2002-40326 (hereinafter referred to as "Patent Document 4") describes a projection optical system that removes chromatic aberration by employing a concave reflecting surface i, a convex reflecting surface j, a convex reflecting surface k, and a convex reflecting surface 1 disposed in this order from an image display panel h (refer to FIG. 42).

The optical systems described in the patent documents above have rotational symmetry with respect to the light axis. By employing part of an ultra-wide-angle optical system, the optical systems achieve oblique projection.

Japanese Unexamined Patent Application Publication No. 2001-255462 (hereinafter referred to as "Patent Document 5") describes an oblique projection optical system including an off-axial optical system. In this optical system, the off-axial optical system corrects trapezium distortion. Furthermore, by forming an intermediate image between each of a plurality of reflecting surfaces m and a reflecting surface n, a projection optical system having reduced sizes of the reflecting surfaces can be achieved (refer to FIG. 43).

Japanese Unexamined Patent Application Publication No. 2004-258620 (hereinafter referred to as "Patent Document 6") describes a projection optical system including a refractive optical system and at least one refracting surface including a concave reflecting surface. In the embodiment, part of a first optical system serving as a refractive optical system is made eccentric, and an adjustable surface is employed for a concave reflecting surface. In this way, a projection optical system with low distortion can be achieved (refer to FIG. 44).

International publication WO2006-043666A1 (hereinafter referred to as "Patent Document 7") describes an ultra-wide-angle optical system that has rotational symmetry and that reduces the size of a reflecting surface by forming an intermediate image using at least one concave reflecting surface AM (refer to FIG. 45).

SUMMARY OF THE INVENTION

However, these existing projection optical systems have the following drawbacks. That is, like the optical system described in Patent Document 3, if the projection optical system includes a combination of a convex reflecting surface f and a refractive optical system g, chromatic aberration can be easily removed and a wide angle of view can be easily provided as compared with projection optical systems including only a refractive optical system. However, only one reflecting surface should be responsible for a diverging effect being produced. Accordingly, in order to make appropriate corrections for distortion and aberration of an imaging surface, the refractive power needs to be reduced to some level. Therefore, to obtain a wide angle of view, the size of the convex reflecting surface f tends to increase. This increases the difficulty of manufacturing the convex reflecting surface f. In addition, the height of a lower portion below the screen (see "e" in FIG. 38) is increased. When a rear-projection television system includes this projection optical system, the depth of the rear-projection television system (see "d" in FIG. 38) is increased.

The projection optical system described in Patent Document 4 has no refractive optical system. Accordingly, in principal, chromatic aberration does not occur. In addition, absorption of light by a lens does not occur. Therefore, a bright optical system can be achieved. However, since the projection optical system includes only reflecting surfaces, the optical performance is sensitive to the surface precision and assembly precision of each of the reflecting surfaces, thereby increasing the manufacturing cost. In addition, since a plurality of reflecting surfaces i to l are disposed in a vertical direction, the height of a portion below a screen increases. Furthermore, if the projection angle is increased in order to decrease the depth of the projection optical system, the reflecting surfaces and, in particular, the reflecting surface i in the last stage increase in size. Thus, this increases the difficulty of manufacturing the reflecting surfaces, and the height of the portion below the screen further increases.

The projection optical system described in Patent Document 5 has an advantage in that a small reflecting surface provides a wide angle of view. However, since the reflecting surface is made eccentric, the eccentric aberration needs to be corrected by other eccentric reflecting surfaces. Therefore, at least three reflecting surfaces are required. Accordingly, if a rear-projection television system includes this projection optical system, it is still difficult to obtain sufficiently small height of a portion below a screen. In addition, the reflecting surfaces that are adjustable surfaces do not have rotational symmetry. Since the optical performance is very sensitive to the surface precision and assembly precision of the reflecting surfaces, it is difficult to manufacture such reflecting surfaces. Thus, the manufacturing cost is increased.

The projection optical system described in Patent Document 6 includes one or two reflecting surfaces including a concave reflecting surface serving as a second optical system. An intermediate image is formed between the second optical system and a first optical system. By making part of the first optical system and part of the second optical system eccentric with respect to each other, the projection optical system providing a wide angle of view and no distortion is achieved. However, since a refractive optical system, in particular, is made eccentric, it is difficult to assemble and adjust such a projection optical system. Thus, the manufacturing cost is increased. Accordingly, this projection optical system is not suitable for mass-production optical systems, such as rear-projection television systems.

The projection optical system described in Patent Document 7 includes an optical system having rotational symmetry and an intermediate imaging plane. By combining at least one concave reflecting surface and a refractive optical system, a simplified optical system providing an ultra-wide angle of view and appropriately reducing a variety of aberrations is achieved. In particular, according to the first and second embodiments, the ultra-wide angle of view is realized by using only one concave reflecting surface. However, since a positive lens having a high negative temperature coefficient and two plastic aspherical lenses are employed, consideration of an environmental change, such as a temperature change, is not sufficient. Thus, allowance in manufacturing is not sufficient. In addition, by changing the distance between the second optical system and a screen, the image display size is changed. In this case, a light ray incident on the reflecting surface or each of refractive surfaces of the refractive optical system is slightly shifted. In ultra-wide angle optical systems, such a slight shift significantly decreases optical performance. Therefore, according to the projection optical system described in Patent Document 7, only one image display size is provided, in practice.

Accordingly, the present invention provides a simplified and low-cost projection optical system and a projection image display apparatus that include an optical system having rotational symmetry, a reflecting surface of a reduced size, and only one concave reflecting surface while maintaining low distortion and high resolution. In addition, the projection optical system and the projection image display apparatus have stable optical performance so that the optical performance does not deteriorate even when a temperature is changed and even when the projection image size is changed.

According to an embodiment of the present invention, a projection optical system magnifies an image on a primary imaging plane on a reduction side onto a secondary imaging plane on a magnification side. The projection optical system includes a first optical system configured to form an intermediate image of the primary imaging plane, where the first optical system includes a first group having a negative refractive power, a second group having a positive refractive power, an aperture, and a third group having a positive refractive power in this order from the intermediate image adjacent to the aperture, and a second optical system including a concave reflecting surface disposed between the intermediate image and the secondary imaging plane. Each of surfaces of the first optical system and the second optical system has rotational symmetry with respect to a light axis that is common to all of the surfaces, a light ray traveling from the center of the primary imaging plane to the center of the secondary imaging plane intersects the light axis, is reflected off the concave reflecting surface, intersects the light axis again, and reaches the secondary imaging plane, and the following conditional expressions are satisfied:

$$0.5 < \phi1/\phi2 < 3 \quad (1)$$

$$1 < AST/ASS < 5 \quad (2)$$

$$|AST|/L12 < 1 \quad (3)$$

where
 $\phi1$=refractive power of the first optical system,
 $\phi2$=refractive power of the second optical system,
 $|AST|$=position at which the intermediate image is formed in the tangential plane by the first optical system,
 $|ASS|$=position at which the intermediate image is formed in the sagittal plane by the first optical system, and
 $L12$=distance between the first optical system and the second optical system on the light axis. All of lenses included in the first optical system and having a positive refractive power satisfy the following conditional expression:

$$-3 < K\_rel \quad (4)$$

where
 $K\_rel$=temperature coefficient of the index of refraction.
 At least one positive lens included in the third group can satisfy the following conditional expression:

$$0.7 < \Delta P \quad (5)$$

and at least one negative lens included in the third group can satisfy the following conditional expression:

$$\Delta P < -0.3 \quad (6)$$

where
 $\Delta P = \{v-(-0.001917 \times P+0.6568)\} \times 100$,
 $v=(nd-1)/(nF-nC)$,
 $P=(ng-nF)/(nF-nC)$, ng=the index of refraction of the g-line having a wavelength of 435.83 nm, nF=the index of refraction of the F-line having a wavelength of 486.13 nm, nd=the index of refraction of the d-line having a wavelength of 587.56 nm, and nC=the index of refraction of the C-line having a wavelength of 656.27 nm. In this way, excellent optical performance can be obtained.

The first optical system can include at least one pair of cemented lenses and satisfies the following conditional expression:

$$|\Delta\alpha|<45 \qquad (7)$$

where $|\Delta\alpha|$=a difference in coefficient of linear expansion between adjacent glass pieces having a contact surface therebetween. In this way, excellent optical performance can be obtained.

An aspherical plastic lens can be disposed in any one of the first group to the third group of the first optical system and the following conditional expressions can be satisfied:

$$-0.3<\phi\_p1/\phi1<0.05 \qquad (8)$$

$$-35<\beta<35 \qquad (9)$$

where $\phi\_p1$=the refraction power of the aspherical plastic lens, $\phi1$=the refraction power of the first optical system, and $\beta$=a maximum angle of tangent of the curved surface of the aspherical plastic lens.

When a projection screen size is changed, a distance between the second optical system and the secondary imaging plane can be changed, and at least one of the groups of the first optical system or some of the lenses of the groups and the concave reflecting surface of the second optical system can be moved along the light axis parallel to the light axis. In this way, a variety of projection screen sizes can be supported.

According to another embodiment of the present invention, a projection image display apparatus includes a light source, modulating means for modulating light emitted from the light source on the basis of a video signal and outputting the modulated light, and a projection optical system for magnifying an image on a primary imaging plane on a side of the modulating means onto a secondary imaging plane on a side of a screen. The projection optical system is one of the above-described projection optical systems.

As described above, according to the embodiment of the present invention, a light ray traveling from the center of the primary imaging plane to the center of the secondary imaging plane intersects the light axis of the first optical system. Subsequently, the light ray is reflected off the concave reflecting surface, intersects the light axis again, and reaches the secondary imaging plane. By using such a light path, for example, a light ray that travels from the first optical system disposed in a substantially horizontal direction and that focuses on a secondary imaging plane is output to the upward (or downward) direction by the second optical system. The second optical system can focus a light ray output from a point of an intermediate image formed by the first optical system at a relatively small divergent angle on a point in the secondary imaging plane. As a result, a projection image display apparatus can be achieved by using a compact optical unit.

As noted above, according to the present invention, a light ray traveling from the center of the primary imaging plane to the secondary imaging plane intersects a light axis common to the first and second optical systems, is reflected off the concave reflecting plane, and intersects the light axis again. Thus, the first optical system temporarily forms an intermediate imaging plane. By disposing the concave reflecting surface in the back of the intermediate imaging plane,

DESCRIPTION OF THE PREFERRED EMBODIMENTS

Figure 1:
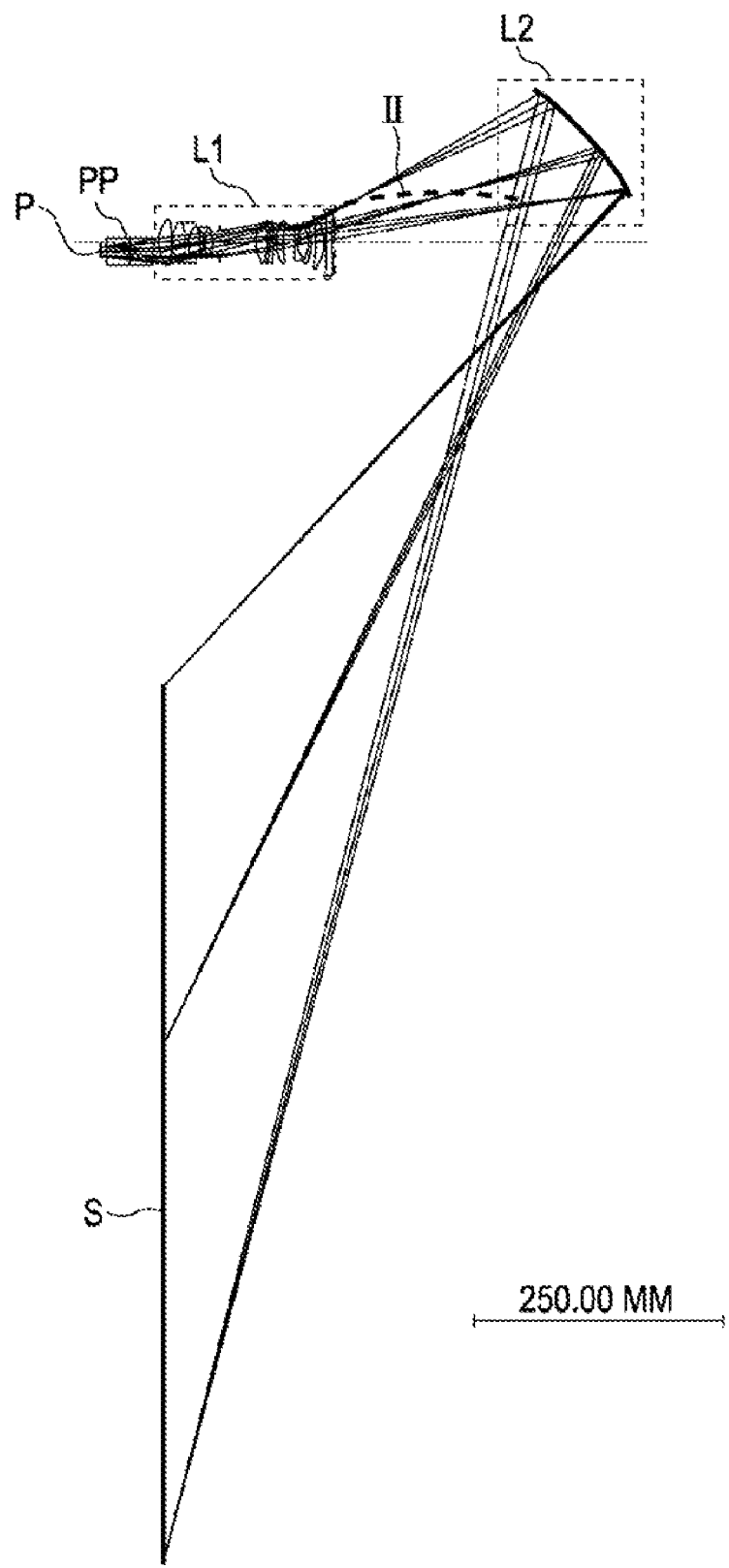
FIG. 1 illustrates a light path according to a first embodiment.

Exemplary embodiments of a projection optical system and a projection image display apparatus according to the present invention are described below with reference to the accompanying drawings.

According to the present embodiment, a projection optical system enlarges and projects an image on a primary imaging plane on a reduction side onto a secondary imaging plane on an enlargement side. The projection optical system includes a first optical system for forming an intermediate image of the primary imaging plane and a second optical system for forming the secondary imaging plane from the intermediate image. A light ray traveling from the center of the primary imaging plane to the center of the secondary imaging plane intersects the light axis and is reflected off the concave reflecting surface. The reflected light ray intersects the light axis again and reaches the secondary imaging plane. In summary of the image forming relationship, an intermediate image of the primary imaging plane is formed by the first optical system. Thereafter, the light ray is changed to diverging light rays by the concave reflecting surface to form a pupil. Subsequently, the light rays form an image on the secondary imaging plane. The intermediate image formed by the first optical system has a low magnification ratio and is magnified by the second optical system with a predetermined magnification ratio so as to be formed as a secondary imaging plane.

In addition, when the projection image size is changed, a distance between the second optical system and the secondary image plane is changed. At the same time, at least one group or some lenses of the first optical system and the concave reflecting surface of the second optical system are moved on the optical axis parallel to the axis direction by an appropriate distance. In this way, a projection optical system having a well-corrected optical performance can be provided.

Furthermore, to obtain an excellent optical performance, the intermediate image formed by the first optical system is disposed between the first optical system and the second optical system, and satisfies the following conditional expressions:

$$0.5 < \phi 1/\phi 2 < 3 \qquad (1)$$

$$1 < AST/ASS < 5 \qquad (2)$$

$$|AST|/L12 < 1 \qquad (3)$$

where $\phi 1$=refractive power of the first optical system
$\phi 2$=refractive power of the second optical system
|AST|=position at which the intermediate image is formed in the tangential plane by the first optical system
|ASS|=position at which the intermediate image is formed in the sagittal plane by the first optical system
L12=distance between the first optical system and the second optical system on the light axis.

Conditional expression (1) defines a ratio of the refractive power of the first optical system to the refractive power of the second optical system. If the ratio is less than or equal to the lower limit, the radius of curvature of the concave reflecting surface is significantly increased. Therefore, it is difficult to correct aberration using the first optical system. In contrast, if the ratio is greater than or equal to the upper limit, the refractive power of the first optical system is increased. Thus, it is difficult to correct aberration using the concave reflecting surface.

Figure 46:
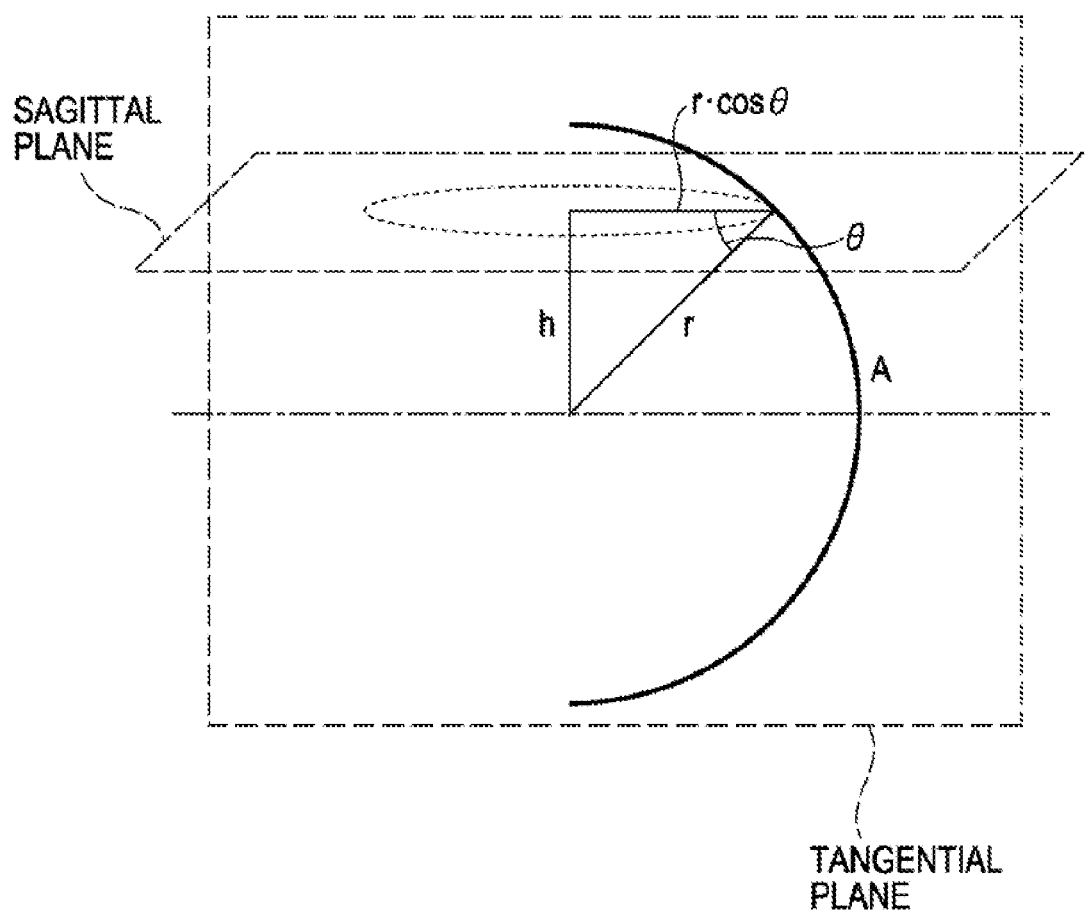
FIG. 46 is a schematic illustration of a tangential plane and a sagittal plane.

Conditional expression (2) defines a ratio of the position at which the intermediate image is formed in the tangential plane (a cross section including a chief light ray and the light axis) to the position at which the intermediate image is formed in the sagittal plane (a plane perpendicular to the tangential plane). As shown in FIG. 46, let A denote the concave reflecting surface of the second optical system and r denote the radius of curvature. Then, in a cross section of the concave reflecting surface in the tangential plane, the radius of curvature is equal to r regardless of h. In contrast, in the sagittal plane, the radius of curvature is r·cos θ. Thus, rays incident on the sagittal plane have different refractive powers in accordance with h.

In order that the rays incident on the above-described cross sections are focused on the same position in the secondary imaging plane, the image positions of the intermediate image in the cross sections need to be different. In addition, in the case of θ>0, since a ray incident on the sagittal plane is incident on a surface having a radius of curvature smaller than that of a surface on which a ray incident on the tangential plane is incident, the ray needs to be closer to the second optical system than the image position in the tangential plane.

Accordingly, conditional expression (2) defines an appropriate range of the above-described image positions. If the ratio is lower than or equal to the lower limit, the image position in the sagittal plane is located closer to the first optical system than the image position in the tangential plane. Accordingly, it is difficult to focus the two positions of the imaging planes on the same location in the secondary imaging plane. If the ratio is higher than or equal to the upper limit, the image position in the tangential plane and the sagittal plane are separated. Accordingly, it is also difficult that the two positions of the imaging planes are focused on the same location in the secondary imaging plane at the same time.

Conditional expression (3) defines a ratio of an image position in the tangential plane to the distance between the first optical system and the second optical system on the light axis. Like the projection optical system described in Patent Document 3, if the optical system diverges a light ray using a convex reflecting surface, the optical system has no intermediate image. The optical system has a large curvature of field nearly equal to an actual projection distance.

In this embodiment, an intermediate image is generated in a time period between the time when the light ray is output from the first optical system and the time when the light ray reaches the second optical system. Accordingly, the curvature of field of the first optical system is less than the distance between the first optical system and the second optical system on the light axis.

By minimizing the curvature field caused by the first optical system, an excellent optical performance can be obtained when the curvature of field of the first optical system is projected onto the planar secondary imaging plane by the reflecting surface of the second optical system.

Accordingly, as indicated by conditional expression (3), by decreasing the curvature of field of the first optical system to less than the distance between the first optical system and the second optical system on the light axis, an excellent optical performance better than that of the projection optical system described in Patent Document 3 can be obtained even at about a half angle of view of 80 degrees.

In addition, in the projection optical system according to the present embodiment, all of lenses having a positive refractive power in the first optical system satisfy the following conditional expression:

$$-3 < K\_rel. \quad (4)$$

Furthermore, at least one positive lens of the third group satisfies:

$$0.7 < \Delta P. \quad (5)$$

Still furthermore, at least one negative lens of the third group satisfies:

$$\Delta P < -0.3. \quad (6)$$

In this way, a further well-corrected optical performance of the projection optical system can be provided.

Here,

K_rel=the temperature coefficient of the index of refraction $\Delta P = \{v - (-0.001917 \times P + 0.6568)\} \times 100$ $v = (nd-1)/(nF-nC)$ $P = (ng-nF)/(nF-nC)$ ng=the index of refraction of the g-line (wavelength: 435.83 nm)

nF=the index of refraction of the F-line (wavelength: 486.13 nm)

nd=the index of refraction of the d-line (wavelength: 587.56 nm)

nC=the index of refraction of the C-line (wavelength: 656.27 nm).

In addition, the first optical system includes at least one pair of cemented lenses and satisfies the following conditional expression:

$$|\Delta\alpha| < 45 \quad (7)$$

where $|\Delta\alpha|$ denotes a difference in coefficient of linear expansion between adjacent glass pieces having a contact surface therebetween.

In this way, a further well-corrected optical performance of the projection optical system can be provided.

Table 23 shows the indices of refraction of lenses used in the embodiments, the names of glass having values close to the dispersion available from HOYA corporation and OHARA corporation, a temperature coefficient K_rel, the level of extraordinary dispersion $\Delta P$, and a coefficient of linear expansion $\alpha$.

The temperature coefficient K_rel is expressed as dn/dT, where n denotes the index of refraction, and T denotes the temperature. The units are $10^{-6}$/K. Here, the temperature coefficient in the case where the index of refraction of air has a temperature dependency is used in the temperature range of from +20° C. to +40° C.

$\Delta P$ indicates an offset from a normal grass. As used herein, the term "normal glass" refers to EC3 and EF2 available from HOYA corporation. Let Pnormal denote the relative partial dispersion of the normal glass, and v denote the dispersion. A line between the two is expressed as follows:

Pnormal=−0.001917×v+0.6568.

The coefficient of linear expansion $\alpha$ is derived from an average coefficient of linear expansion in the ordinary temperature range. The units are $10^{-7}$/° C.

By conditional expression (4), the above-described coefficient of linear expansion is limited. In general, a glass material has a positive temperature coefficient. That is, as the temperature increases, the index of refraction increases. However, glass including fluorine (e.g., FC or FCD commercially available from HOYA corporation, or SFSL or SFPL commercially available from OHARA corporation) has a negative temperature coefficient.

If the index of refraction changes with a change in temperature, the focusing position of the projection optical apparatus moves. Accordingly, this is one of problems to be solved for optical systems that cannot easily change the focus and, in particular, for rear-projection television systems. If the glass material has a positive temperature coefficient, the focal length of a positive lens decreases, and the focal length of a negative lens increases. In contrast, if the glass material has a negative temperature coefficient, the focal length of a positive lens increases, and the focal length of a negative lens decreases.

For example, in some methods, the focusing point is automatically corrected by providing a simplified detection unit including, for example, a CCD on a screen and operating the detection unit together with a temperature sensor. However, these methods are not practical for mass-production rear-projection television systems in terms of cost and actual adjustment of the position of the sensor. Therefore, the projection optical system needs to have a structure in which a change in a focusing position is small.

Conditional expressions (4), (5), and (6) are applied to improve the optical performance, such as chromatic aberration of magnification, while reducing a change in a focusing position due to a change in temperature. If the value is less than or equal to the lower limit of conditional expression (4), a negative lens that generally includes glass material having a positive temperature coefficient exhibits a focus change characteristic the same as that of a positive lens having a negative temperature coefficient. As a result, the focus change is increased. By satisfying conditional expression (4), the focus change can be decreased or the positive lens can have a positive temperature coefficient. Thus, the focus change caused by a negative lens can be canceled out.

Conditional expression (5) defines the level of extraordinary dispersion. If the value is less than or equal to the lower limit, the chromatic aberration of magnification cannot be satisfactorily corrected. Conditional expression (6) defines the relative partial dispersion of a negative lens. If the value is greater than or equal to the upper limit, the chromatic aberration of magnification cannot be satisfactorily corrected.

In addition, the first optical system includes at least one pair of cemented lenses and satisfies the following conditional expression:

$$|\Delta\alpha|<45 \quad (7)$$

where $|\Delta\alpha|$ denotes a difference in coefficient of linear expansion between adjacent glass pieces having a contact surface therebetween.

In this way, a projection optical system having a well-corrected optical performance can be provided.

The reason why more than two lenses are cemented is mainly because an assembly operation is facilitated, the chromatic aberration of magnification is corrected, and surface reflection is prevented. In general, the lenses are cemented together using an adhesive agent having the index of refraction of about 1.5 to about 1.6. Conditional expression (7) defines a difference between the coefficients of linear expansion determined by the materials of the lenses.

In the case of a cemented lens having a value greater than or equal to the upper limit of conditional expression (7), when the environmental temperature changes, the shape of the curved joint surface slightly changes. Since the index of refraction at the joint surface and the deformation of the joint surface causes an aspherical effect, the focusing performance and the curvature of field deteriorate.

In addition, an aspherical plastic lens is disposed in any one of the first group to the third group of the first optical system and the following conditional expressions are satisfied:

$$-0.3<\phi\_p1/\phi1<0.05 \quad (8)$$

$$-35<\beta<35 \quad (9)$$

where
$\phi\_p1$=the refraction power of the aspherical plastic lens
$\phi1$=the refraction power of the first optical system
$\beta$=a maximum angle of tangent of the curved surface of the aspherical plastic lens.

In this way, a further well-corrected optical performance of the projection optical system can be provided.

Conditional expression (8) defines a ratio of the refraction power of the aspherical plastic lens to the refraction power of the first optical system. In general, unlike a glass lens, a plastic lens has a negative temperature coefficient. That is, if the plastic lens has a high positive refractive power, the plastic lens tends to exhibit the focus change characteristic the same as that of the lens group on the primary imaging plane side from the aperture. Furthermore, the plastic lens has a temperature coefficient nearly one order of magnitude larger than that of a glass lens. Thus, the plastic lens has a significant effect on the focus change.

Accordingly, if the value is greater than or equal to the upper limit of conditional expression (8), the focus change increases, and therefore, the optical performance deteriorates. In addition, if the value is less than or equal to the lower limit of conditional expression (8), the focus change increases, since the plastic lens has a temperature coefficient nearly one order of magnitude larger than that of a glass lens, as described above. Therefore, the optical performance deteriorates.

Conditional expression (9) defines the shape of a curved surface of the aspherical plastic lens. According to the present embodiment, the concave reflecting surface of the second optical system is aspherical as well as the curved surface of the aspherical plastic lens. The aspherical surface is expressed as follows:

$$Z = \frac{ch^2}{1+\{1-(1+K)c^2h^2\}1/2} + Ah^4 + Bh^6 + Ch^8 + ...$$

where
Z=the sag of an aspherical surface
h=the vertical height from the light axis
c=the paraxial radius of curvature
K=the conic constant
Ai=an ith-order aspherical constant.

By differentiating expression (9) with respect to h, the angle of the tangent line of the curved surface at a vertical height of h from any light axis is obtained. That is, the differentiation is expressed as follows:

$$\frac{dZ}{dh} = \frac{2ch}{1+\{1-(1+K)c^2h^2\}1/2} + \quad (2)$$
$$\frac{(1+K)c^3h^3}{\{1-(1+K)c^2h^2\}1/2*[1+[1-(1+K)c^2h^2\}1/2]^2} +$$
$$4Ah^3 + 6Bh^5 + 8Ch^7 + ...$$

Thus, conditional expression (9) can be computed using $\beta=\tan^{-1}(dZ/dh)$.

If the value is greater than or equal to the upper limit of conditional expression (9) or is less than or equal to the lower limit of conditional expression (9), the deformation of the curved surface with respect to a change in temperature increases. Thus, the imaging performance deteriorates. In addition, molding of the lens is difficult. Furthermore, a reflection preventing film for preventing a surface reflection is not easily coated. Thus, the transmittance may deteriorate, and ghosting easily occurs.

According to the present embodiment, since the projection optical system satisfies the above-described conditions, the projection optical system can easily provide an ultra wide angle of view and excellent optical performance using a relatively simplified structure.

Furthermore, a projection image display apparatus including the projection optical system according to the present embodiment can easily provide a reduced depth of the apparatus, reduced dimensions above (or below) the screen, and further provide excellent optical performance, such as high resolution and low distortion, using a relatively simplified structure.

Embodiments and the numerical embodiments of the projection optical system and the projection image display apparatus according to the present invention are described below with reference to the accompanying drawings and tables.

First Embodiment

FIG. 1 illustrates a light path according to a first embodiment. An image display element P serves as a modulating unit. A light ray emitted from a light source (not shown) is modulated by the image display element P on the basis of a video signal. In this way, a primary imaging plane is formed. A reflective or transmissive dot-matrix liquid crystal display panel or a digital micromirror device (DMD) can be used for the image display element P. A reference symbol PP represents a polarizing beam splitter (PBS), a color combining prism that combines video signals of R, G, and B colors, or a total internal reflection (TIR) prism.

Figure 2:
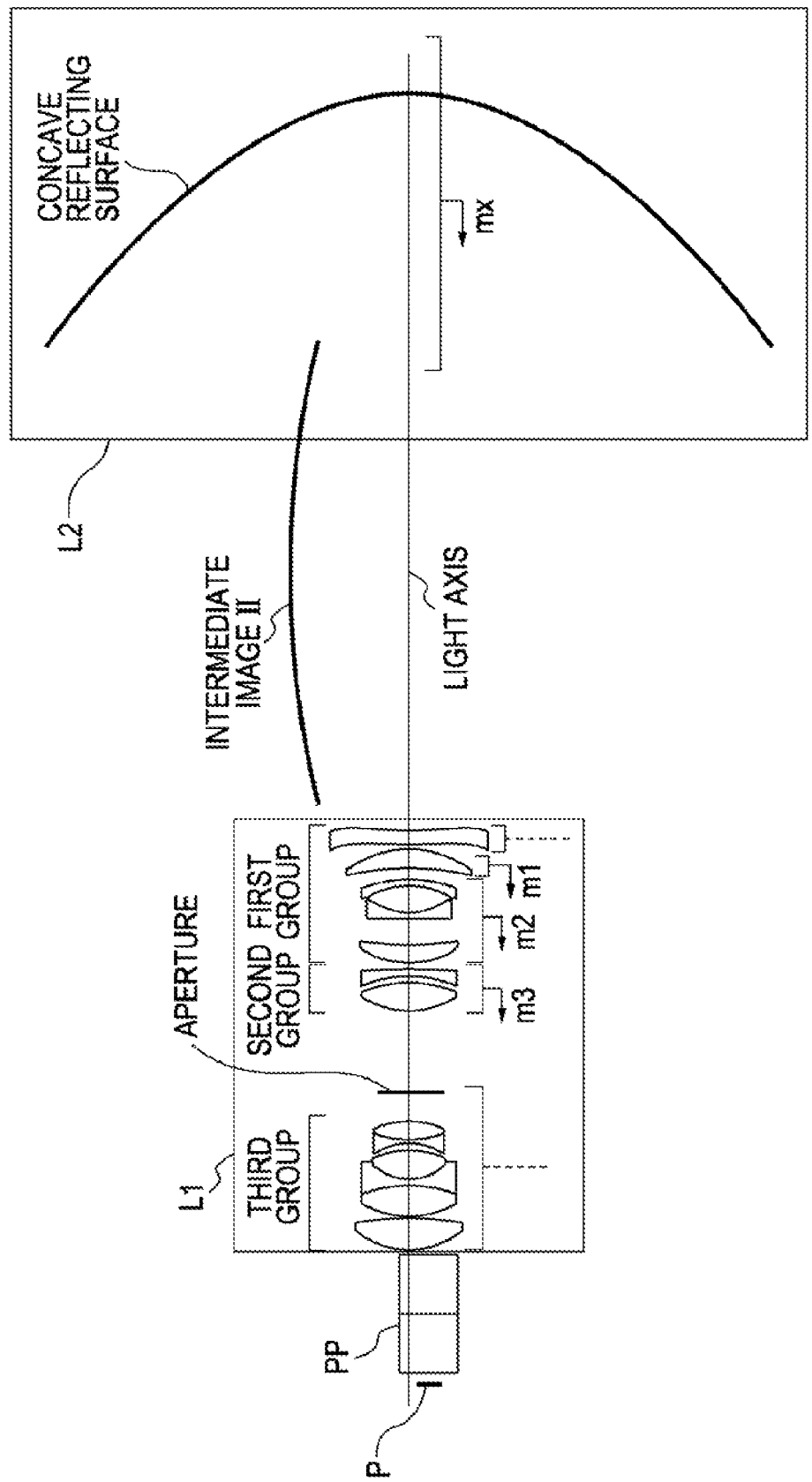
FIG. 2 illustrates a projection optical system portion according to the first embodiment.

FIG. 2 illustrates a projection optical system portion shown in FIG. 1 in detail. A first optical system L1 includes a first group having a negative refractive power, a second group having a positive refractive power, an aperture, and a third group having a positive refractive power in this order from a side of the secondary imaging plane to the side of the image display element P. The lens groups of the first optical system and a concave reflecting surface of a second optical system that move in order to change the projection image size are represented by reference numerals m1, m2, m3, and mx, respectively. The arrows indicate directions in which the groups and the lens are moved when a lens position pos1 is changed to a lens position pos3.

Table 1 shows the numeric aperture of the projection optical system and information about the image display element of the projection optical apparatus according to the first embodiment. The numeric aperture on the image display element side is 0.2334. The display element size is 13.440 mm×7.560 mm. Let a point on the light axis be represented as (x, y)=(0, 0). Then, the center point of the display element is represented as (x, y)=(0, −8.4333). The pixel pitch is 7 μm.

TABLE 1

| | |
|---|---|
| NUMERIC APERTURE ON THE IMAGE DISPLAY ELEMENT SIDE | 0.23340 |
| DISPLAY ELEMENT SIZE | 13.440 × 7.560 |
| CENTER COORDINATES OF DISPLAY ELEMENT | (x, y) = (0.000, −8.4333) |
| PIXEL PITCH | 7 μm |

According to the first embodiment, images having three projection image sizes can be projected. The lens positions are represented by reference symbols pos1, pos2, and pos3 (refer to Table 2). Let $\phi 1$ denote the refractive power of the first optical system, $\phi 2$ denote the refractive power of the second optical system, $\Delta$ denote the distance between the principle point of the first optical system on an intermediate image side and the concave reflecting surface of the second optical system, and $\phi$ denote the combined refractive power. Then, a combined focal length f can be expressed as follows:

$$1/f = \phi = \phi 1 + \phi 2 - \Delta \cdot \phi 1 \cdot \phi 2.$$

In addition, Table 2 shows the magnification factors and the diagonal inch sizes at these lens positions. The diagonal inch size indicates the diagonal screen size in the secondary imaging plane. For the position pos1, the diagonal inch size is 58.112 inch. For the position pos2, the diagonal inch size is 63.395 inch. For the position pos3, the diagonal inch size is 73.961 inch.

TABLE 2

| | pos1 | pos2 | pos3 |
|---|---|---|---|
| Combined Focal Length f | 4.4365 | 4.4131 | 4.3705 |
| Magnification Factor | 95.7203 | 104.4222 | 121.8259 |
| Diagonal Inch Size | 58.112 | 63.395 | 73.961 |

Tables 3 to 5 show lens data when specific values are applied to the projection optical system according to the first embodiment. In Tables 3 to 5, the surface number increases from S1 to S2, to S3, ... from the primary imaging plane side (the display element side) to the secondary imaging plane side (the projection image side). The left entry of the surface number indicates whether it is the surface number of an aperture or an aspherical surface. The data concerning the aspherical surfaces are shown in Table 4. The term "variable" in the "distance" column indicates that when the projection image size is changed, the distance is changed. The distances at the three positions are shown in Table 5. The term "infinity" in the "radius of curvature" column indicates that the surface is planar. The "index of refraction (ne)" column and the "Abbe number (ve)" column show the values for the e-line (546.1 nm).

TABLE 3

| | | RADIUS OF CURVATURE | DISTANCE | ne | ve |
|---|---|---|---|---|---|
| DISPLAY ELEMENT | | INFINITY | 0.000 | | |
| S1 | | INFINITY | VARIABLE | | |
| S2 | | INFINITY | 24.700 | 1.591420 | 61.01 |
| S3 | | INFINITY | 24.200 | 1.518720 | 64.00 |
| S4 | | INFINITY | 2.650 | | |
| S5 | | 35.850 | 13.000 | 1.489140 | 70.24 |
| S6 | | −142.189 | 1.100 | | |
| S7 | | 40.006 | 12.900 | 1.591420 | 61.01 |
| S8 | | −48.336 | 2.500 | 1.811840 | 33.03 |
| S9 | | 21.865 | 12.100 | 1.489140 | 70.24 |
| S10 | | −34.183 | 2.800 | | |
| S11 | | −24.136 | 1.400 | 1.811840 | 33.03 |
| S12 | | 43.927 | 7.700 | 1.855050 | 23.60 |
| S13 | | −37.377 | 12.100 | | |
| S14 | APERTURE | INFINITY | VARIABLE | | |
| S15 | | 39.779 | 11.900 | 1.518720 | 64.00 |
| S16 | | −49.897 | 2.600 | | |
| S17 | | −45.488 | 3.000 | 1.812630 | 25.25 |
| S18 | | −506.901 | VARIABLE | | |
| S19 | | 36.571 | 6.900 | 1.839300 | 37.09 |
| S20 | | 104.145 | 12.000 | | |
| S21 | | −474.476 | 1.700 | 1.776210 | 49.39 |
| S22 | | 24.170 | 11.900 | | |
| S23 | | −27.700 | 2.500 | 1.810810 | 40.49 |
| S24 | | −52.993 | VARIABLE | | |
| S25 | | −88.000 | 8.000 | 1.761670 | 27.31 |
| S26 | | −41.877 | VARIABLE | | |
| S27 | ASPHERICAL | 948.665 | 6.000 | 1.493568 | 57.54 |
| S28 | ASPHERICAL | 288.431 | VARIABLE | | |

TABLE 3-continued

| | | RADIUS OF CURVATURE | DISTANCE | ne | ve |
|---|---|---|---|---|---|
| S29 | ASPHERICAL | −87.659 | VARIABLE | REFLECTING SURFACE | |
| PROJECTION IMAGE SURFACE | | INFINITY | 0.000 | | |

TABLE 4

| S26 | K: −3.000000 | | | |
| | A: 0.286126E−05 | B: −.148860E−07 | C: 0.198153E−10 | D: −.147991E−13 |
| | E: 0.291361E−18 | F: 0.383738E−20 | | |
| S27 | K: −1.695734 | | | |
| | A: 0.349640E−05 | B: −.149968E−07 | C: 0.220552E−10 | D: −.215415E−13 |
| | E: 0.110915E−16 | F: −.227639E−20 | | |
| S28 | K: −2.641170 | | | |
| | A: −.122563E−06 | B: 0.726333E−11 | C: −.383862E−15 | D: 0.134547E−19 |
| | E: −.280669E−24 | F: 0.260947E−29 | | |

TABLE 5

| | pos1 | pos2 | pos3 |
|---|---|---|---|
| S0 | 5.127 | 5.120 | 5.100 |
| S13 | 34.636 | 34.046 | 33.071 |
| S17 | 2.646 | 2.822 | 3.141 |
| S23 | 4.715 | 4.056 | 2.994 |
| S25 | 2.000 | 3.073 | 4.791 |
| S27 | 308.901 | 307.124 | 304.585 |
| S28 | −478.845 | −514.949 | −585.852 |

Figure 3:
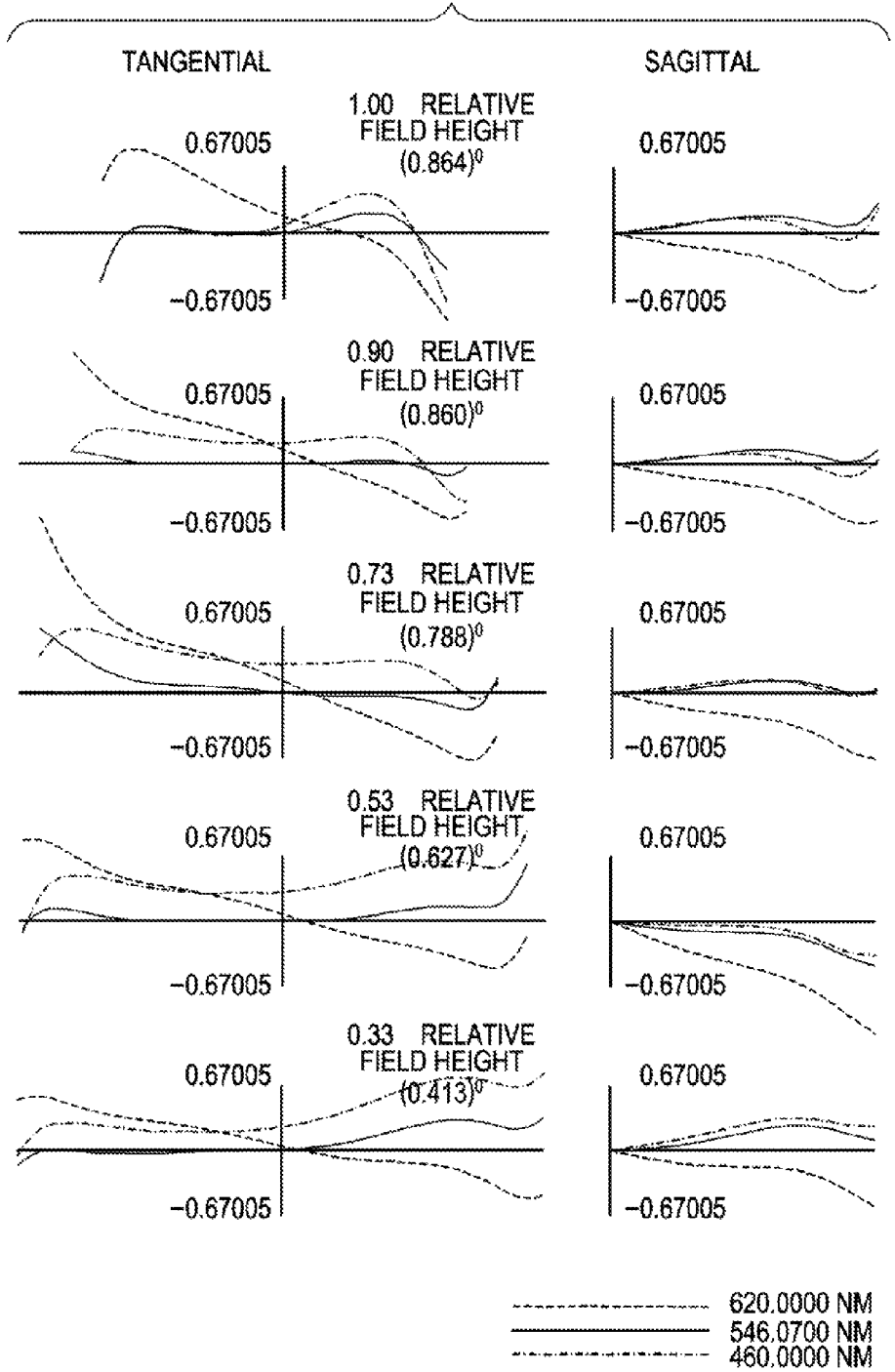
FIG. 3 is a transverse aberration diagram for a position pos1 according to the first embodiment.
Figure 4:
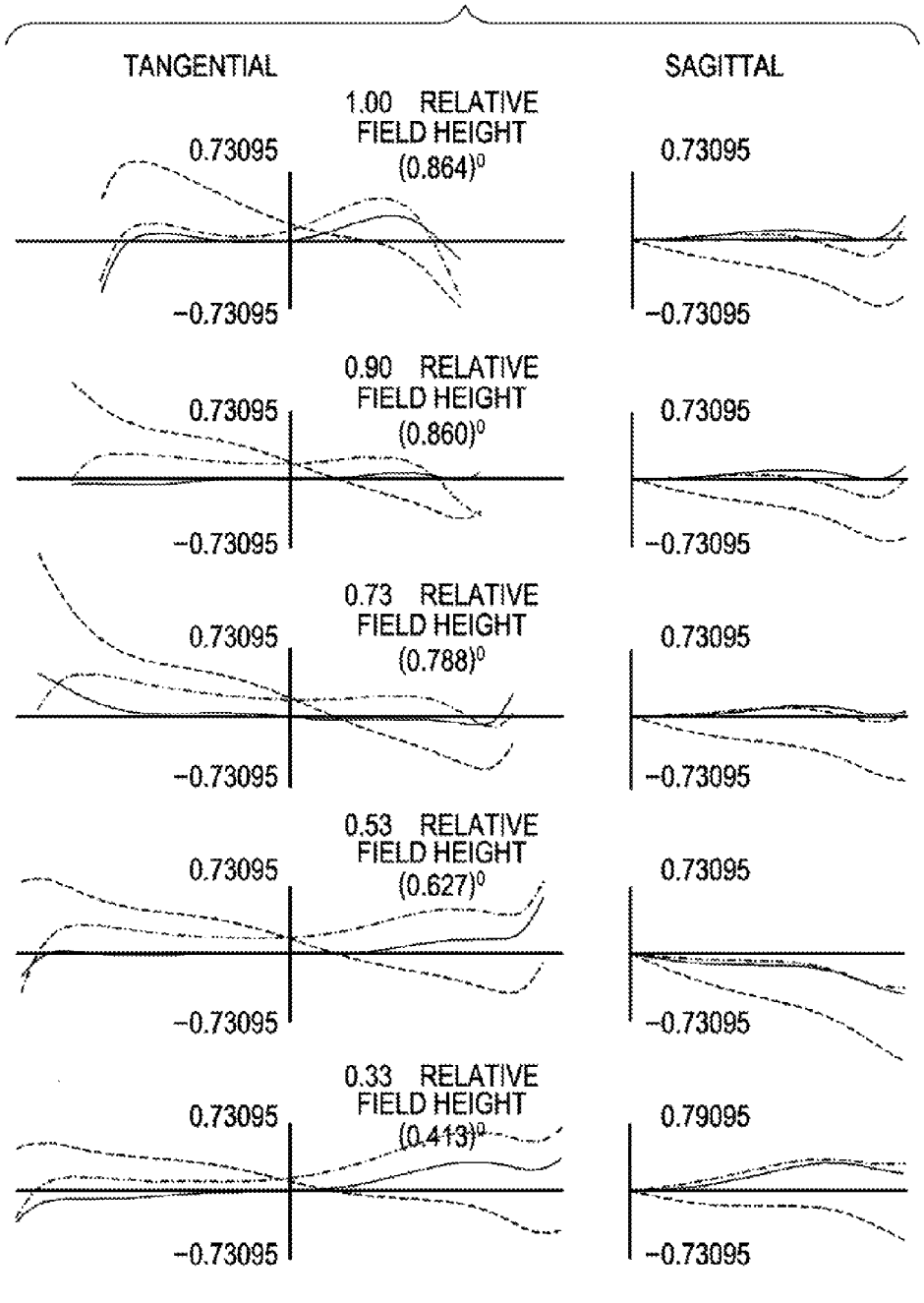
FIG. 4 is a transverse aberration diagram for a position pos2 according to the first embodiment.
Figure 5:
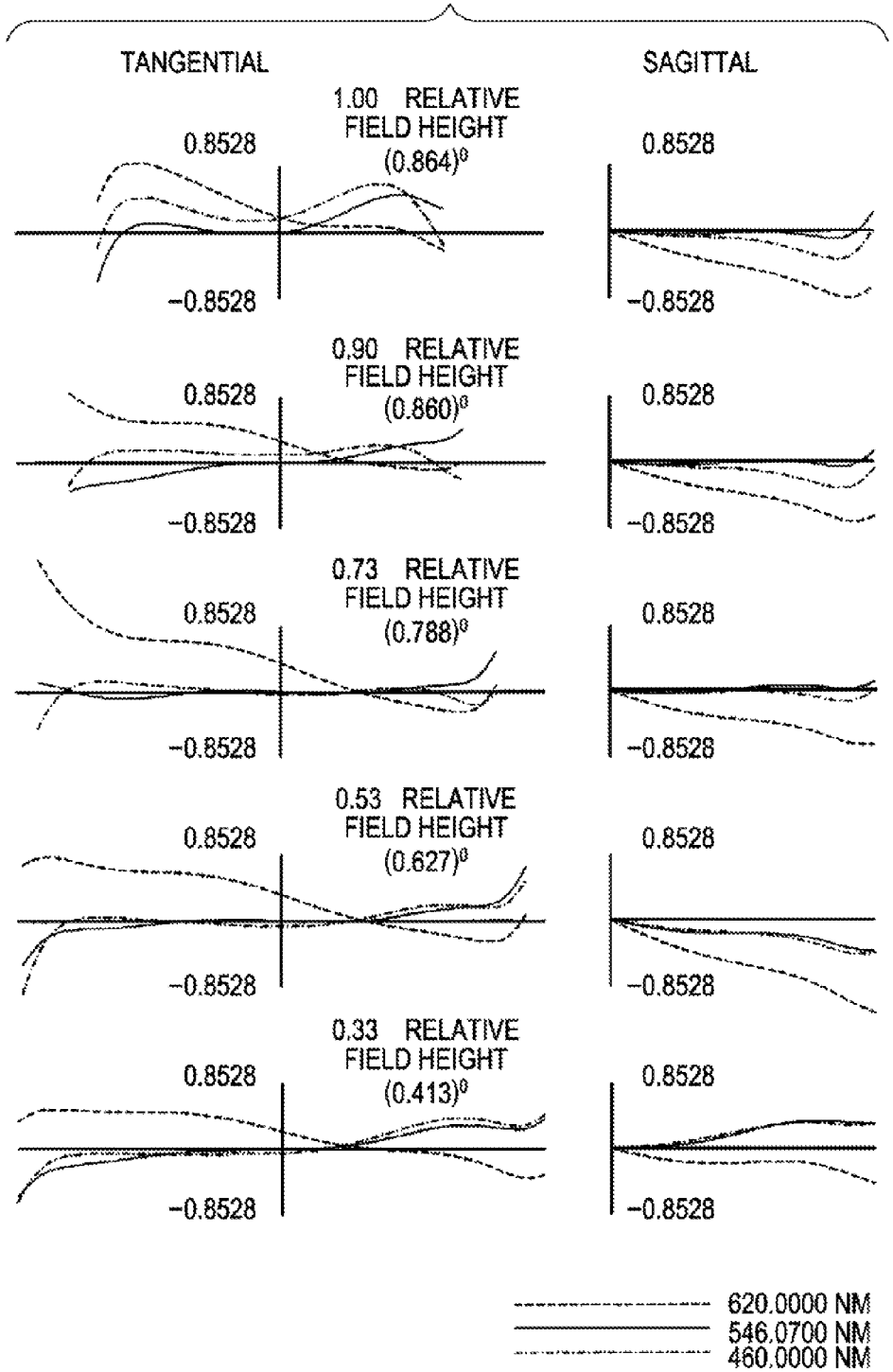
FIG. 5 is a transverse aberration diagram for a position pos3 according to the first embodiment.

FIGS. 3 to 5 are transverse aberration diagrams according to the first embodiment. The solid line indicates the transverse aberration for a wavelength of 546.07 nm. The dotted line indicates the transverse aberration for a wavelength of 620 nm. The alternate long and short dash line indicates the transverse aberration for a wavelength of 460 nm. FIG. 3 is a transverse aberration diagram for the position pos1. One scale unit represents 0.670 mm, which is a pixel size. FIG. 4 is a transverse aberration diagram for the position pos2. One scale unit represents 0.731 mm, which is a pixel size. FIG. 5 is a transverse aberration diagram for the position pos3. One scale unit represents 0.853 mm, which is a pixel size.

Figure 6:
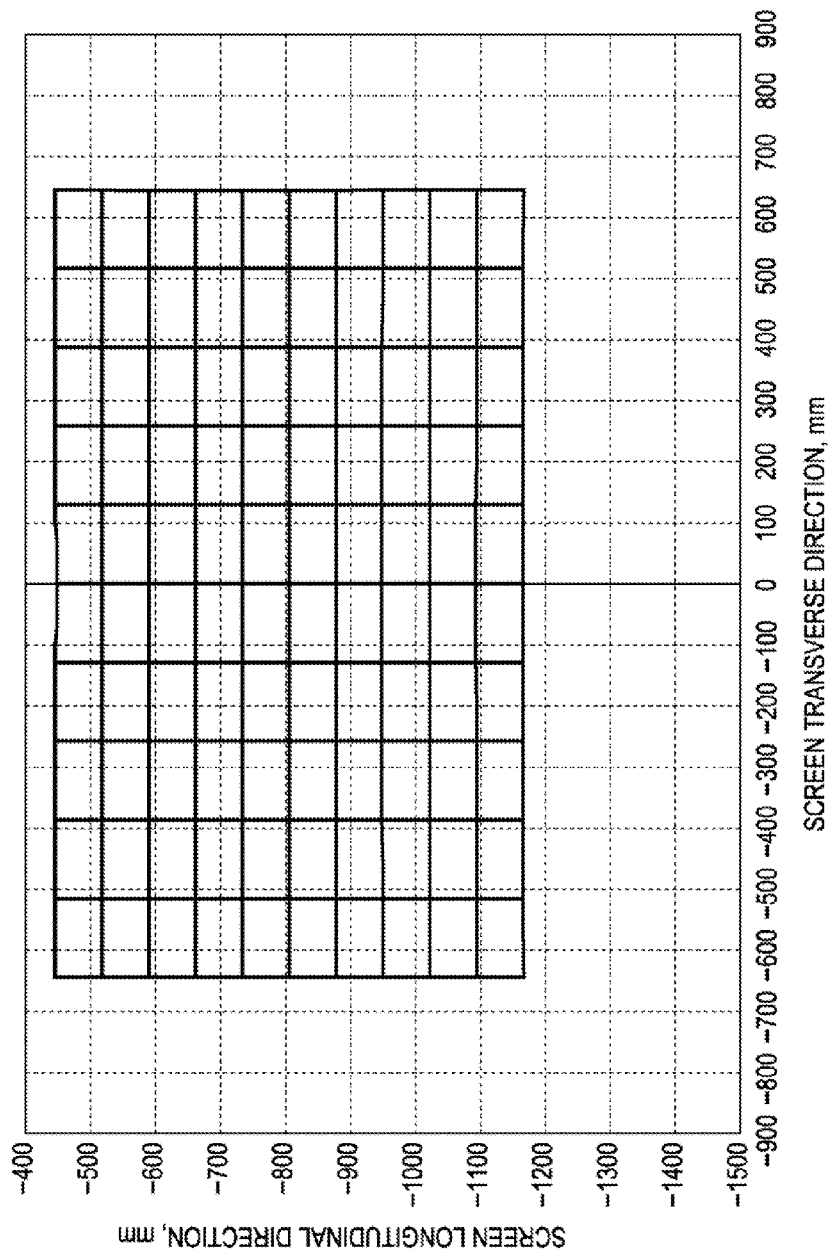
FIG. 6 is a TV distortion diagram for the position pos1 according to the first embodiment.
Figure 7:
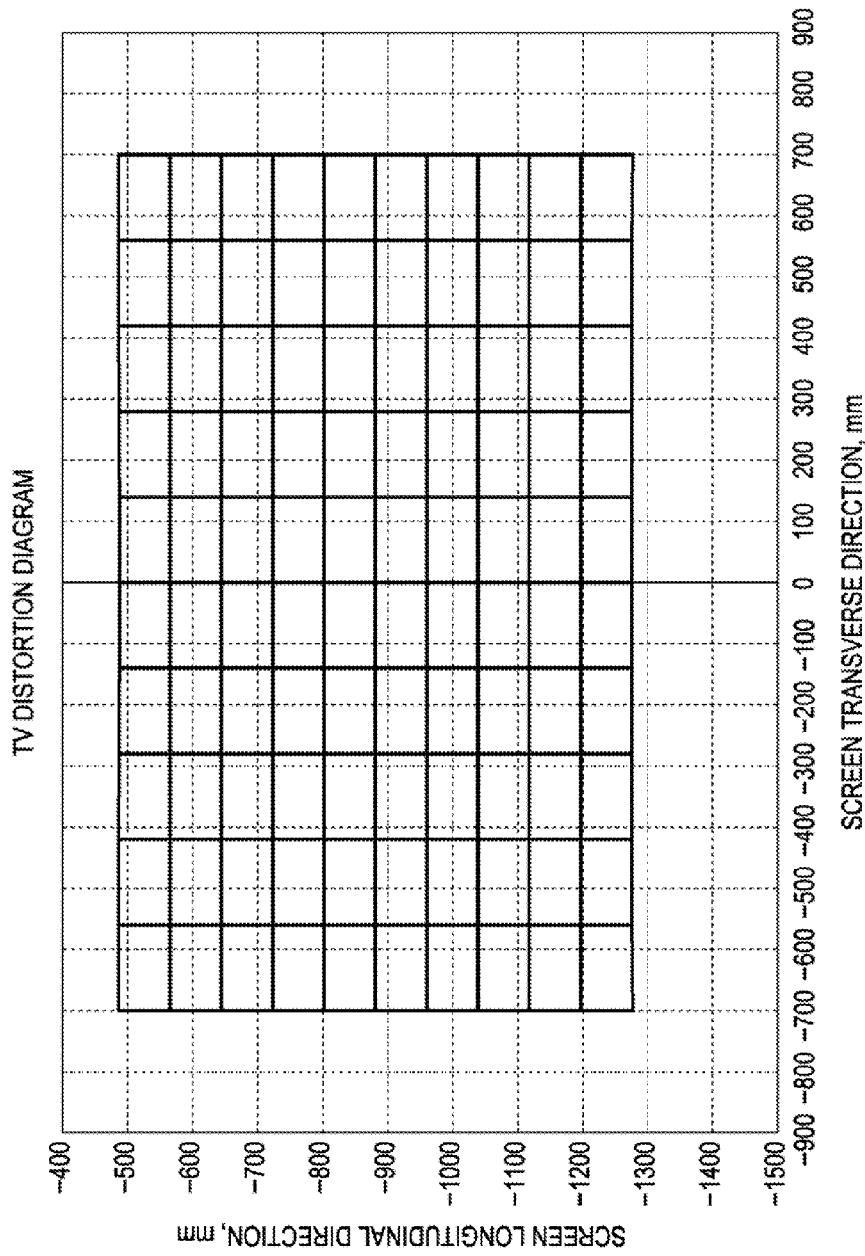
FIG. 7 is a TV distortion diagram for the position pos2 according to the first embodiment.
Figure 8:
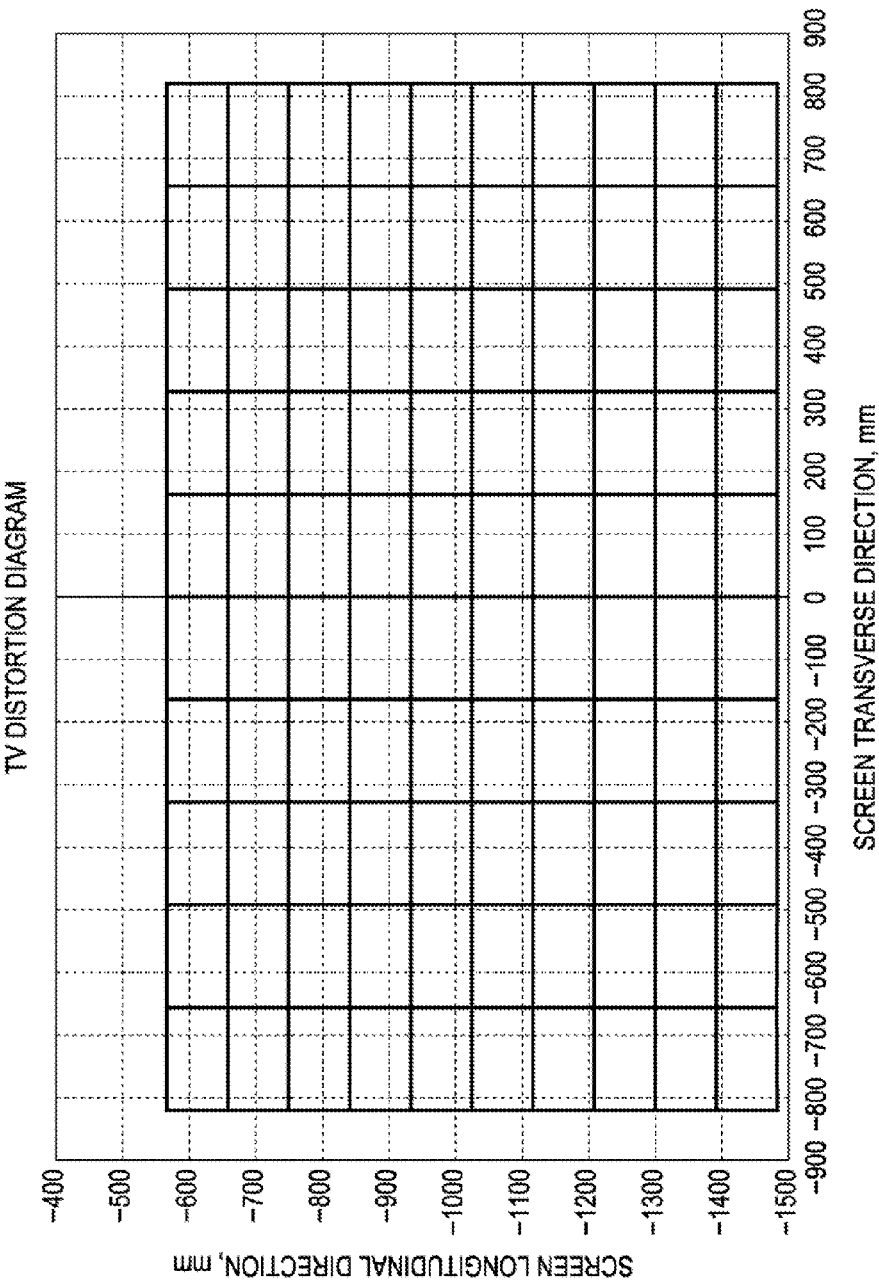
FIG. 8 is a TV distortion diagram for the position pos3 according to the first embodiment.

FIGS. 6 to 8 are TV distortion diagrams according to the first embodiment. FIG. 6 is a TV distortion diagram for the position pos1. FIG. 7 is a TV distortion diagram for the position pos2. FIG. 8 is a TV distortion diagram for the position pos3. Let x denote the abscissa and y denote the ordinate. Then, (x, y)=(0, 0) represents a point on the light axis.

Figure 9:
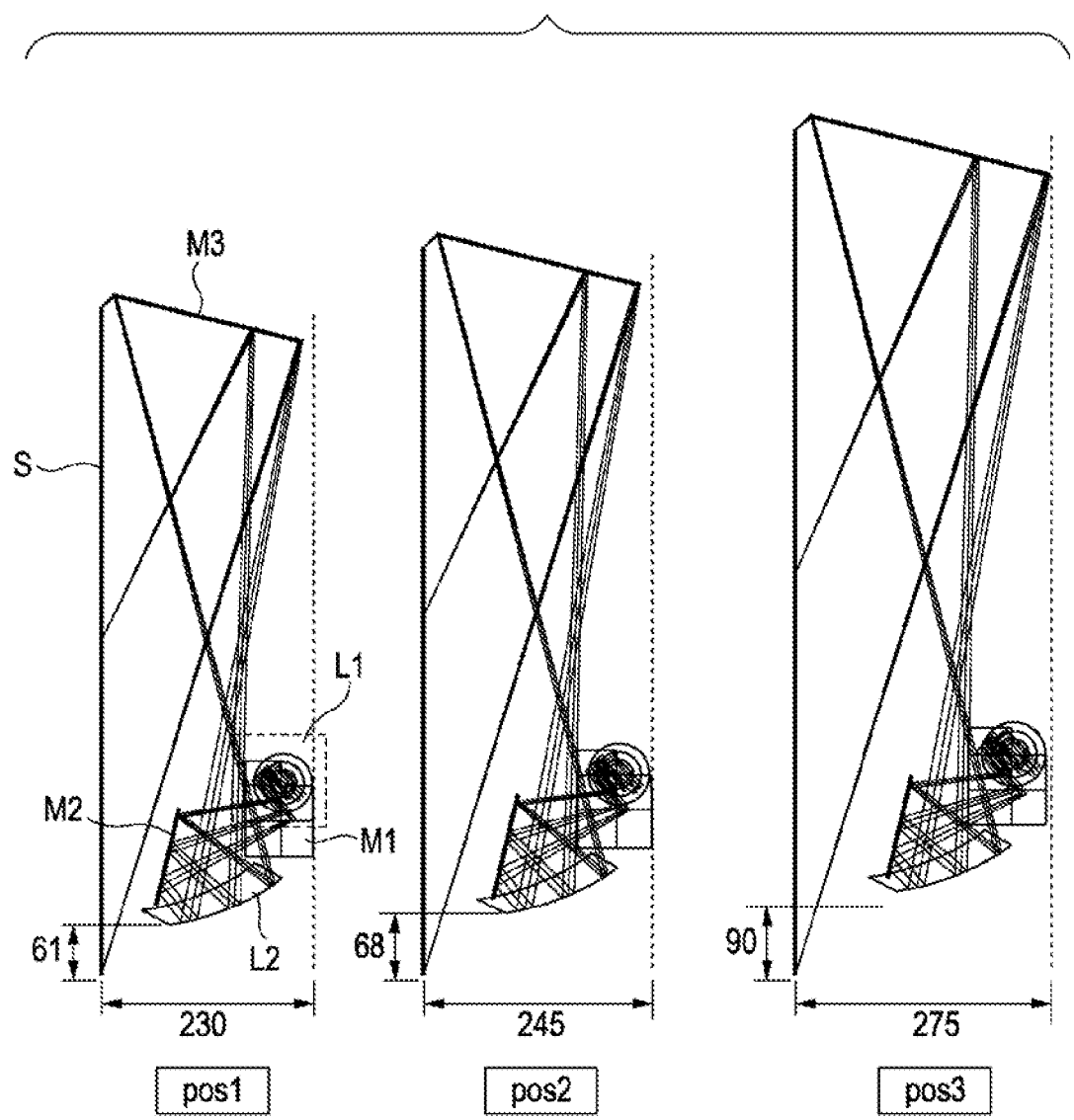
FIG. 9 illustrates an example of application of the optical system according to the first embodiment to a projection display apparatus.

FIG. 9 illustrates an example of the projection display apparatus using the optical system. The depth and the distance between the lower end of the projection optical system and the lower end of the screen are shown for each of the three positions. The projection display apparatus includes a first optical system L1, a second optical system L2, a planar mirrors M1, M2, and M3, and a screen S serving as a secondary imaging plane. The depths are 230 mm, 245 mm, and 275 mm for the positions pos1, pos2, and pos3, respectively. The distances between the lower end of the projection optical system and the lower end of the screen are 61 mm, 68 mm, and 90 mm for the positions pos1, pos2, and pos3, respectively. In this example, the size below the screen is zero regardless of the position of the projection optical system.

Figure 10:
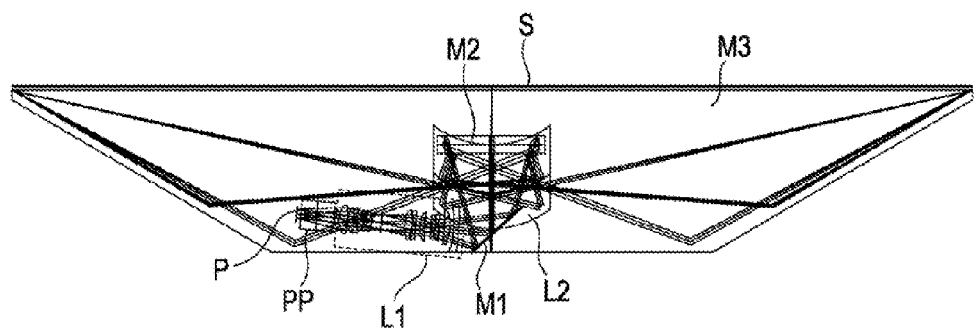
FIG. 10 is a top view of the projection display apparatus shown in FIG. 9.
Figure 11:
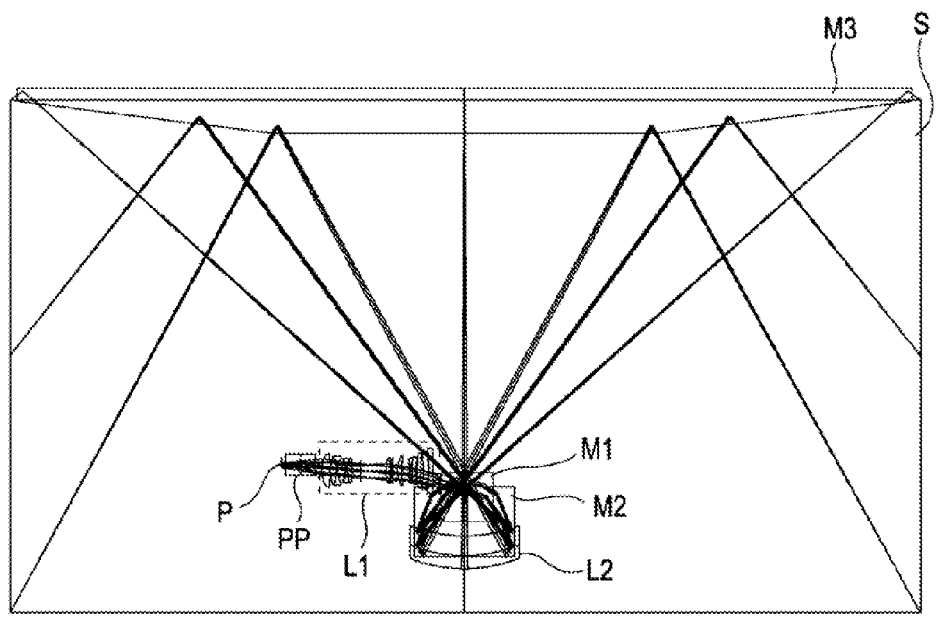
FIG. 11 is a view of FIG. 9 as viewed from the right.

FIG. 10 is a top view of the projection display apparatus shown in FIG. 9. FIG. 11 is a view the projection display apparatus in FIG. 9 as viewed from the right. An image display element P serving as a primary imaging plane, a prism pp, such as a color combining prism or a PBS, the planar mirrors M1, M2, and M3, and a screen S serving as a secondary imaging plane are shown in FIG. 10. Note that a light source and an illumination system are not shown in FIG. 10.

Second Embodiment

Figure 12:
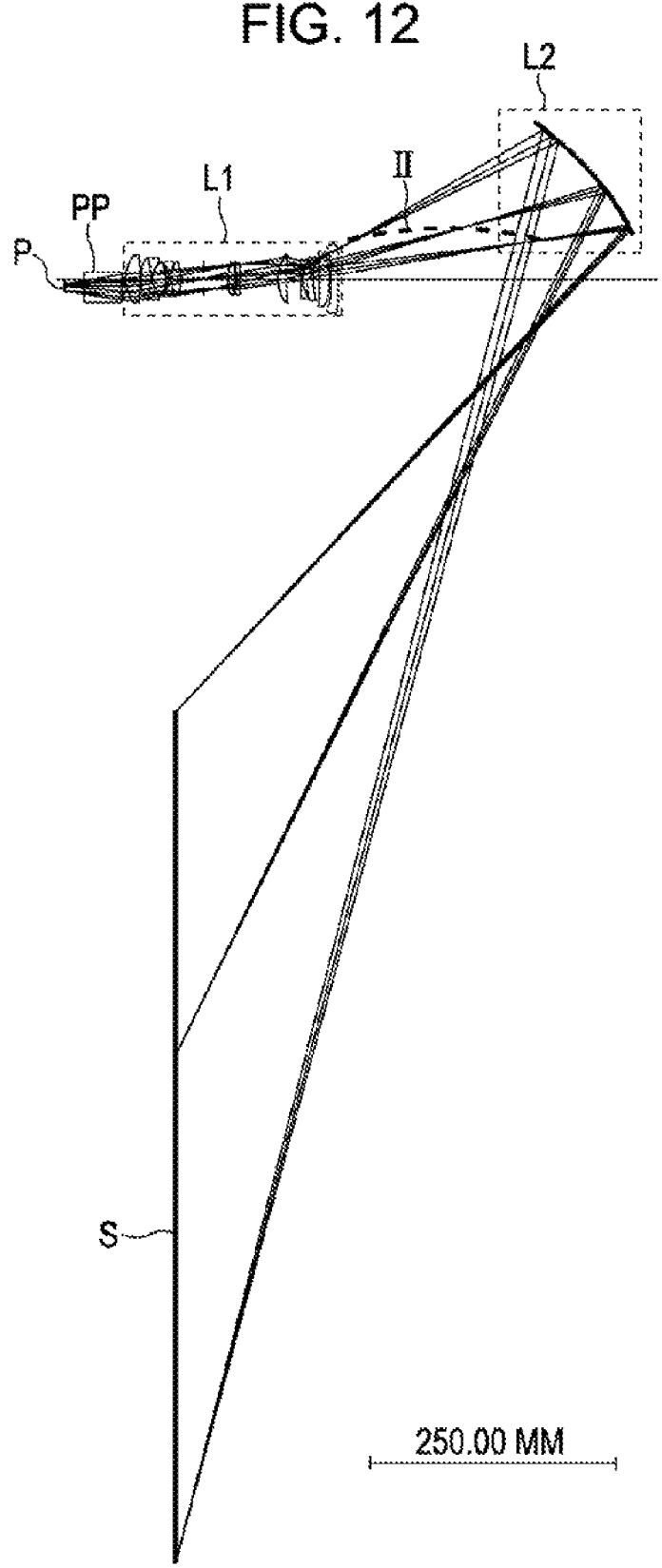
FIG. 12 illustrates a light path according to a second embodiment.

FIG. 12 illustrates a light path according to a second embodiment. An image display element P serves as a modulating unit. A light ray emitted from a light source (not shown) is modulated by the image display element P on the basis of a video signal. In this way, a primary imaging plane is formed. A reflective or transmissive dot-matrix liquid crystal display panel or a digital micromirror device (DMD) can be used for the image display element P. A reference symbol PP represents a polarizing beam splitter (PBS), a color combining prism that combines video signals of R, G, and B colors, and a total internal reflection (TIR) prism.

Figure 13:
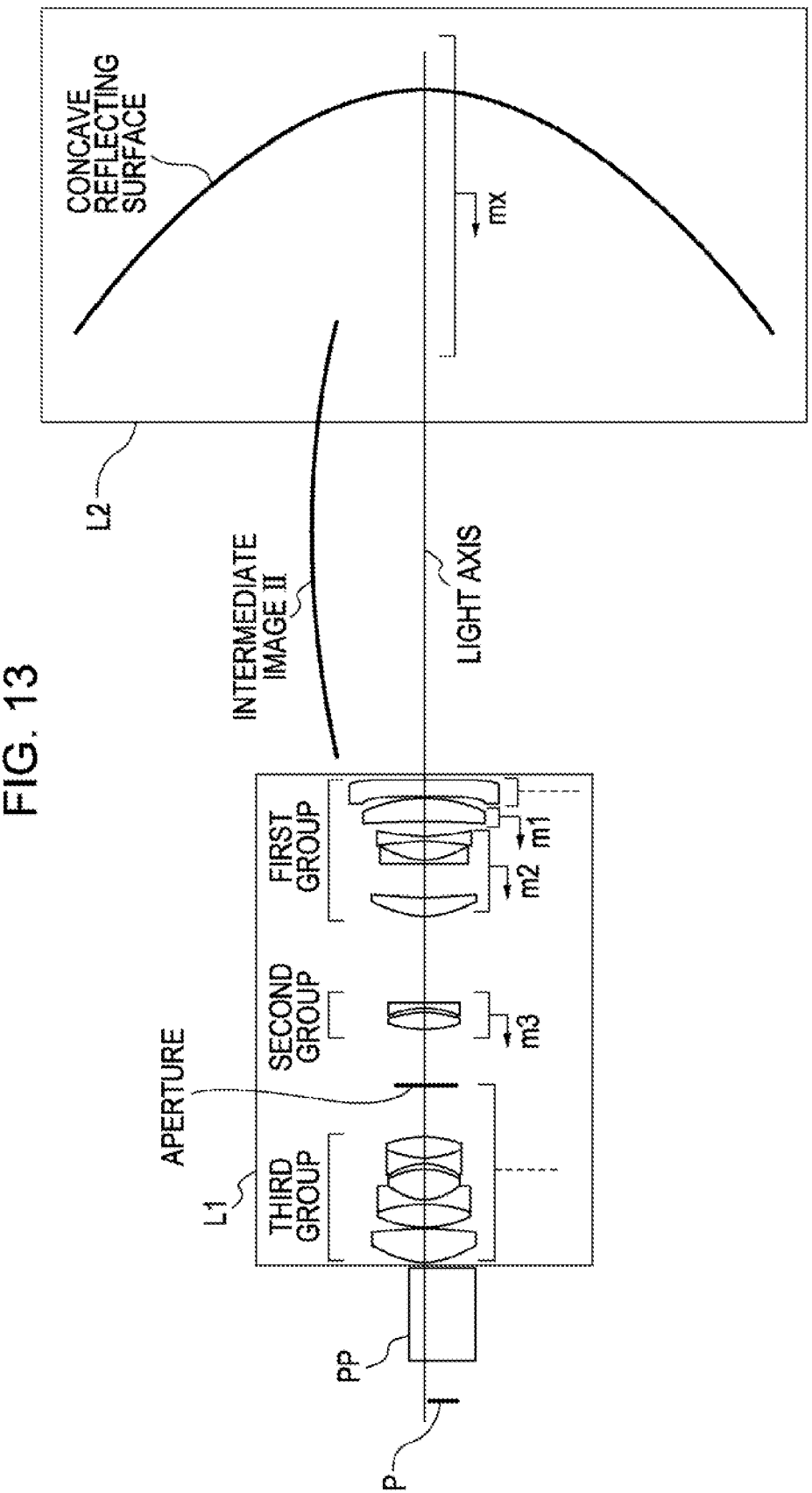
FIG. 13 illustrates a projection optical system portion in detail according to the second embodiment.

FIG. 13 illustrates a projection optical system portion shown in FIG. 12 in detail. A first optical system L1 includes a first group having a negative refractive power, a second group having a positive refractive power, an aperture, and a third group having a positive refractive power in this order from the side of the secondary imaging plane to the side of the image display element P. The lens groups of the first optical system that move in order to change the projection image size and a concave reflecting surface of a second optical system are represented by reference numerals m1, m2, m3, and mx, respectively. The arrows indicate directions in which the groups and the lens are moved on the light axis when a position pos1 is changed to a position pos3.

Table 6 shows the numeric aperture of the projection optical system and information about the image display device of the projection optical apparatus according to the second embodiment. The numeric aperture on the image display element side is 0.20444. The display element size is 13.440 mm×7.560 mm. Let a point on the light axis be represented as (x, y)=(0, 0). Then, the center point of the display element is represented as (x, y)=(0, −8.4333). The pixel pitch is 7 μm.

TABLE 6

| | |
|---|---|
| NUMERIC APERTURE ON DISPLAY ELEMENT SIDE | 0.20444 |
| DISPLAY ELEMENT SIZE | 13.440 × 7.560 |
| CENTER COORDINATES OF DISPLAY ELEMENT | (x, y) = (0.000, −8.4333) |
| PIXEL PITCH | 7 μm |

According to the second embodiment, images having three projection image sizes can be projected. The positions are represented by reference symbols pos1, pos2, and pos3 (refer to Table 7). Let $\phi 1$ denote the refractive power of the first optical system, $\phi 2$ denote the refractive power of the second optical system, $\Delta$ denote the distance between the principle point of the first optical system on an intermediate image side and the concave reflecting surface of the second optical system, and $\phi$ denote the combined refractive power. Then, a combined focal length f can be expressed as follows:

$$1/f = \phi = \phi 1 + \phi 2 - \Delta \cdot \phi 1 \cdot \phi 2.$$

In addition, Table 7 shows the magnification factors and the diagonal inch sizes for the positions. The diagonal inch size indicates the diagonal screen size in the secondary imaging plane. For the position pos1, the diagonal inch size is 57.555 inch. For the position pos2, the diagonal inch size is 62.835 inch. For the position pos3, the diagonal inch size is 73.396 inch.

TABLE 7

| | pos1 | pos2 | pos3 |
|---|---|---|---|
| Combined Focal Length f | 4.4315 | 4.4174 | 4.4035 |
| Magnification Factor | 94.8030 | 104.4222 | 121.8259 |
| Diagonal Inch Size | 57.555 | 62.835 | 73.396 |

Tables 8 to 10 show lens data when specific values are applied to the projection optical system according to the second embodiment. In the tables, the surface number increases from S1 to S2, to S3, . . . from the primary imaging plane side (the display element side) to the secondary imaging plane side (the projection image side). The left entry of the surface number indicates whether it is the surface number of the aperture and the aspherical surface. The data concerning the aspherical surfaces are shown in Table 9. The term "variable" in the "distance" column indicates that when the projection image size is changed, the distance is changed. The distances at the three positions are shown in Table 10. The term "INFINITY" in the "radius of curvature" column indicates that the surface is planar. The "index of refraction (ne)" column and the "Abbe number (ve)" column show the values for the e-line (546.1 nm).

TABLE 8

| | | RADIUS OF CURVATURE | DISTANCE | ne | ve |
|---|---|---|---|---|---|
| DISPLAY ELEMENT | | INFINITY | VARIABLE | | |
| S1 | | INFINITY | 40.300 | 1.51872 | 64.00 |
| S2 | | INFINITY | 2.000 | | |
| S3 | | 38.981 | 15.500 | 1.48914 | 70.24 |
| S4 | | −184.078 | 0.300 | | |
| S5 | | 44.739 | 10.139 | 1.51872 | 64.00 |
| S6 | | −70.014 | 1.972 | 1.81184 | 33.03 |
| S7 | | 24.503 | 14.153 | 1.48914 | 70.24 |
| S8 | | −34.699 | 1.859 | | |
| S9 | | −29.441 | 2.700 | 1.81184 | 33.03 |
| S10 | | 40.435 | 9.263 | 1.85505 | 23.60 |
| S11 | | −47.035 | 23.030 | | |
| S12 | APERTURE | INFINITY | VARIABLE | | |
| S13 | | 51.144 | 7.917 | 1.51872 | 64.00 |
| S14 | | −42.595 | 1.440 | | |
| S15 | | −41.715 | 2.500 | 1.81184 | 33.03 |
| S16 | | −1125.856 | VARIABLE | | |
| S17 | | 40.314 | 8.585 | 1.74690 | 48.99 |
| S18 | | 223.058 | 14.757 | | |
| S19 | | −325.164 | 1.919 | 1.77621 | 49.39 |
| S20 | | 30.247 | 8.595 | | |
| S21 | | −99.112 | 1.890 | 1.62286 | 60.10 |
| S22 | | 110.612 | VARIABLE | | |
| S23 | | −391.472 | 10.157 | 1.65222 | 33.58 |
| S24 | | −57.773 | VARIABLE | | |
| S25 | ASPHERICAL | −524.610 | 7.000 | 1.493568 | 57.54 |
| S26 | ASPHERICAL | 253.038 | VARIABLE | | |
| S27 | ASPHERICAL | −87.662 | VARIABLE | REFLECTING SURFACE | |
| PROJECTION IMAGE SURFACE | | INFINITY | 0.000 | | |

TABLE 9

| | |
|---|---|
| S25 | K: 0.000000<br>A: −.355302E−05  B: 0.246651E−08  C: −.138354E−10  D: 0.280680E−13<br>E: −.239159E−16  F: 0.498081E−20 |
| S26 | K: 0.000000<br>A: −.305709E−05  B: −.143469E−09  C: −.327323E−11  D: 0.881200E−14<br>E: −.832832E−17  F: 0.237847E−20 |

TABLE 9-continued

S27  K: −2.577532
     A: −.114105E−06  B: 0.621508E−11  C: −.304718E−15  D: 0.985984E−20
     E: −.191014E−24  F: 0.166042E−29

TABLE 10

|     | pos1     | pos2     | pos3     |
|-----|----------|----------|----------|
| S0  | 20.103   | 20.100   | 20.109   |
| S12 | 24.822   | 24.367   | 23.329   |
| S16 | 38.503   | 38.959   | 39.996   |
| S22 | 7.000    | 6.213    | 5.166    |
| S24 | 1.000    | 2.712    | 5.803    |
| S26 | 307.689  | 305.758  | 302.000  |
| S27 | −474.119 | −510.973 | −585.539 |

Figure 14:
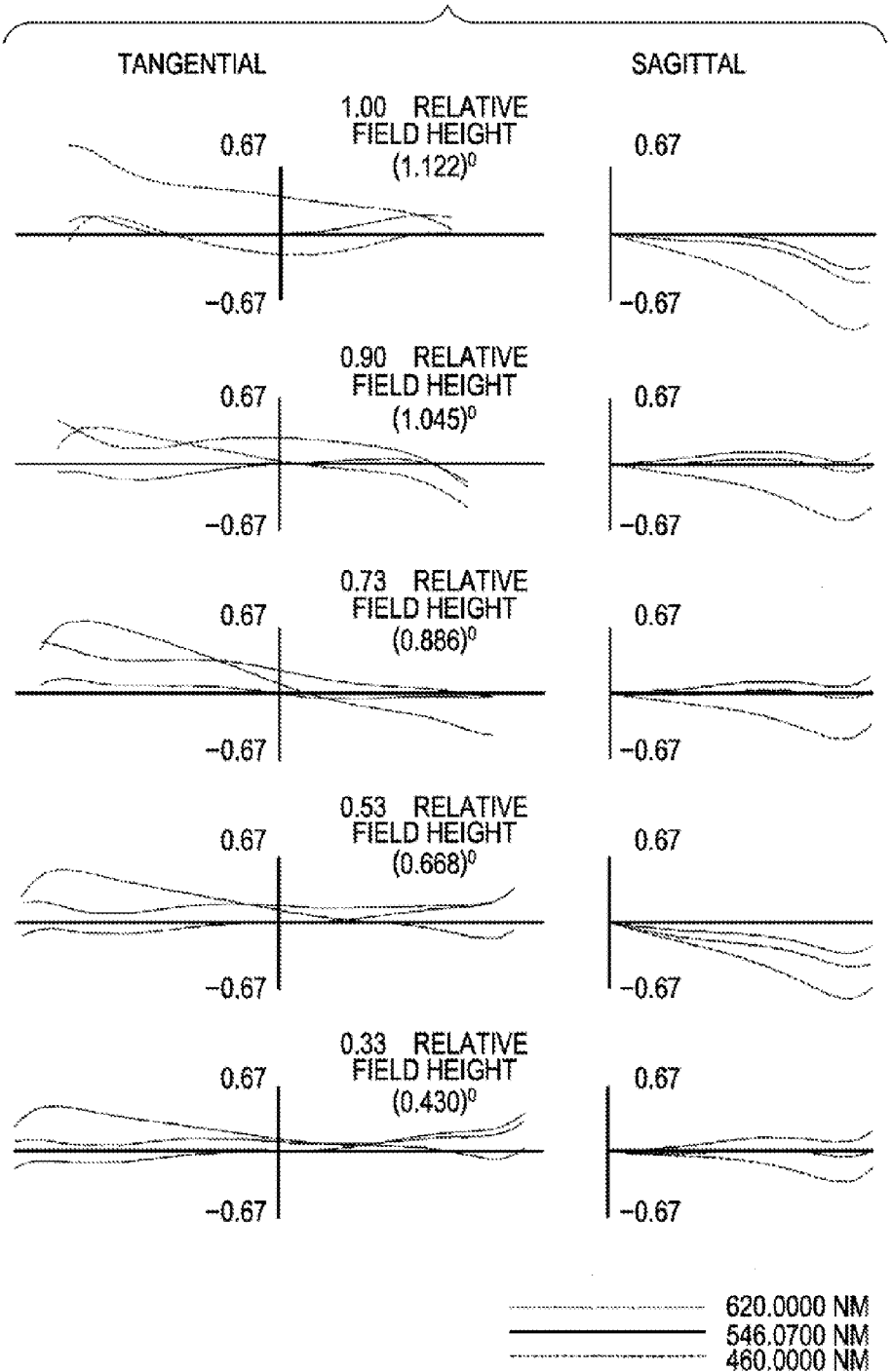
FIG. 14 is a transverse aberration diagram for a position pos1 according to the second embodiment.
Figure 15:
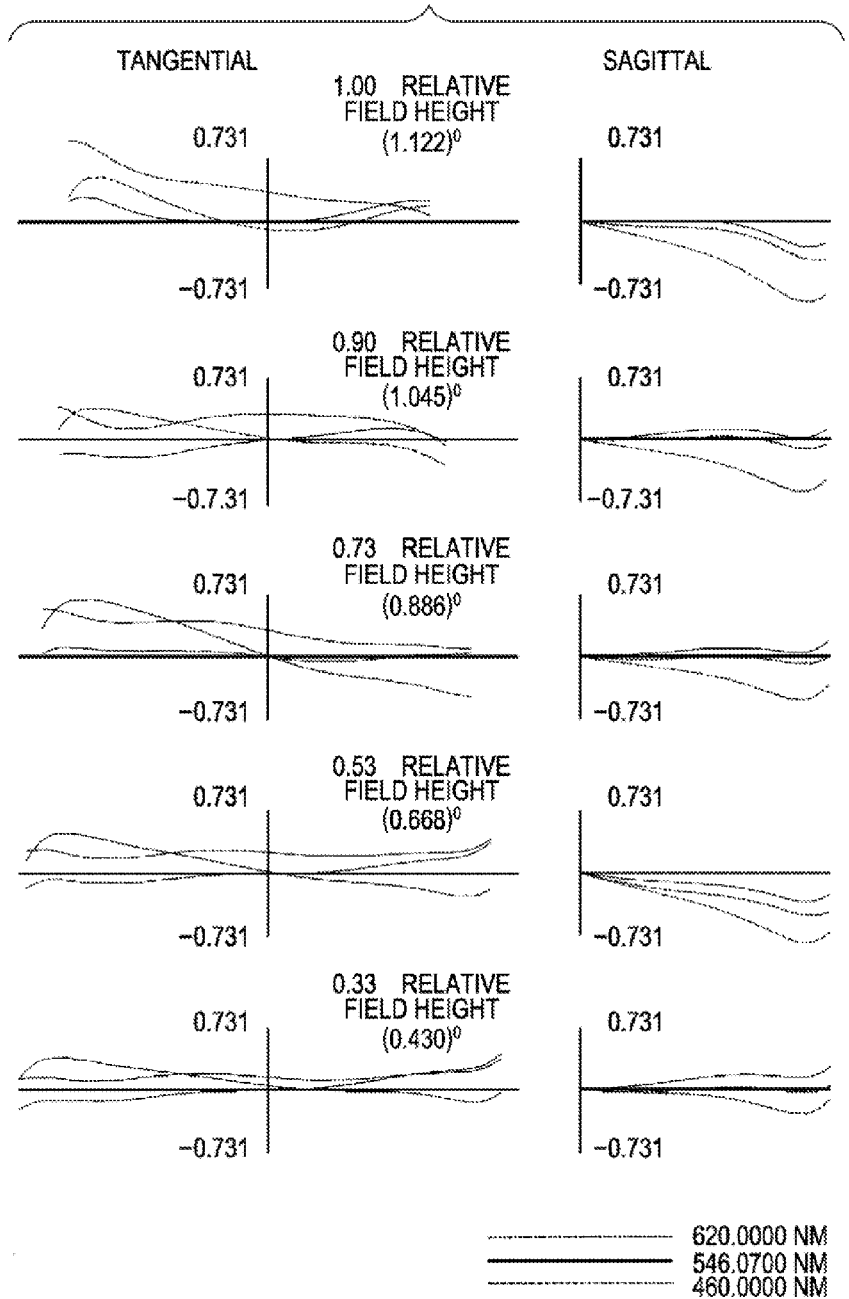
FIG. 15 is a transverse aberration diagram for a position pos2 according to the second embodiment.
Figure 16:
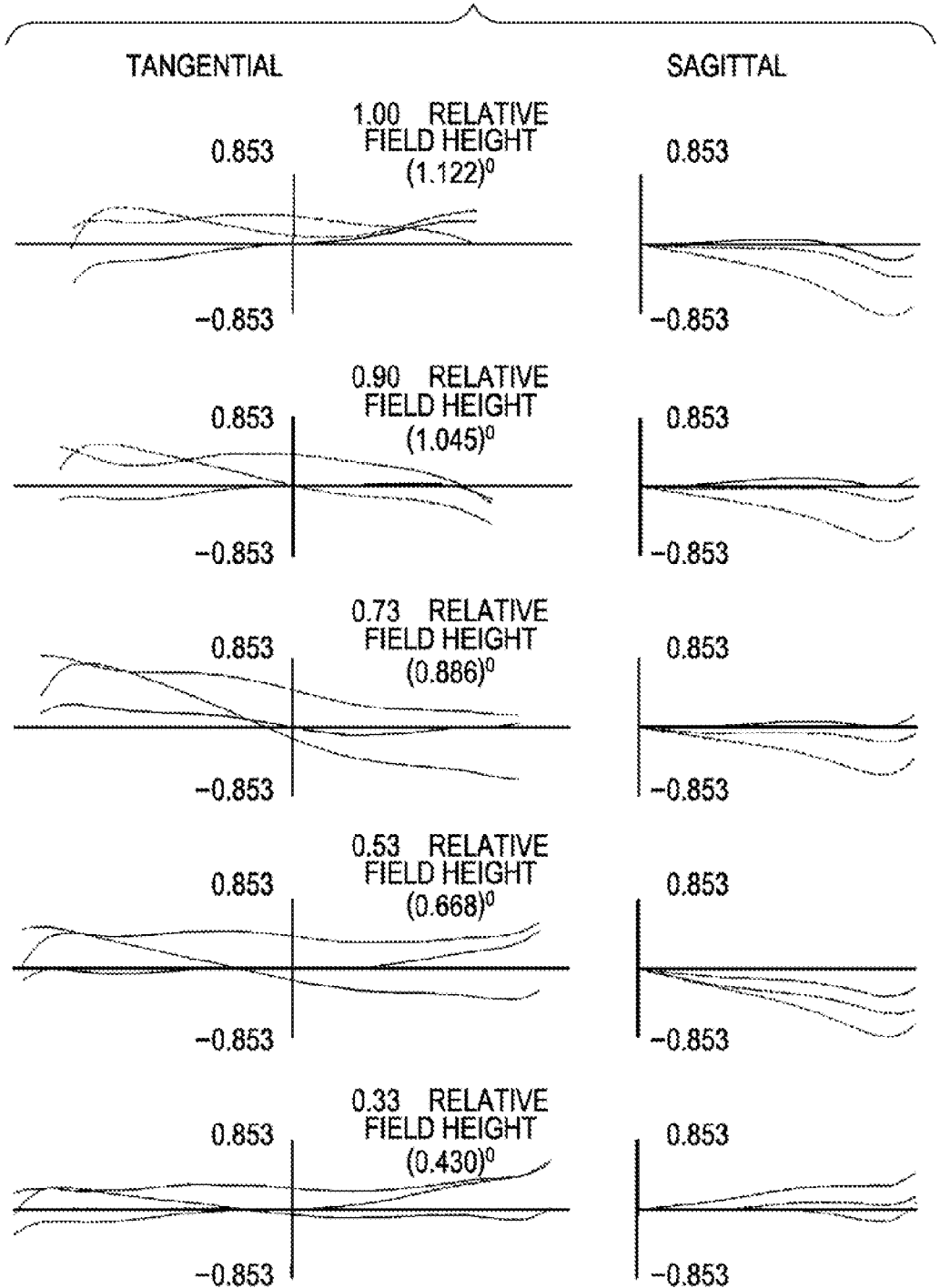
FIG. 16 is a transverse aberration diagram for a position pos3 according to the second embodiment.

FIGS. 14 to 16 are transverse aberration diagrams according to the second embodiment. The solid line indicates the transverse aberration for a wavelength of 546.07 nm. The dotted line indicates the transverse aberration for a wavelength of 620 nm. The alternate long and short dash line indicates the transverse aberration for a wavelength of 460 nm. FIG. 14 is a transverse aberration diagram for the position pos1. One scale unit represents 0.670 mm, which is a pixel size. FIG. 15 is a transverse aberration diagram for the position pos2. One scale unit represents 0.731 mm, which is a pixel size. FIG. 16 is a transverse aberration diagram for the position pos3. One scale unit represents 0.853 mm, which is a pixel size.

Figure 17:
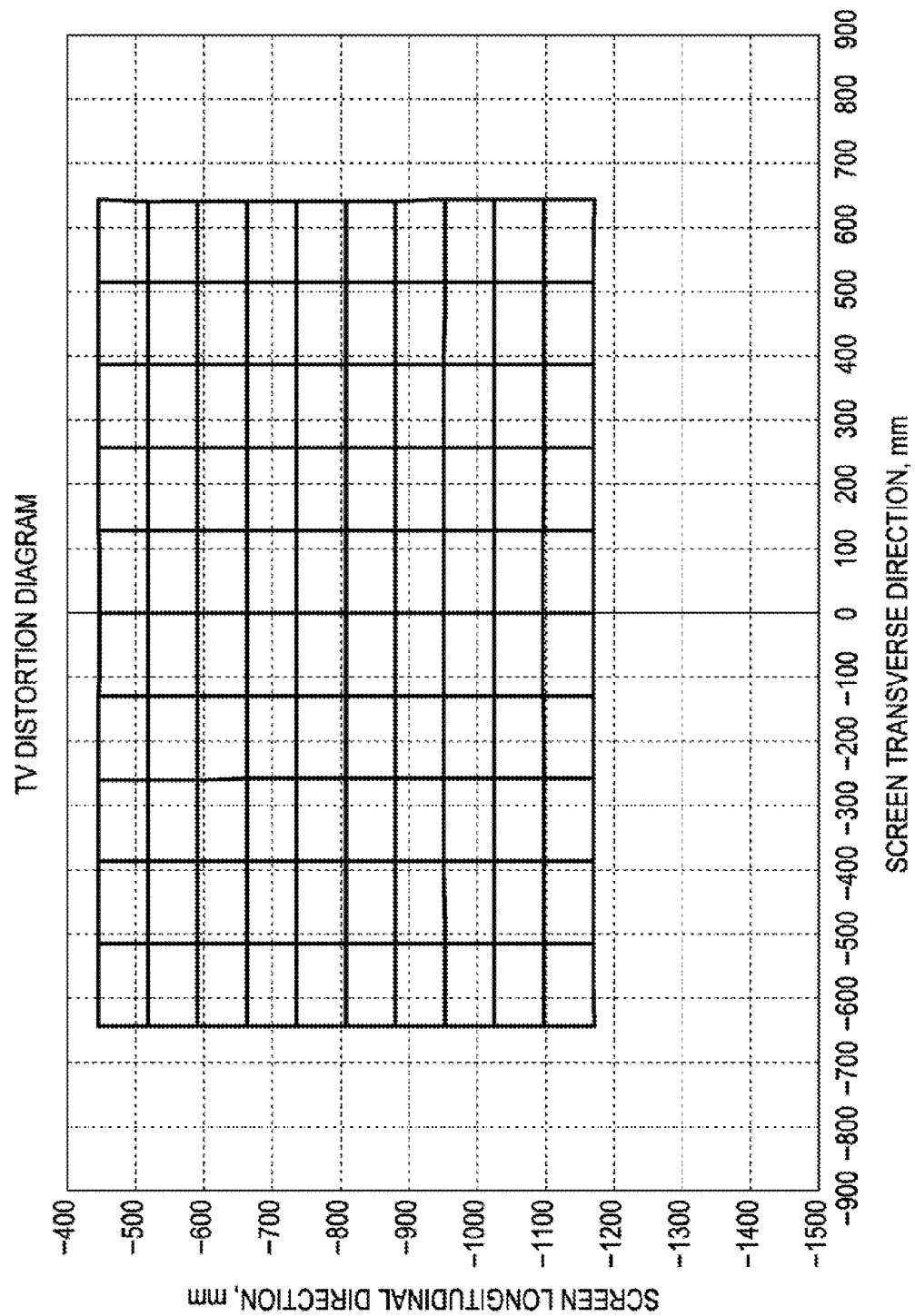
FIG. 17 is a TV distortion diagram for the position pos1 according to the second embodiment.
Figure 18:
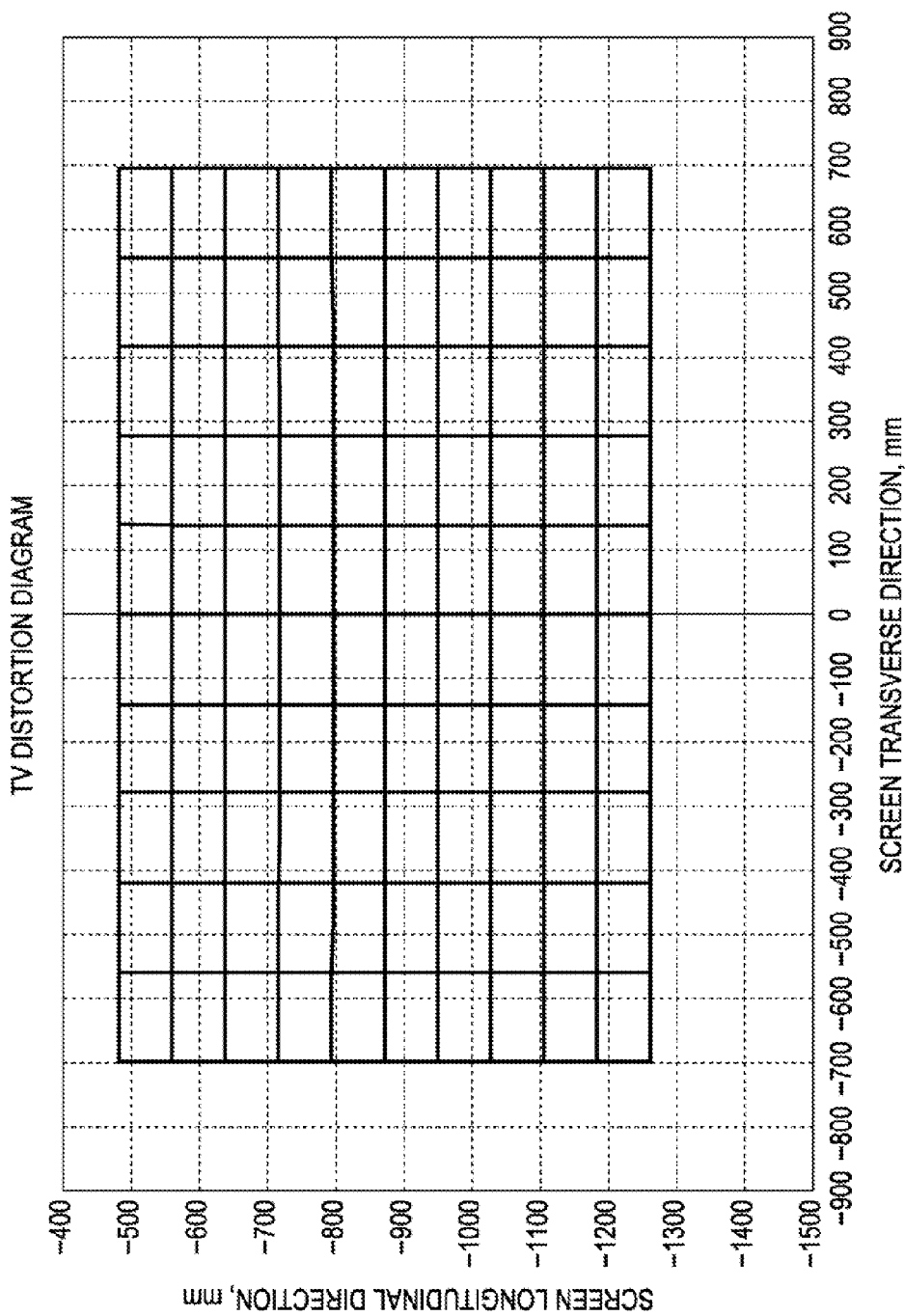
FIG. 18 is a TV distortion diagram for the position pos2 according to the second embodiment.
Figure 19:
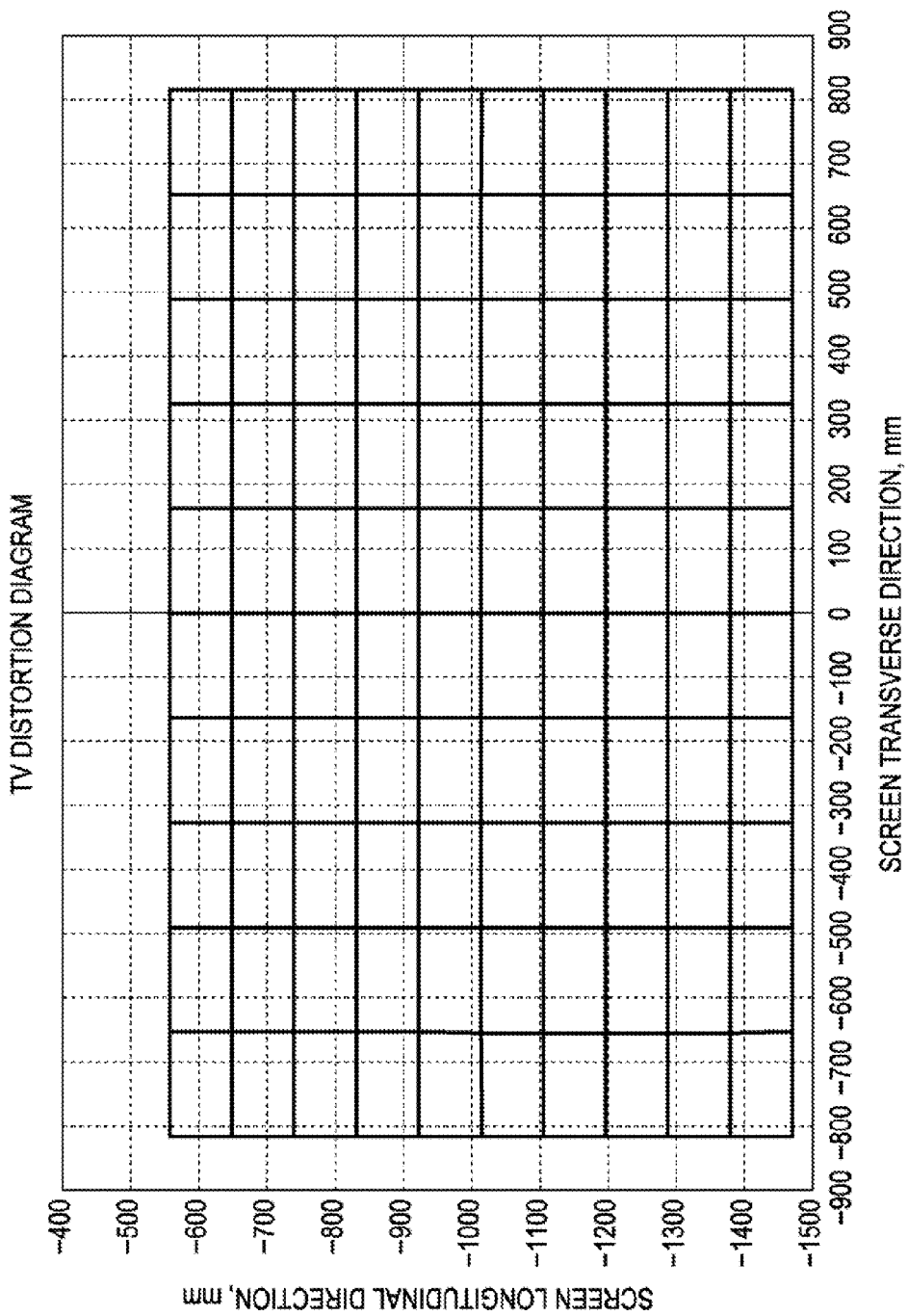
FIG. 19 is a TV distortion diagram for the position pos3 according to the second embodiment.

FIGS. 17 to 19 are TV distortion diagrams according to the second embodiment. FIG. 17 is a TV distortion diagram for the position pos1. FIG. 18 is a TV distortion diagram for the position pos2. FIG. 19 is a TV distortion diagram for the position pos3. Let x denote the abscissa and y denote the ordinate. Then, (x, y)=(0, 0) represents a point on the light axis.

Third Embodiment

Figure 20:
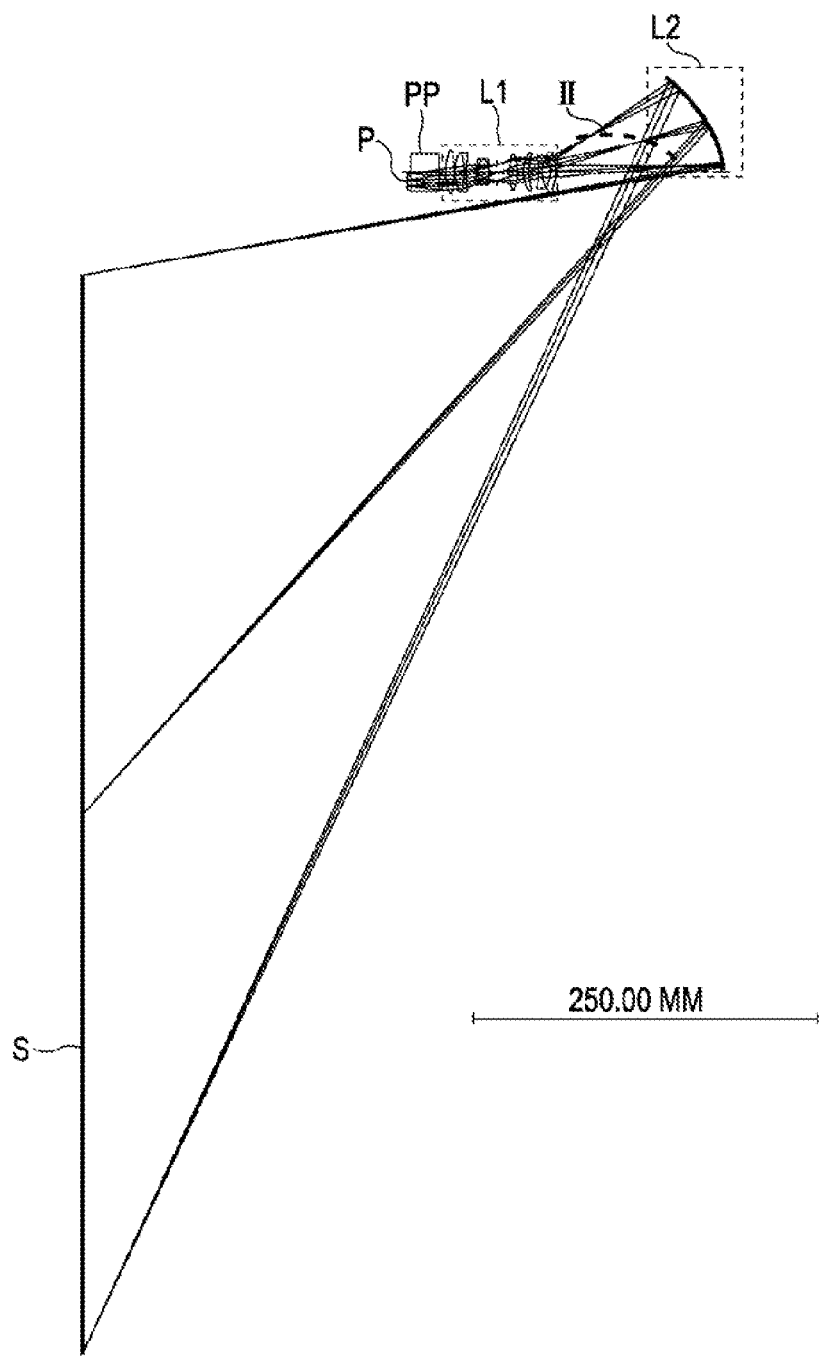
FIG. 20 illustrates a light path according to a third embodiment.

FIG. 20 illustrates a light path according to a third embodiment. An image display element P serves as a modulating unit. A light ray emitted from a light source (not shown) is modulated by the image display element P on the basis of a video signal. In this way, a primary imaging plane is formed. A reflective or transmissive dot-matrix liquid crystal display panel or a digital micromirror device (DMD) can be used for the image display element P. A reference symbol PP represents a polarizing beam splitter (PBS), a color combining prism that combines video signals of R, G, and B colors, and a total internal reflection (TIR) prism.

Figure 21:
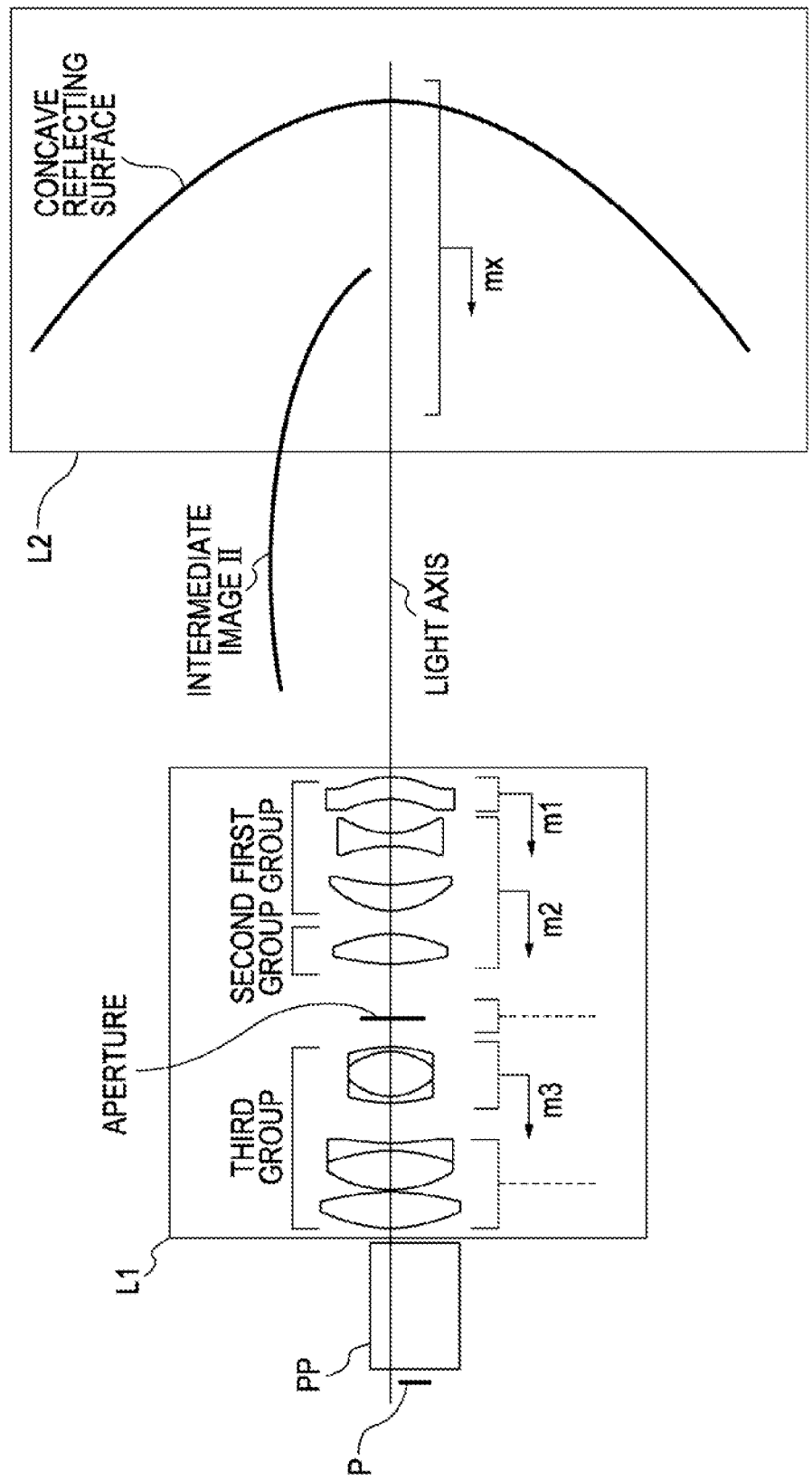
FIG. 21 illustrates a projection optical system portion according to the third embodiment.

FIG. 21 illustrates a projection optical system portion shown in FIG. 20 in detail. A first optical system L1 includes a first group having a negative refractive power, a second group having a positive refractive power, an aperture, and a third group having a positive refractive power in this order from the secondary imaging plane side to the side of the image display element P. The lens groups of the first optical system that move in order to change the projection image size and a concave reflecting surface of a second optical system are represented by reference numerals m1, m2, m3, and mx, respectively. The arrows indicate directions in which the groups and the lens are moved on the light axis when a position pos1 is changed to a position pos3.

Table 11 shows the numeric aperture of the projection optical system and information about the image display device of the projection optical apparatus according to the third embodiment. The numeric aperture on the image display element side is 0.25864. The display element size is 12.160 mm×6.840 mm. Let a point on the light axis be represented as (x, y)=(0, 0). Then, the center point of the display element is represented as (x, y)=(0, −4.2787). The pixel pitch is 9.5 μm.

TABLE 11

| NUMERIC APERTURE ON DISPLAY ELEMENT SIDE | 0.25864 |
| DISPLAY ELEMENT SIZE | 12.160 × 6.840 |
| CENTER COORDINATES OF DISPLAY ELEMENT | (x, y) = (0.000, −4.2787) |
| PIXEL PITCH | 9.5 μm |

According to the third embodiment, images having two projection image sizes can be projected. The positions are represented by reference symbols pos1 and pos2 (refer to Table 12). Let $\phi 1$ denote the refractive power of the first optical system, $\phi 2$ denote the refractive power of the second optical system, $\Delta$ denote the distance between the principle point of the first optical system on an intermediate image side and the concave reflecting surface of the second optical system, and $\phi$ denote the combined refractive power. Then, a combined focal length f can be expressed as follows:

$$1/f = \phi = \phi 1 + \phi 2 - \Delta \cdot \phi 1 \cdot \phi 2.$$

In addition, Table 12 shows the magnification factors and the diagonal inch sizes for the positions. The diagonal inch size indicates the diagonal screen size in the secondary imaging plane. For the position pos1, the diagonal inch size is 48.603 inch. For the position pos2, the diagonal inch size is 52.829 inch.

TABLE 12

|                          | pos1    | pos2    |
|--------------------------|---------|---------|
| Combined Focal Length f  | 4.8409  | 4.8501  |
| Magnification Factor     | 88.4840 | 96.1783 |
| Diagonal Inch Size       | 48.603  | 52.829  |

Tables 13 to 15 show lens data when specific values are applied to the projection optical system according to the third embodiment. In the tables, the surface number increases from S1 to S2, to S3, . . . from the primary imaging plane side (the display element side) to the secondary imaging plane side (the projection image side). The left entry of the surface number indicates whether it is the surface number of the aperture and the aspherical surface. The data concerning the aspherical surfaces are shown in Table 14. The term "variable" in the "distance" column indicates that when the projection image size is changed, the distance is changed. The distances at the three positions are shown in Table 15. The term "INFINITY" in the "radius of curvature" column indicates that the surface is planar. The "index of refraction (ne)" column and the "Abbe number (ve)" column show the values for the e-line (546.1 nm).

TABLE 13

|  | RADIUS OF CURVATURE | DISTANCE | ne | ve |
|---|---|---|---|---|
| DISPLAY ELEMENT | INFINITY | VARIABLE | | |
| S1 | INFINITY | 23.000 | 1.51872 | 64.00 |
| S2 | INFINITY | 2.500 | | |
| S3 | 38.397 | 6.349 | 1.69980 | 55.25 |
| S4 | −66.518 | 0.300 | | |
| S5 | 25.481 | 7.063 | 1.48914 | 70.24 |
| S6 | −44.728 | 1.192 | 1.74690 | 48.99 |
| S7 | 77.907 | VARIABLE | | |
| S8 | 47.926 | 1.000 | 1.81184 | 33.03 |
| S9 | 13.794 | 8.000 | 1.48914 | 70.24 |
| S10 | −16.269 | 1.000 | 1.83930 | 37.09 |
| S11 | −32.398 | VARIABLE | | |
| S12 APERTURE | INFINITY | VARIABLE | | |
| S13 | 49.901 | 5.280 | 1.51978 | 51.85 |
| S14 | −30.884 | 4.063 | | |
| S15 | 19.559 | 4.703 | 1.57125 | 55.78 |
| S16 | 53.946 | 6.835 | | |
| S17 | −40.939 | 2.300 | 1.77621 | 49.39 |
| S18 | 22.857 | VARIABLE | | |
| S19 ASPHERICAL | −17.457 | 4.000 | 1.493568 | 57.54 |
| S20 ASPHERICAL | −20.209 | VARIABLE | | |
| S21 ASPHERICAL | −54.647 | VARIABLE | REFLECTING SURFACE | |
| PROJECTION IMAGE SURFACE | INFINITY | 0.000 | | |

TABLE 14

| S19 | K: 0.386464 | | | |
|---|---|---|---|---|
| | A: 0.783638E−04 | B: 0.424720E−06 | C: 0.551607E−09 | D: −.169990E−12 |
| S20 | K: −1.730511 | | | |
| | A: 0.173535E−04 | B: 0.184361E−06 | C: 0.347432E−09 | D: −.458184E−12 |
| S20 | K: −2.434939 | | | |
| | A: −.728216E−06 | B: 0.123623E−09 | C: −.261106E−13 | D: 0.381369E−17 |
| | E: −.355459E−21 | F: 0.148830E−25 | | |

TABLE 15

|  | pos1 | pos2 |
|---|---|---|
| S0 | 2.000 | 2.038 |
| S7 | 7.373 | 7.249 |
| S11 | 4.946 | 5.032 |
| S12 | 9.903 | 9.709 |
| S18 | 6.133 | 6.147 |
| S20 | 121.018 | 120.458 |
| S21 | −462.439 | −500.394 |

Figure 22:
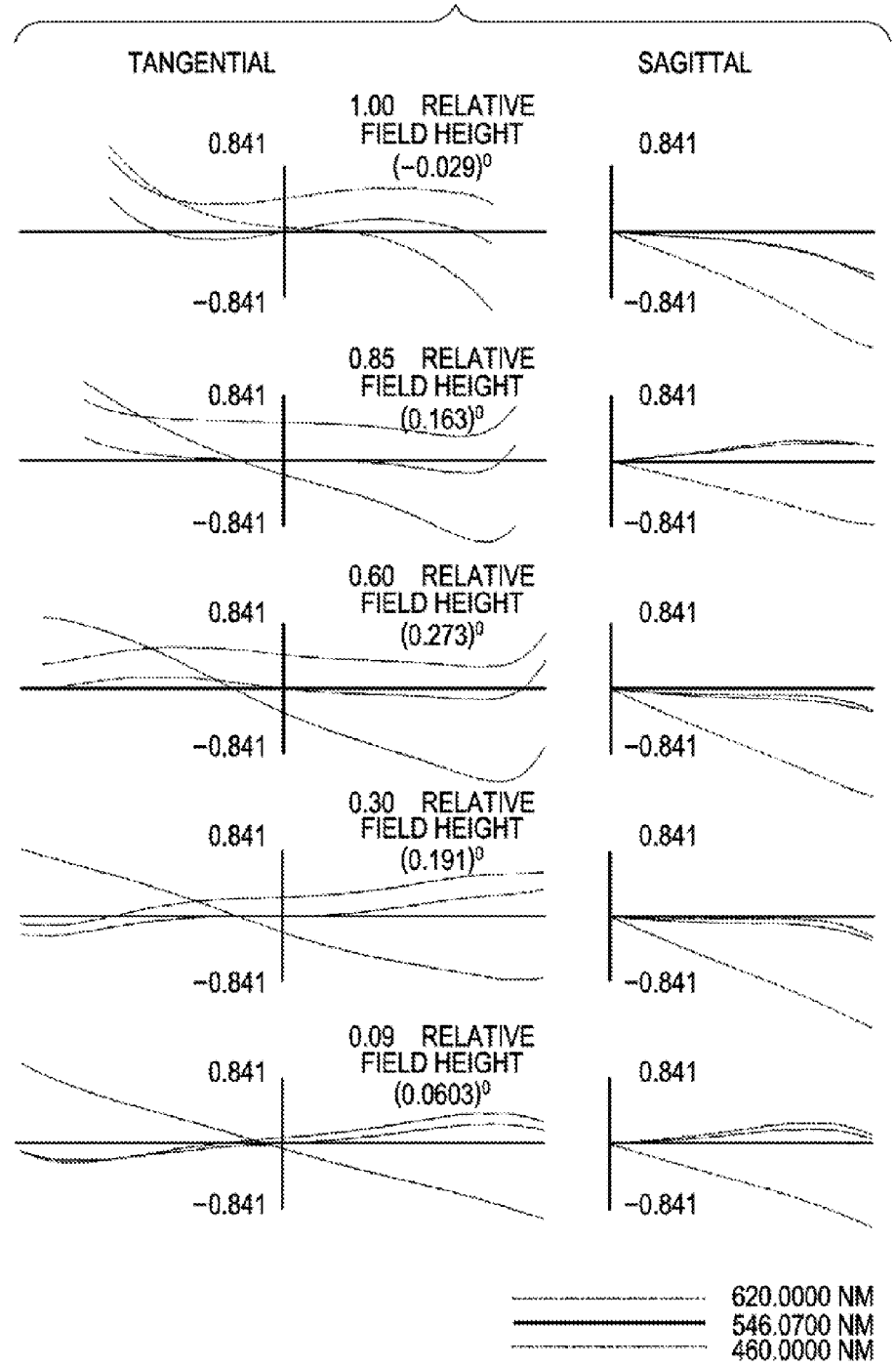
FIG. 22 is a transverse aberration diagram for a position pos1 according to the third embodiment.
Figure 23:
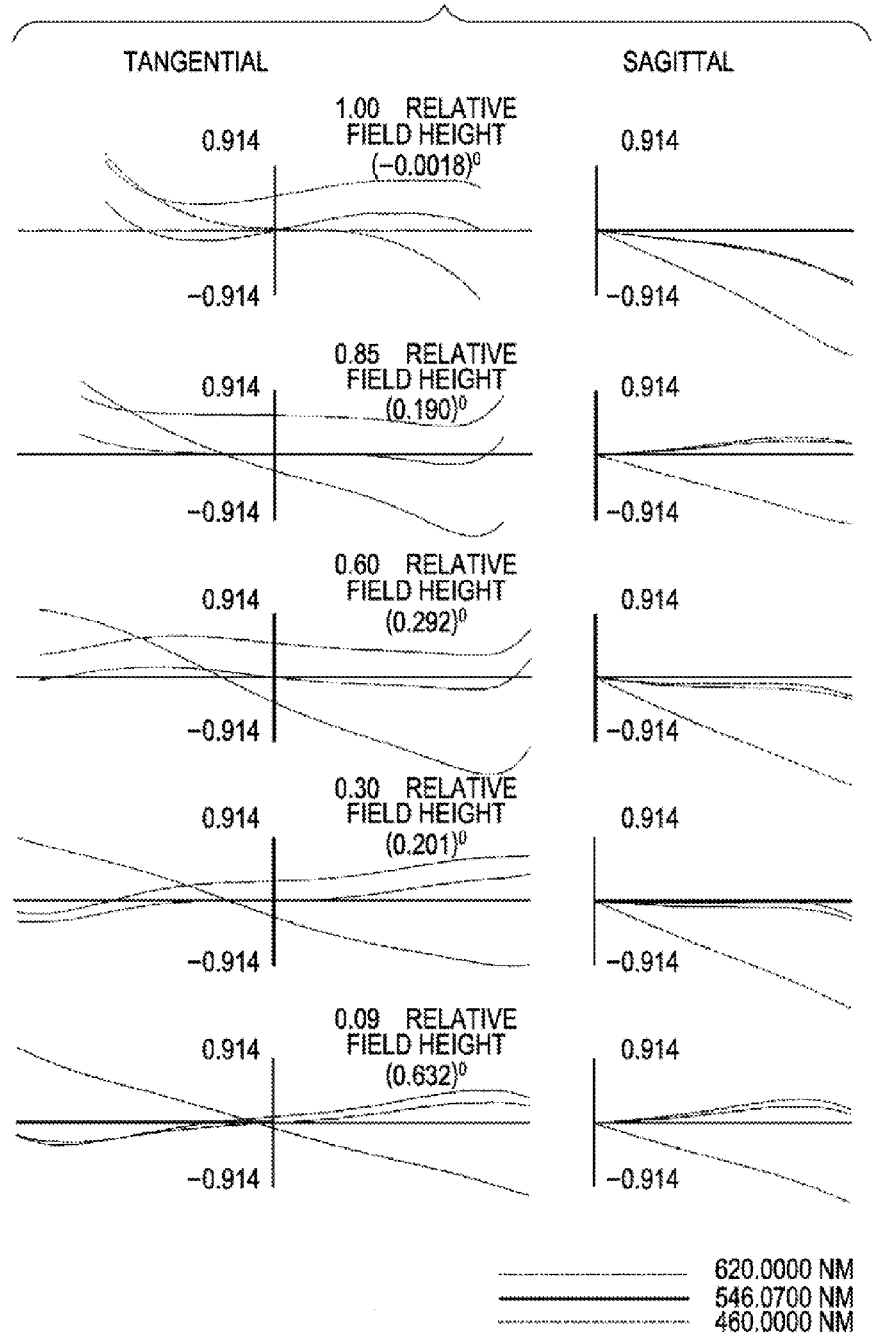
FIG. 23 is a transverse aberration diagram for a position pos2 according to the third embodiment.

FIGS. 22 to 23 are transverse aberration diagrams according to the third embodiment. The solid line indicates the transverse aberration for a wavelength of 546.07 nm. The dotted line indicates the transverse aberration for a wavelength of 620 nm. The alternate long and short dash line indicates the transverse aberration for a wavelength of 460 nm. FIG. 22 is a transverse aberration diagram for the position pos1. One scale unit represents 0.841 mm, which is a pixel size. FIG. 23 is a transverse aberration diagram for the position pos2. One scale unit represents 0.914 mm, which is a pixel size.

Figure 24:
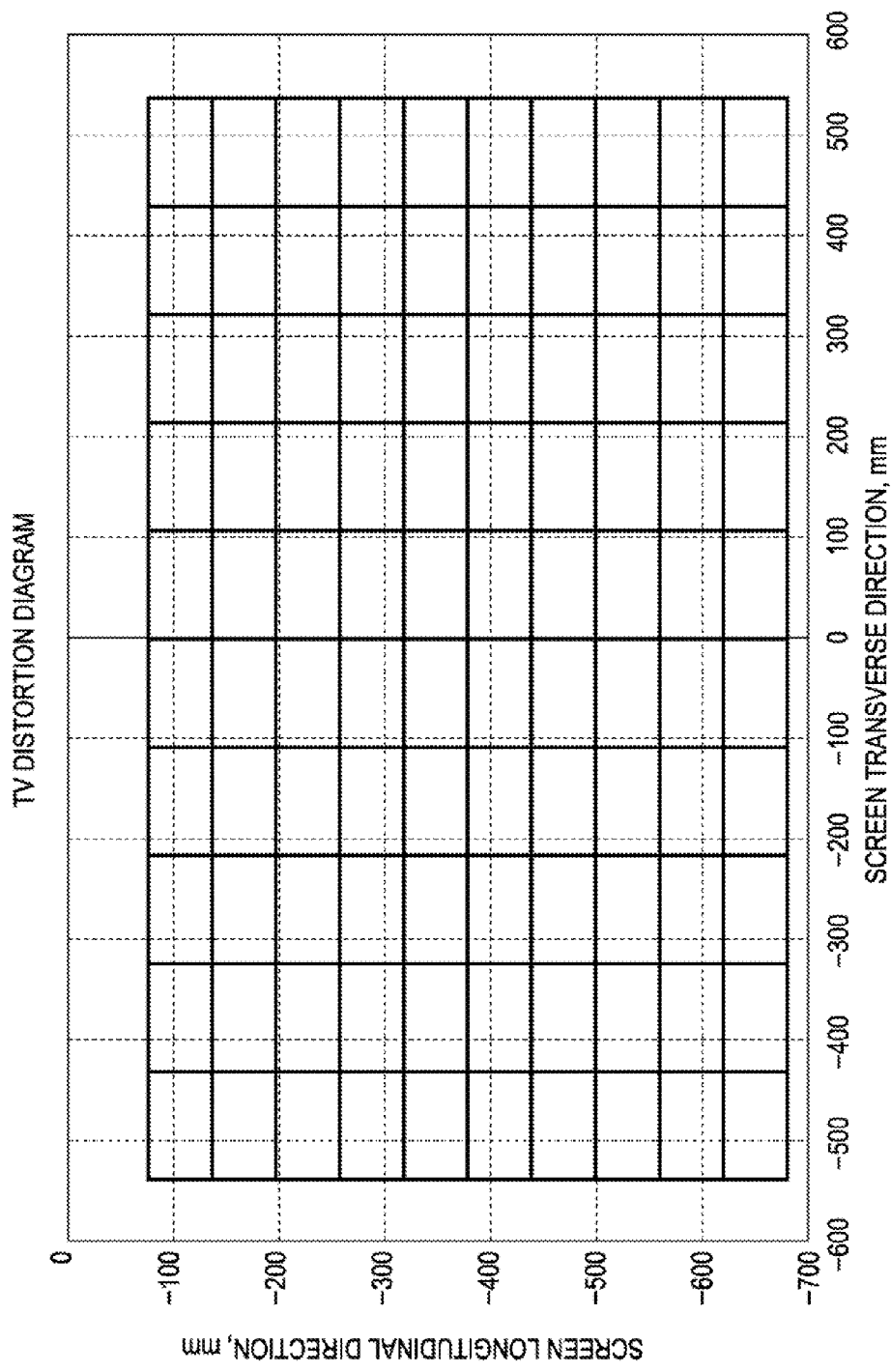
FIG. 24 is a TV distortion diagram for the position pos1 according to the third embodiment.
Figure 25:
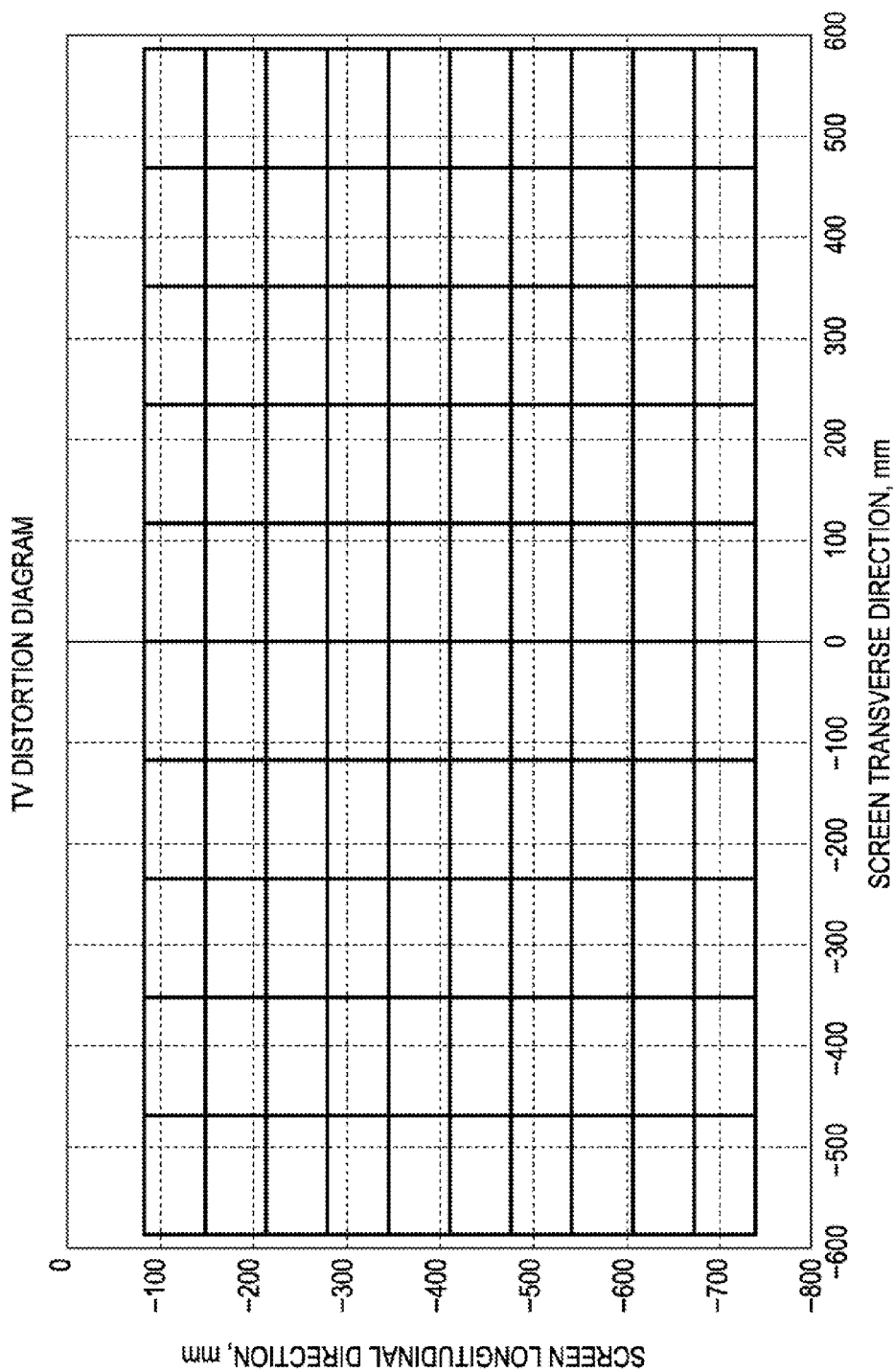
FIG. 25 is a TV distortion diagram for the position pos2 according to the third embodiment.

FIGS. 24 to 25 are TV distortion diagrams according to the third embodiment. FIG. 24 is a TV distortion diagram for the position pos1. FIG. 25 is a TV distortion diagram for the position pos2. Let x denote the abscissa and y denote the ordinate. Then, (x, y)=(0, 0) represents a point on the light axis.

Figure 26:
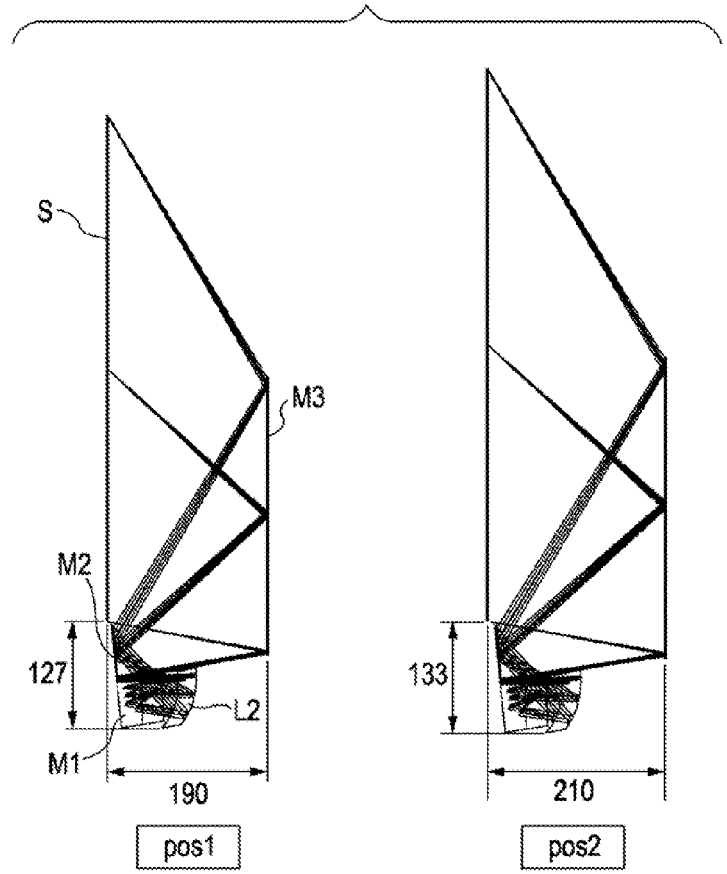
FIG. 26 illustrates an example of application of the optical system according to the third embodiment to a projection display apparatus.
Figure 27:
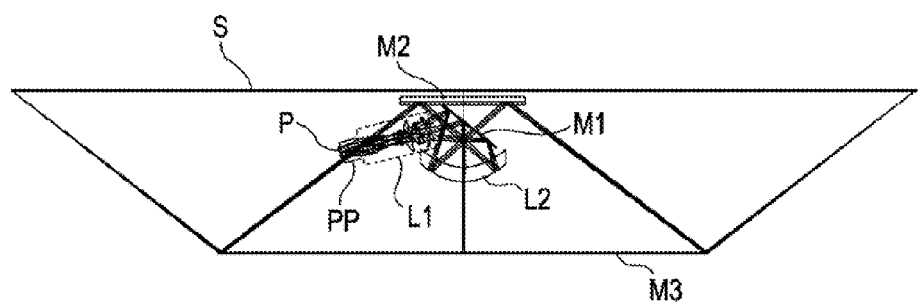
FIG. 27 is a top view of the projection display apparatus shown in FIG. 26.

FIG. 26 illustrates an example of the projection display apparatus of the optical system. The depth and the distance between the lower end of the projection optical system and the lower end of the screen are shown for each of the three positions. The projection display apparatus includes a first optical system L1, a second optical system L2, a planar mirrors M1, M2, and M3, and a screen S serving as a secondary imaging plane. The depths are 190 mm, 210 mm, and 275 mm for the positions pos1 and pos2, respectively. The distances between the lower end of the projection optical system and the lower end of the screen are 127 mm and 133 mm for the positions pos1 and pos2, respectively. In this example, the size above the screen is zero regardless of the type of the projection optical system. FIG. 27 is a top view of the projection display apparatus for the position pos1 shown in FIG. 26. Note that a light source and an illumination system are not shown in FIGS. 26 and 27.

Fourth Embodiment

Figure 28:
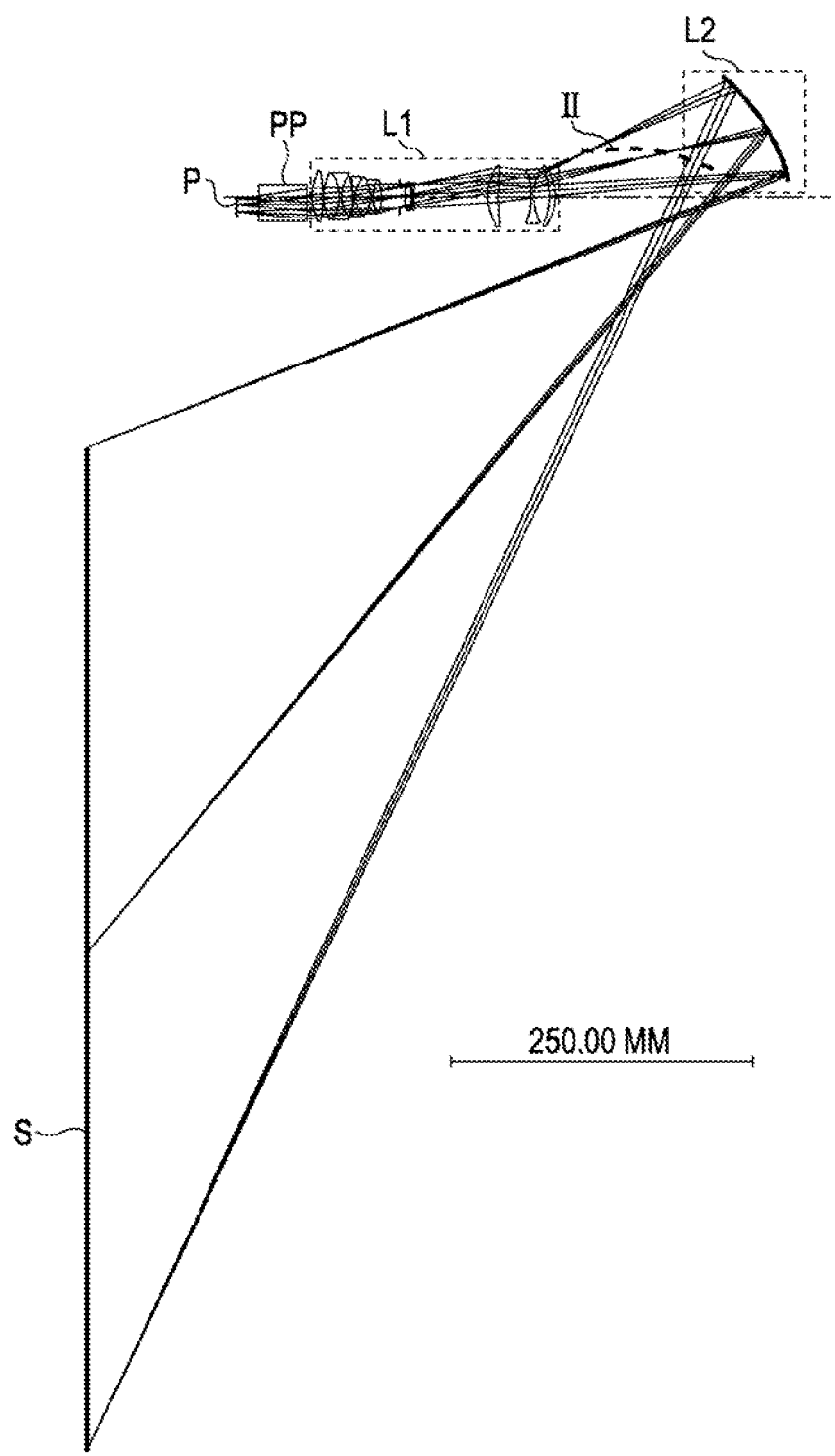
FIG. 28 illustrates a light path according to a fourth embodiment.

FIG. 28 illustrates a light path according to a fourth embodiment. An image display element P serves as a modulating unit. A light ray emitted from a light source (not shown) is modulated by the image display element P on the basis of a video signal. In this way, a primary imaging plane is formed. A reflective or transmissive dot-matrix liquid crystal display panel or a digital micromirror device (DMD) can be used for the image display element P. A reference symbol PP represents a polarizing beam splitter (PBS), a color combining prism that combines video signals of R, G, and B colors, and a total internal reflection (TIR) prism.

Figure 29:
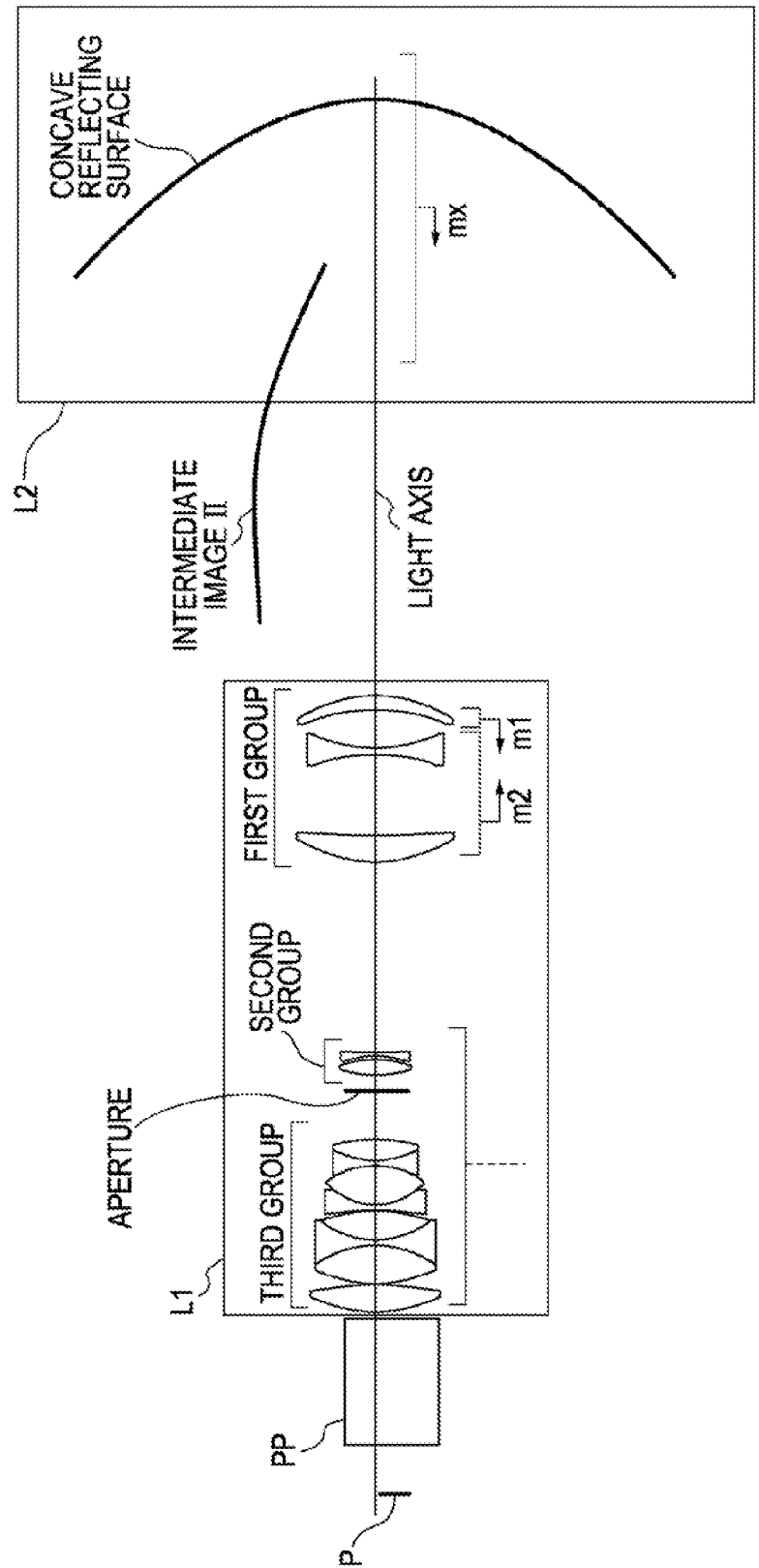
FIG. 29 illustrates a projection optical system portion according to the fourth embodiment.

FIG. 29 illustrates a projection optical system portion shown in FIG. 28 in detail. A first optical system L1 includes a first group having a negative refractive power, a second group having a positive refractive power, an aperture, and a third group having a positive refractive power in this order from the secondary imaging plane side to the side of the image display element P. The lens groups of the first optical system that move in order to change the projection image size and a concave reflecting surface of a second optical system are represented by reference numerals m1, m2, and mx, respectively. The arrows indicate directions in which the groups and the lens are moved when a position pos1 is changed to a position pos3.

Table 16 shows the numeric aperture of the projection optical system and information about the image display device of the projection optical apparatus according to the first embodiment. The numeric aperture on the image display element side is 0.20412. The display element size is 13.440 mm×7.560 mm. Let a point on the light axis be represented as (x, y)=(0, 0). Then, the center point of the display element is represented as (x, y)=(0, −6.1619). The pixel pitch is 7 μm.

TABLE 16

| | |
|---|---|
| NUMERIC APERTURE ON DISPLAY ELEMENT SIDE | 0.20412 |
| DISPLAY ELEMENT SIZE | 13.440 × 7.560 |
| CENTER COORDINATES OF DISPLAY ELEMENT | (x, y) = (0.000, −6.1619) |
| PIXEL PITCH | 7 μm |

According to the fourth embodiment, images having three projection image sizes can be projected. The positions are represented by reference symbols pos1, pos2, and pos3 (refer to Table 17). Let $\phi 1$ denote the refractive power of the first optical system, $\phi 2$ denote the refractive power of the second optical system, $\Delta$ denote the distance between the principle point of the first optical system on an intermediate image side and the concave reflecting surface of the second optical system, and $\phi$ denote the combined refractive power. Then, a combined focal length f can be expressed as follows:

$$1/f = \phi = \phi 1 + \phi 2 - \Delta \cdot \phi 1 \cdot \phi 2.$$

In addition, Table 17 shows the magnification factors and the diagonal inch sizes for the positions. The diagonal inch size indicates the diagonal screen size in the secondary imaging plane. For the position pos1, the diagonal inch size is 52.829 inch. For the position pos2, the diagonal inch size is 58.112 inch. For the position pos3, the diagonal inch size is 63.395 inch.

TABLE 17

| | pos1 | pos2 | pos3 |
|---|---|---|---|
| Combined Focal Length f | 6.0455 | 6.0596 | 6.0711 |
| Magnification Factor | 87.0185 | 95.7203 | 104.4222 |
| Diagonal Inch Size | 52.829 | 58.112 | 63.395 |

Tables 18 to 20 show lens data when specific values are applied to the projection optical system according to the fourth embodiment. In the tables, the surface number increases from S1 to S2, to S3, . . . from the primary imaging plane side (the display element side) to the secondary imaging plane side (the projection image side). The left entry of the surface number indicates whether it is the surface number of the aperture and the aspherical surface. The data concerning the aspherical surfaces are shown in Table 4. The term "variable" in the "distance" column indicates that when the projection image size is changed, the distance is changed. The distances at the three positions are shown in Table 20. The term "INFINITY" in the "radius of curvature" column indicates that the surface is planar. The "index of refraction (ne)" column and the "Abbe number (ve)" column show the values for the e-line (546.1 nm).

TABLE 18

| | | RADIUS OF CURVATURE | DISTANCE | ne | ve |
|---|---|---|---|---|---|
| DISPLAY ELEMENT | | INFINITY | 20.100 | | |
| S1 | | INFINITY | 40.300 | 1.518720 | 64.00 |
| S2 | | INFINITY | 2.000 | | |
| S3 | | 46.765 | 8.822 | 1.518720 | 64.00 |
| S4 | | −119.559 | 0.300 | | |
| S5 | | 43.714 | 12.461 | 1.518720 | 64.00 |
| S6 | | −32.851 | 1.898 | 1.811840 | 33.03 |
| S7 | | 31.519 | 9.313 | 1.812630 | 25.25 |
| S8 | | −54.945 | 0.300 | | |
| S9 | | −92.603 | 1.645 | 1.811840 | 33.03 |
| S10 | | 22.349 | 12.525 | 1.518720 | 64.00 |
| S11 | | −27.508 | 0.392 | | |
| S12 | | −29.746 | 1.395 | 1.811840 | 33.03 |
| S13 | | 26.588 | 7.053 | 1.812630 | 25.25 |
| S14 | APERTURE | −55.174 | 15.774 | | |
| S15 | | INFINITY | 5.000 | | |
| S16 | | 39.021 | 5.231 | 1.518720 | 64.00 |
| S17 | | −35.093 | 1.057 | | |
| S18 | | −35.128 | 1.084 | 1.811840 | 33.03 |
| S19 | | 208.192 | VARIABLE | | |
| S20 | | 46.737 | 8.491 | 1.624080 | 36.04 |
| S21 | | 319.032 | 26.167 | | |
| S22 | | −71.798 | 2.221 | 1.737420 | 50.82 |
| S23 | | 49.921 | VARIABLE | | |
| S24 | | −64.601 | 4.708 | 1.704440 | 29.81 |
| S25 | | −45.631 | VARIABLE | | |
| S26 | ASPHERICAL | −79.471 | VARIABLE | REFLECTING SURFACE | |
| PROJECTION IMAGE SURFACE | | INFINITY | 0.000 | | |

TABLE 19

S26   K: −3.958100
      A: −.497023E−06  B: 0.891293E−10  C: −.131741E−13  D: 0.127304E−17
      E: −.704227E−22  F: 0.167101E−26

TABLE 20

|  | pos1 | pos2 | pos3 |
|---|---|---|---|
| S19 | 61.766 | 62.296 | 62.567 |
| S23 | 12.398 | 11.567 | 10.838 |
| S25 | 192.317 | 191.825 | 191.536 |
| S26 | −576.281 | −630.600 | −684.868 |

Figure 30:
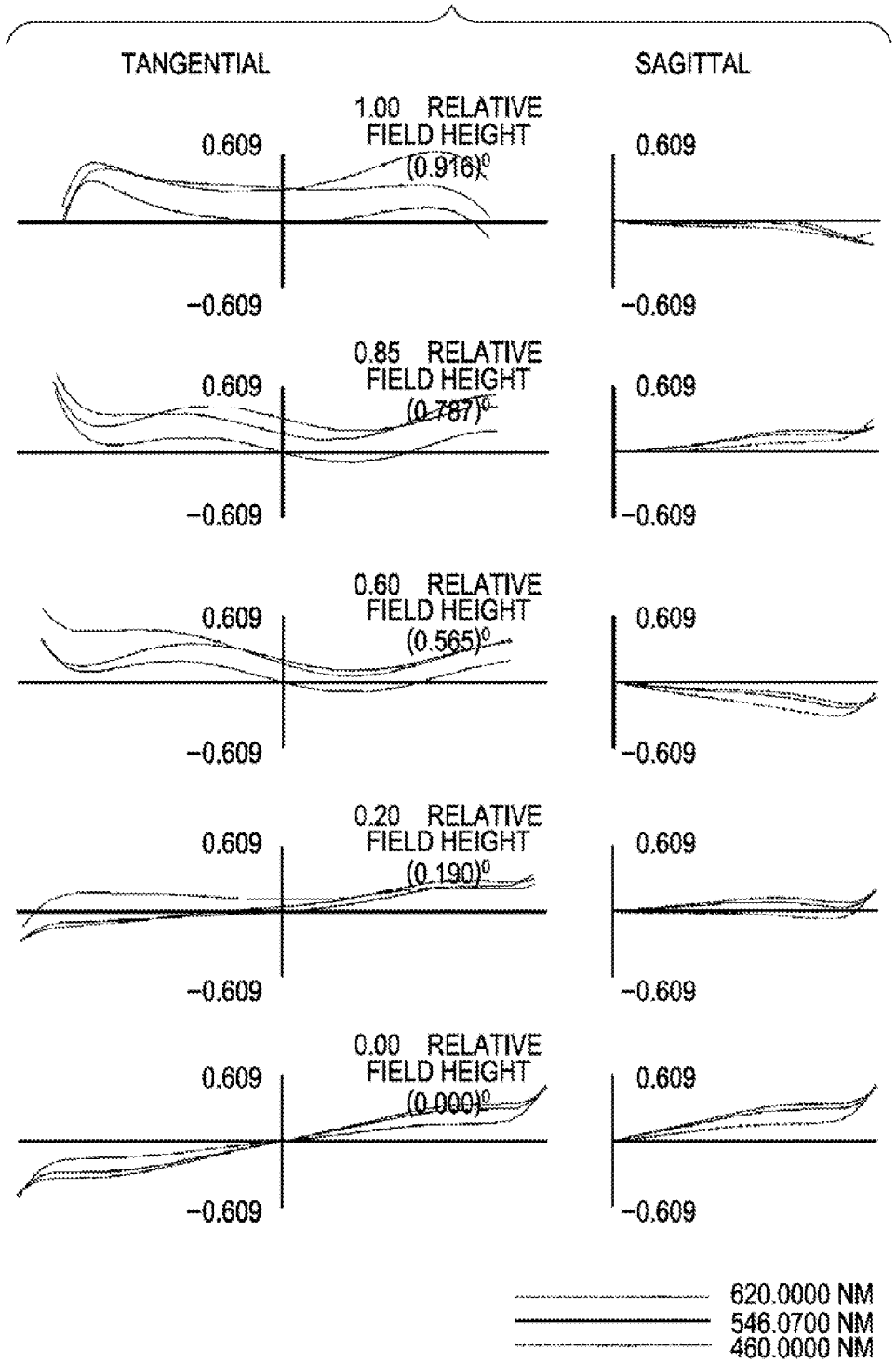
FIG. 30 is a transverse aberration diagram for a position pos1 according to the fourth embodiment.
Figure 31:
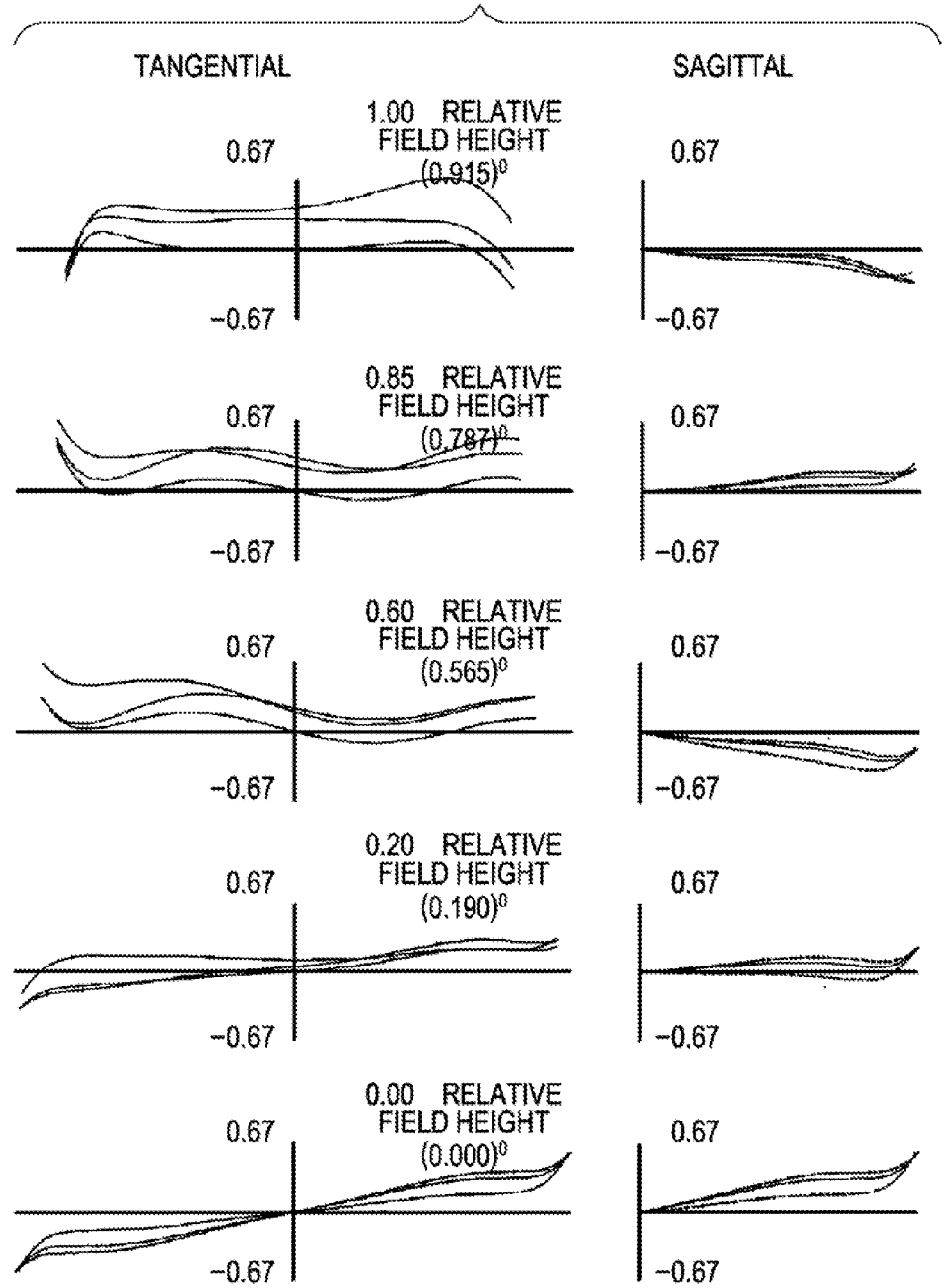
FIG. 31 is a transverse aberration diagram for a position pos2 according to the fourth embodiment.
Figure 32:
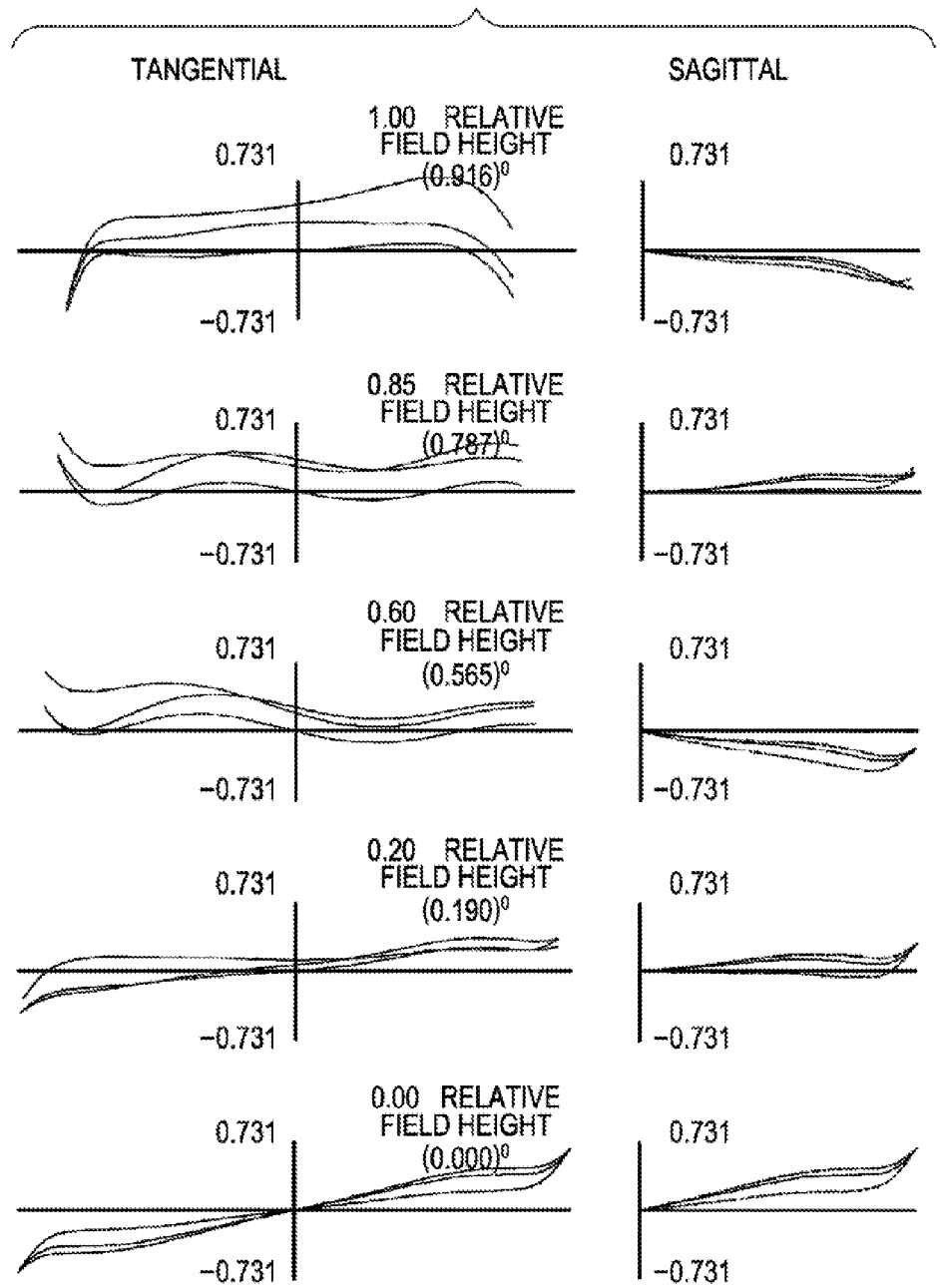
FIG. 32 is a transverse aberration diagram for a position pos3 according to the fourth embodiment.

FIGS. 30 to 32 are transverse aberration diagrams according to the fourth embodiment. The solid line indicates the transverse aberration for a wavelength of 546.07 nm. The dotted line indicates the transverse aberration for a wavelength of 620 nm. The alternate long and short dash line indicates the transverse aberration for a wavelength of 460 nm. FIG. 31 is a transverse aberration diagram for the position pos1. One scale unit represents 0.670 mm, which is a pixel size. FIG. 32 is a transverse aberration diagram for the position pos2. One scale unit represents 0.731 mm, which is a pixel size.

Figure 33:
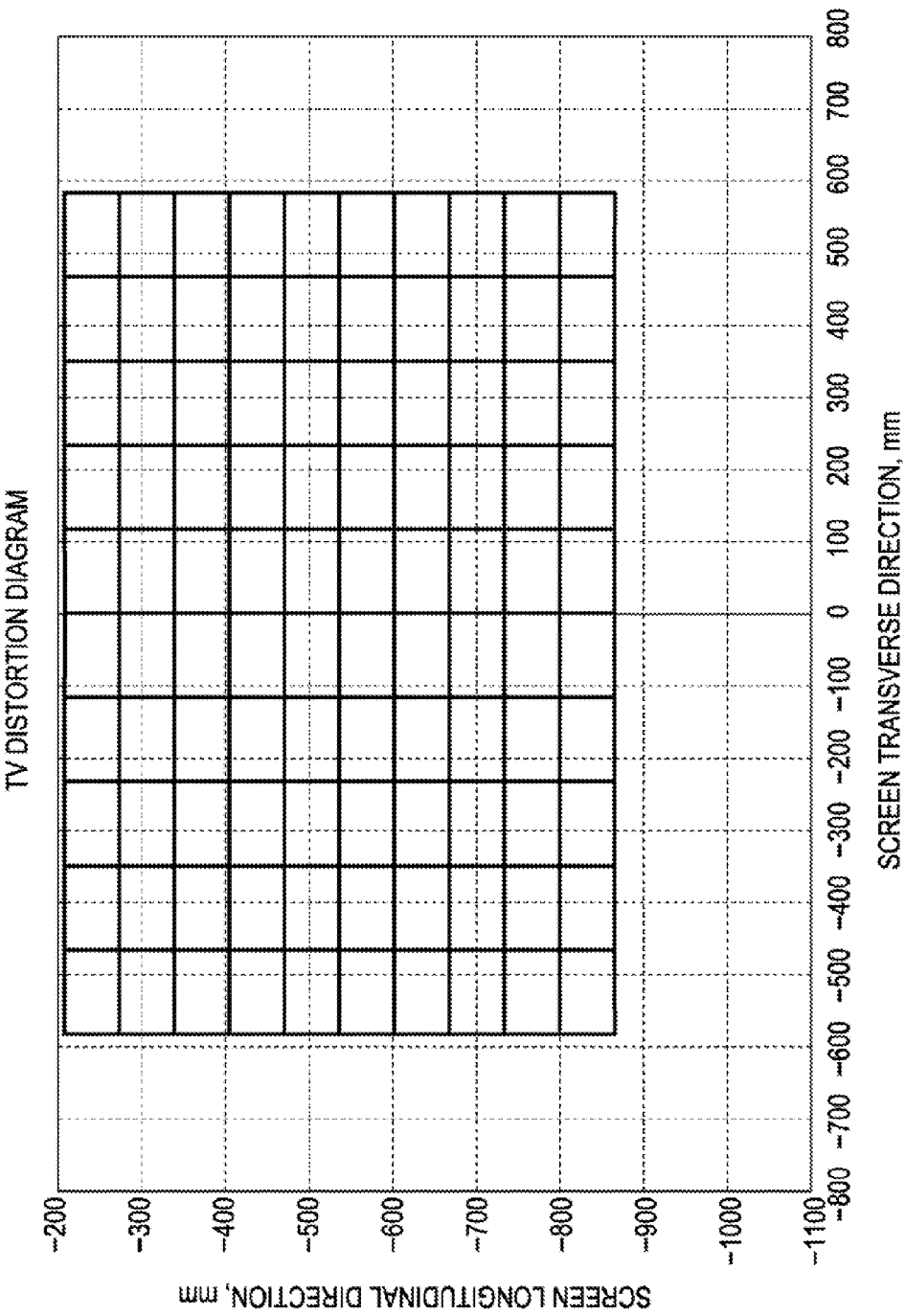
FIG. 33 is a TV distortion diagram for the position pos1 according to the fourth embodiment.
Figure 34:
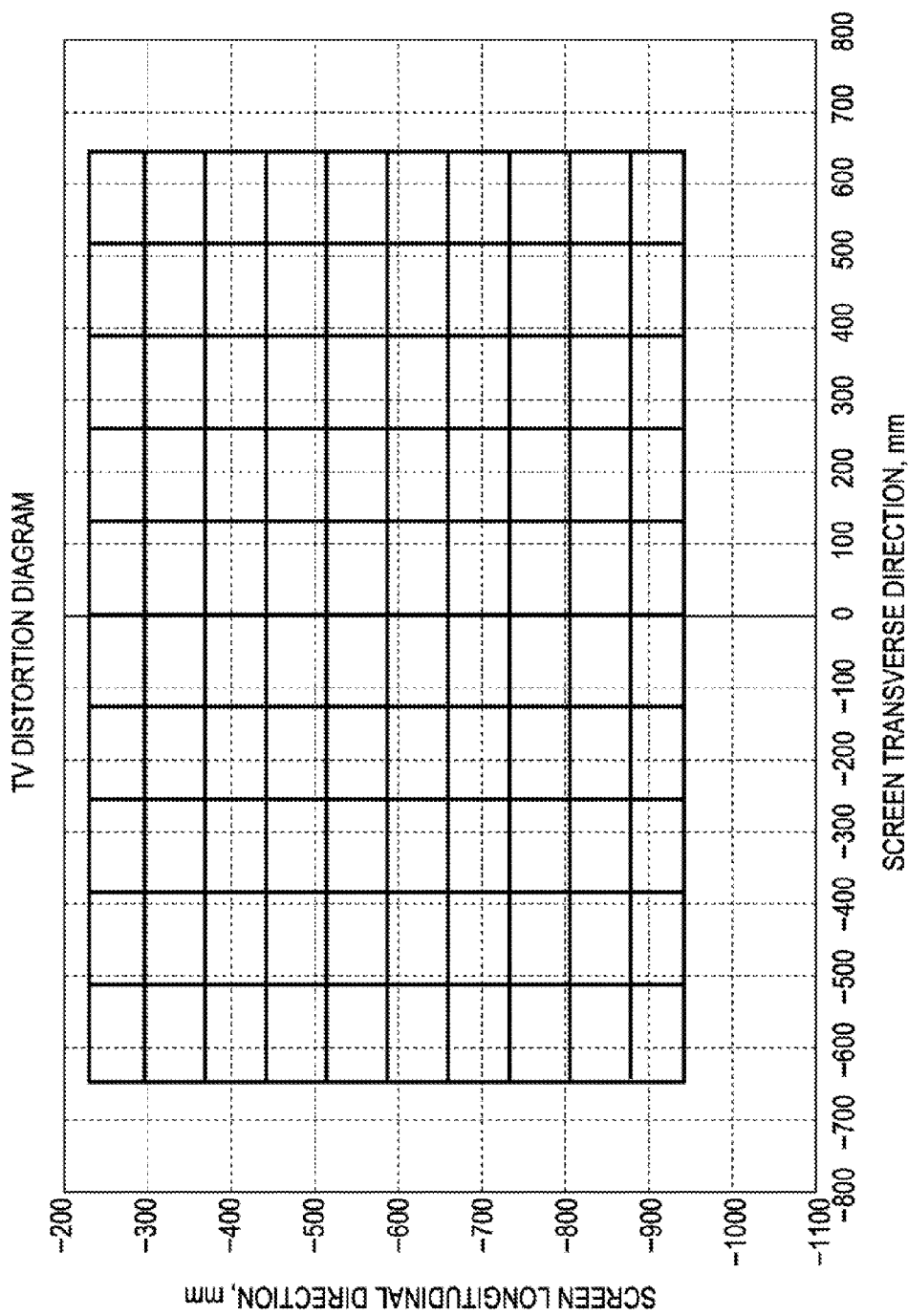
FIG. 34 is a TV distortion diagram for the position pos2 according to the fourth embodiment.
Figure 35:
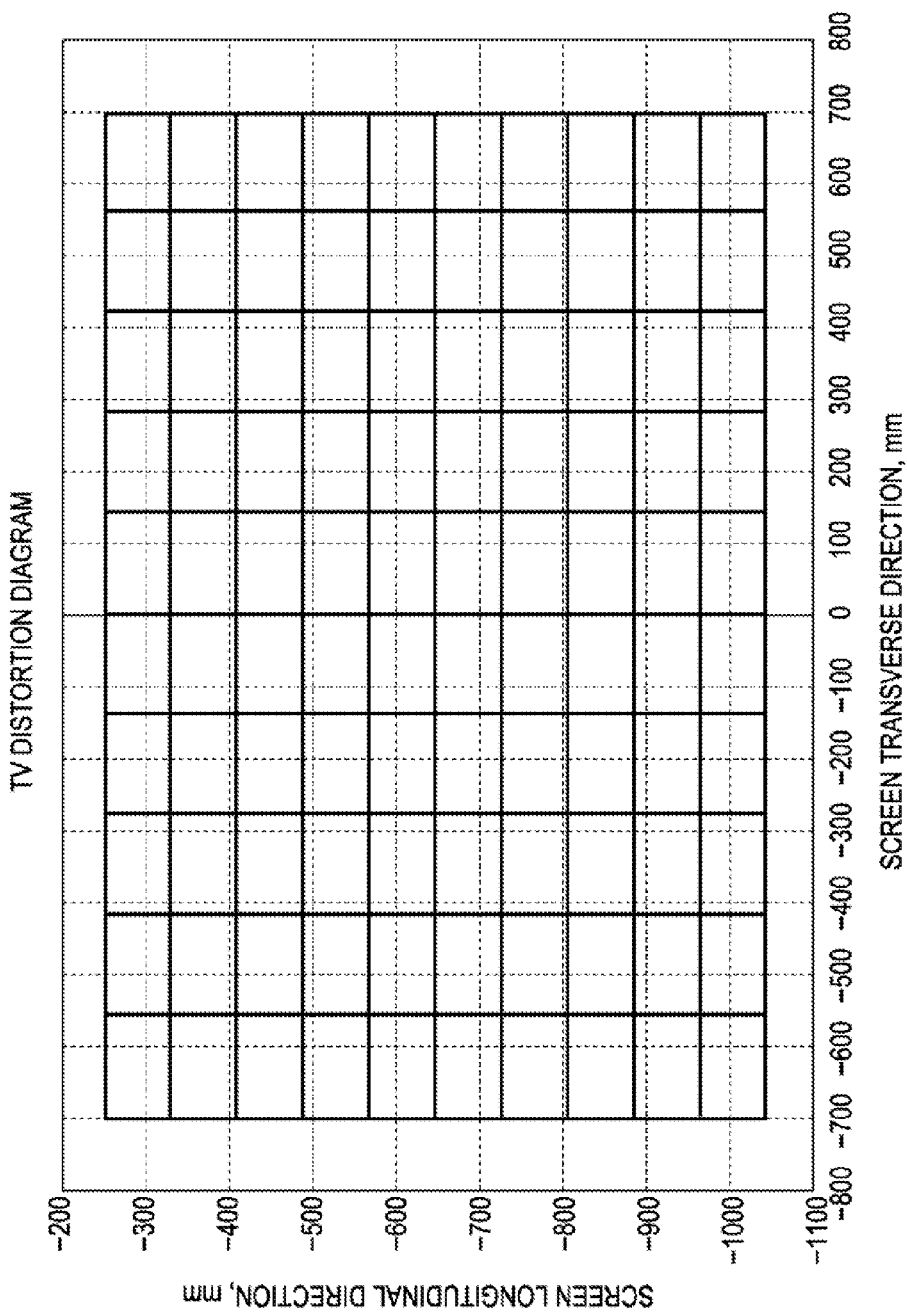
FIG. 35 is a TV distortion diagram for the position pos3 according to the fourth embodiment.

FIGS. 33 to 35 are TV distortion diagrams according to the fourth embodiment. FIG. 33 is a TV distortion diagram for the position pos1. FIG. 34 is a TV distortion diagram for the position pos2. FIG. 35 is a TV distortion diagram for the position pos3. Let x denote the abscissa and y denote the ordinate. Then, (x, y)=(0, 0) represents a point on the light axis.

Figure 36:
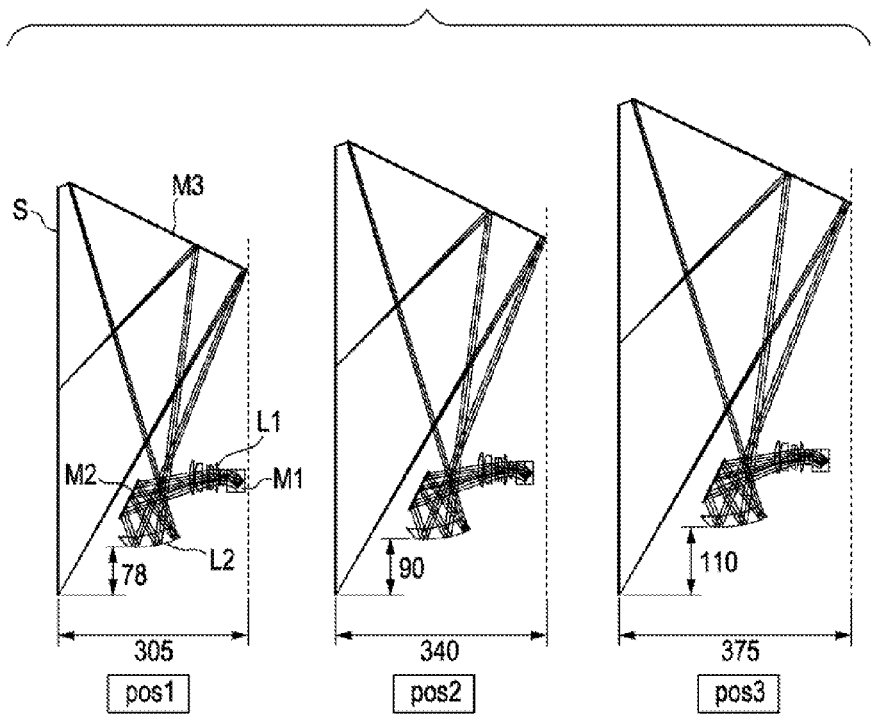
FIG. 36 illustrates an example of application of the optical system according to the fourth embodiment to a projection display apparatus.

FIG. 36 illustrates an example of the projection display apparatus of the optical system. The depth and the distance between the lower end of the projection optical system and the lower end of the screen are shown for each of the three positions. The projection display apparatus includes a first optical system L1, a second optical system L2, a planar mirrors M1, M2, and M3, and a screen S serving as a secondary imaging plane. The depths are 305 mm, 340 mm, and 375 mm for the positions pos1, pos2, and pos3, respectively. The distances between the lower end of the projection optical system and the lower end of the screen are 78 mm, 90 mm, and 110 mm for the positions pos1, pos2, and pos3, respectively. In this example, the size below the screen is zero regardless of the type of the projection optical system.

Figure 37:
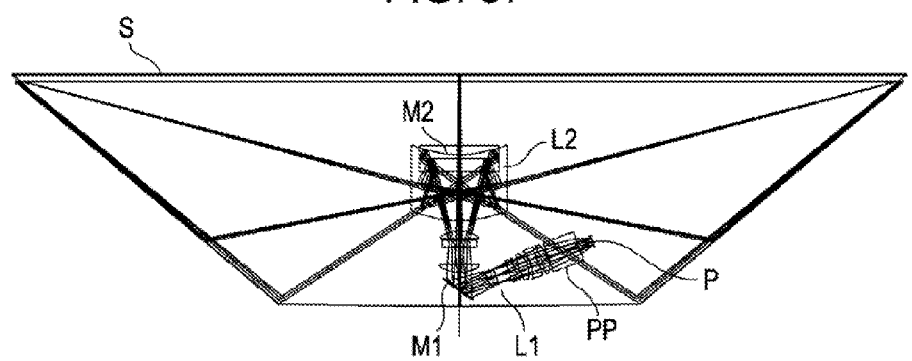
FIG. 37 is a top view of the projection display apparatus shown in FIG. 36.
Figure 38:
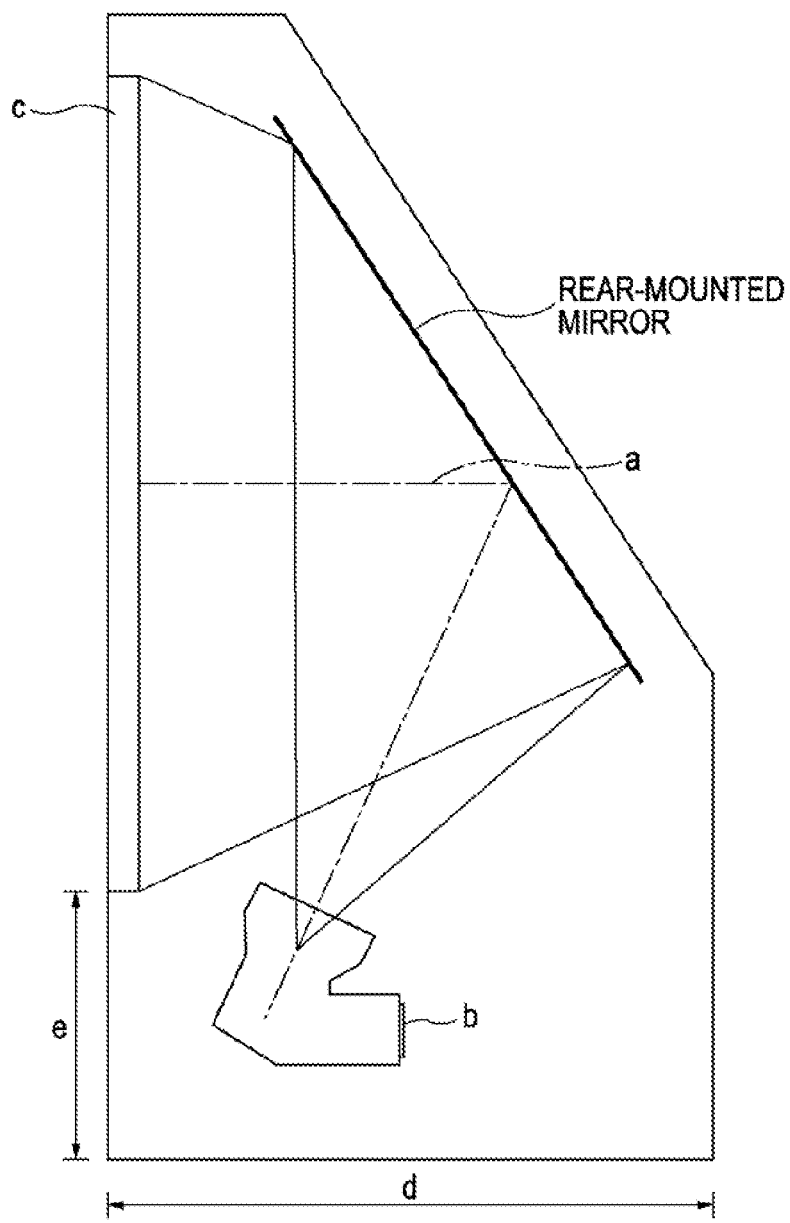
FIG. 38 is a schematic illustration of an example of the related art.
Figure 39:
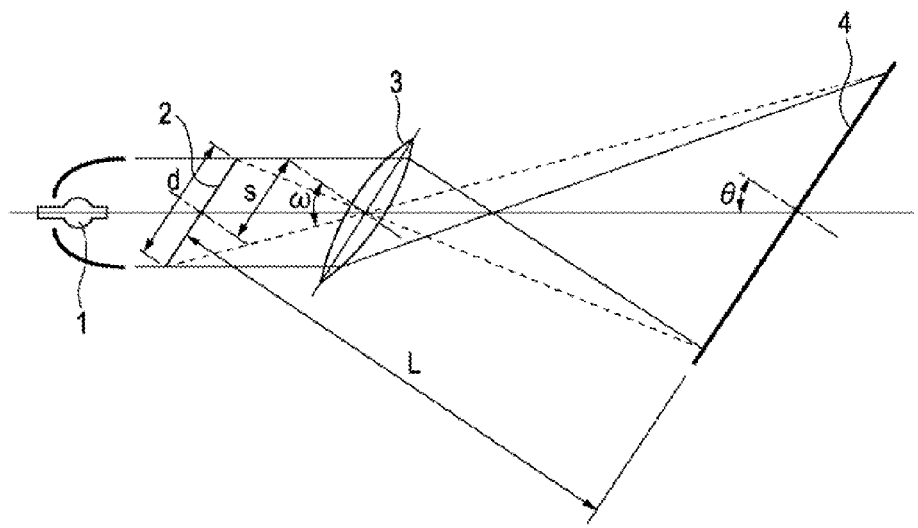
FIG. 39 is a schematic illustration of an example of the related art described in Patent Document 1.
Figure 40:
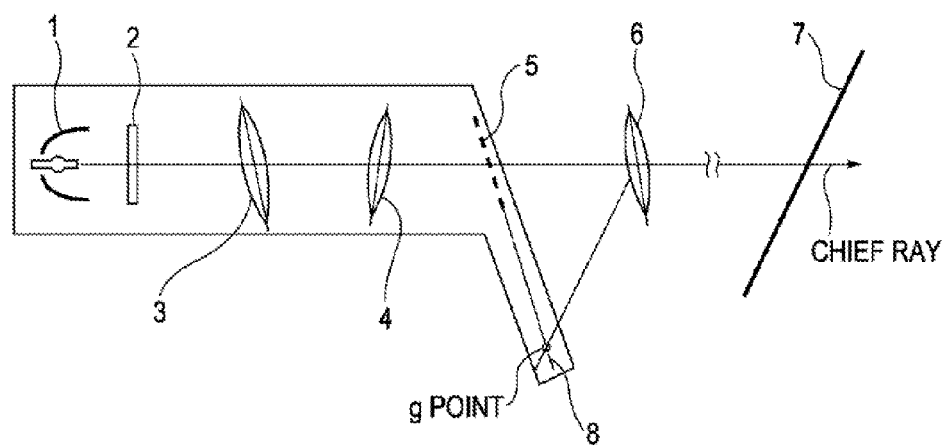
FIG. 40 is a schematic illustration of an example of the related art described in Patent Document 2.
Figure 41:
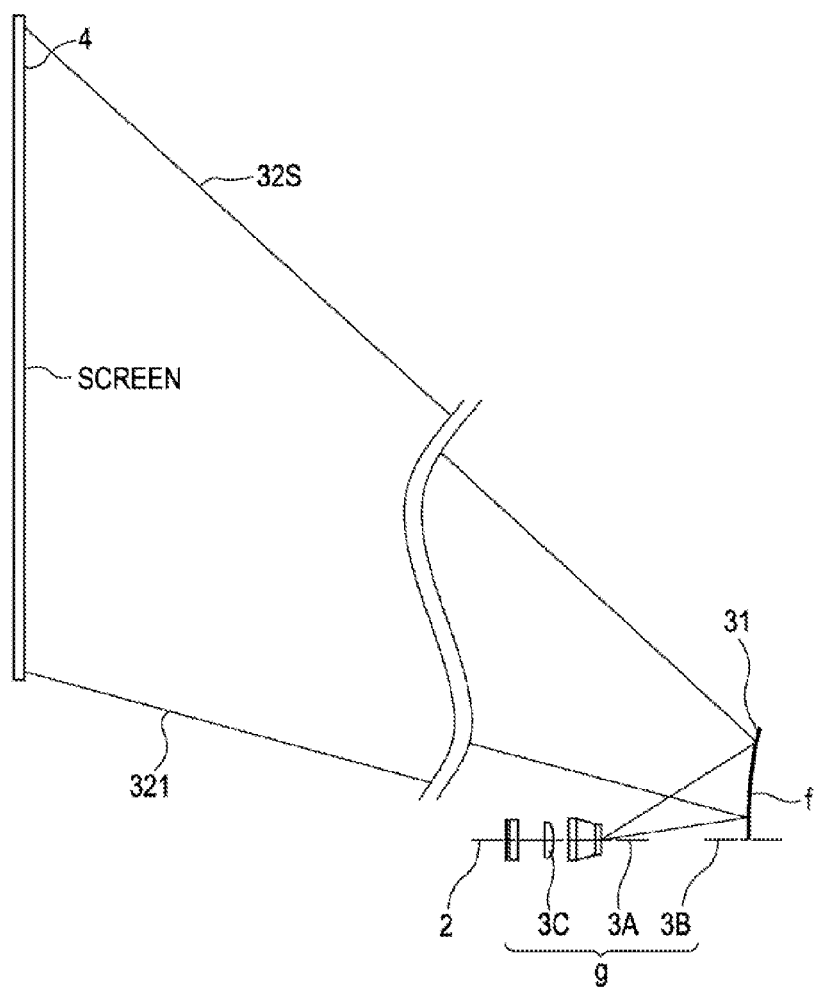
FIG. 41 is a schematic illustration of an example of the related art described in Patent Document 3.
Figure 42:
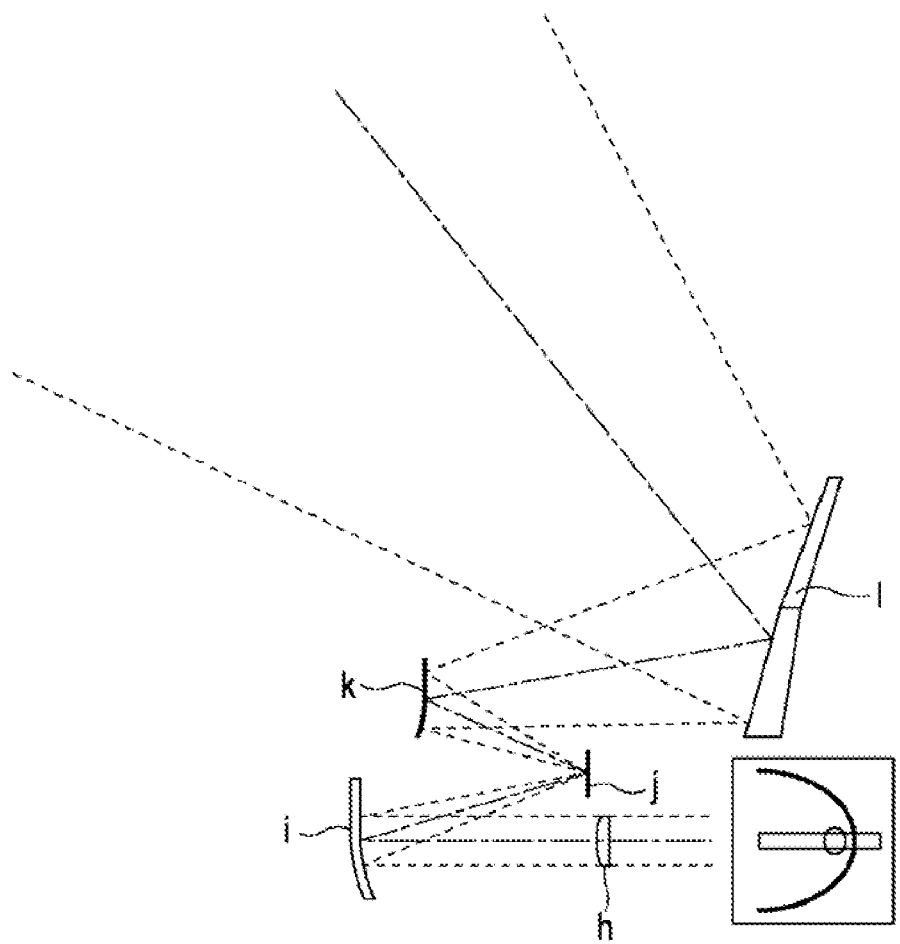
FIG. 42 is a schematic illustration of an example of the related art described in Patent Document 4.
Figure 43:
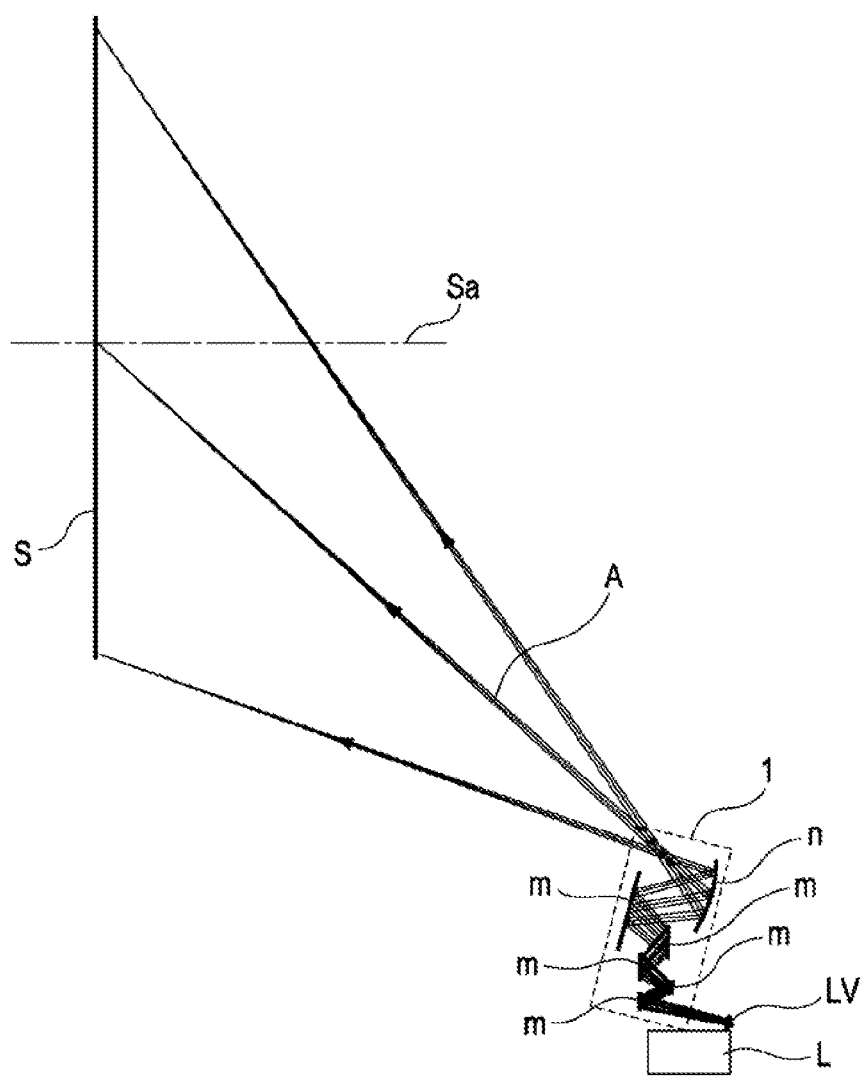
FIG. 43 is a schematic illustration of an example of the related art described in Patent Document 5.
Figure 44:
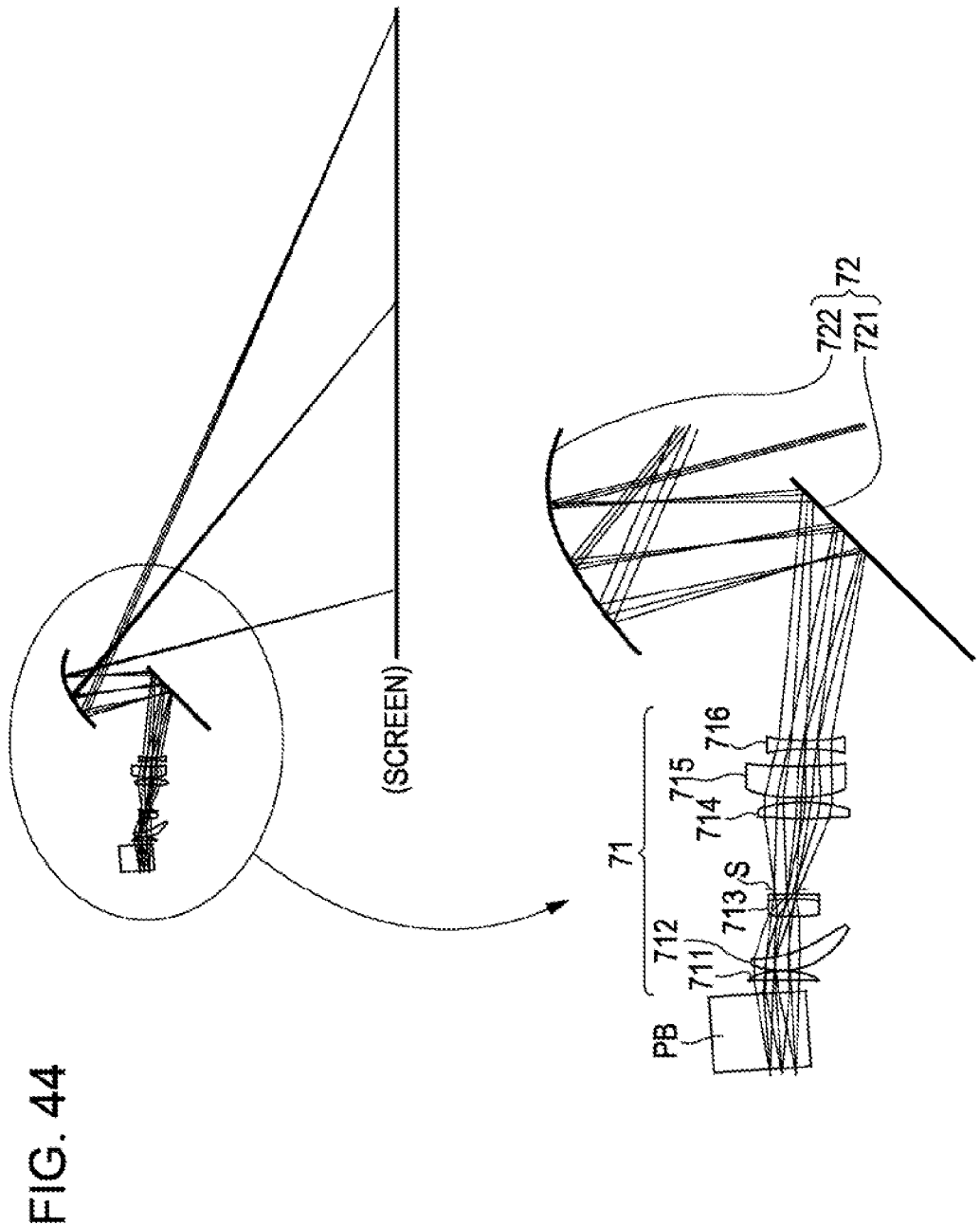
FIG. 44 is a schematic illustration of an example of the related art described in Patent Document 6.
Figure 45:
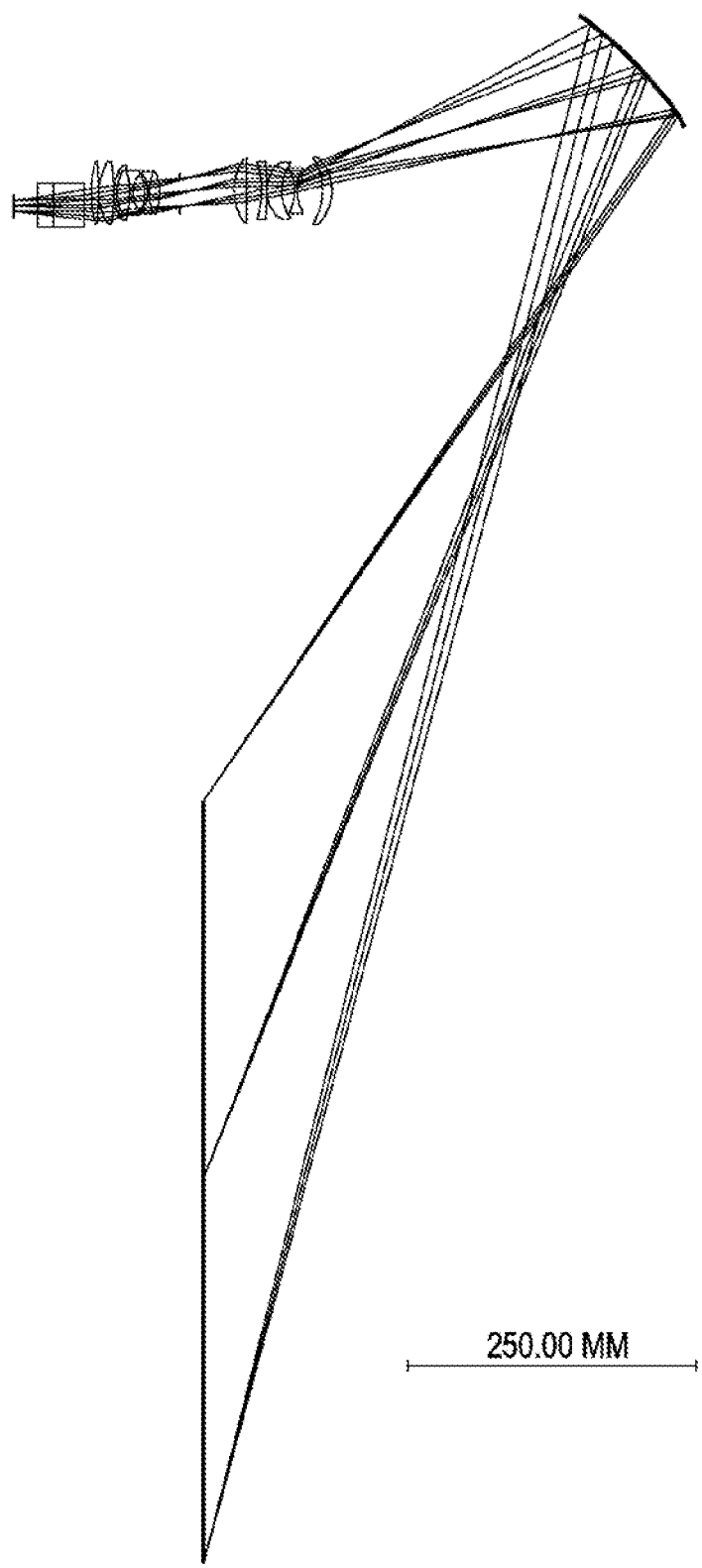
FIG. 45 is a schematic illustration of an example of the related art described in Patent Document 7.

FIG. 37 is a top view of the projection display apparatus for the position pos1 in FIG. 36. An image display element P serving as a primary imaging plane, a prism pp, such as a color combining prism or a PBS, the planar mirrors M1, M2, and M3, and a screen S serving as a secondary imaging plane are shown in FIG. 37. Note that a light source and an illumination system are not shown in FIG. 37.

Table 21 shows values corresponding to those in the conditional expressions related to the projection optical systems according to the first to fourth embodiments. For comparison purpose, the values indicated in the first and second embodiments described in Patent Document 7 (International publication WO2006-043666 A1) are also shown. As can be seen from Table 21, the number of the projection image sizes is only one, and the values exceed the limits of conditional expressions (4), (7), (8), and (9).

TABLE 21

| Conditional Expression | | | Present Invention | | | | Patent Document 7 | | Note |
|---|---|---|---|---|---|---|---|---|---|
| | | | First Embodiment | Second Embodiment | Third Embodiment | Fourth Embodiment | First Embodiment | Second Embodiment | |
| (1) $0.5 < \phi1/\phi2 < 3$ | | pos1 | 1.314 | 1.315 | 1.306 | 1.158 | 1.195 | 1.219 | |
| | | pos2 | 1.332 | 1.330 | 1.311 | 1.165 | (-) | (-) | |
| | | pos3 | 1.361 | 1.351 | (-) | 1.171 | (-) | (-) | |
| (2) $1 < AST/ASS < 5$ | 0.3H | pos1 | 2.221 | 2.243 | 1.832 | 1.882 | 2.378 | 2.447 | |
| | | pos2 | 2.213 | 2.233 | 1.829 | 1.877 | (-) | (-) | |
| | | pos3 | 2.200 | 2.220 | (-) | 1.872 | (-) | (-) | |
| | 0.6H | pos1 | 2.064 | 2.078 | 1.743 | 1.823 | 2.184 | 2.239 | |
| | | pos2 | 2.058 | 2.073 | 1.742 | 1.821 | (-) | (-) | |
| | | pos3 | 2.048 | 2.064 | (-) | 1.818 | (-) | (-) | |
| | 0.85H | pos1 | 1.879 | 1.886 | 1.661 | 1.756 | 1.903 | 1.920 | |
| | | pos2 | 1.874 | 1.881 | 1.661 | 1.754 | (-) | (-) | |
| | | pos3 | 1.865 | 1.874 | (-) | 1.754 | (-) | (-) | |
| | 1.0H | pos1 | 1.798 | 1.800 | 1.615 | 1.708 | 1.768 | 1.789 | |
| | | pos2 | 1.794 | 1.792 | 1.617 | 1.708 | (-) | (-) | |
| | | pos3 | 1.787 | 1.782 | (-) | 1.707 | (-) | (-) | |
| (3) $0 < |AST|/L12 < 1$ | 0.3H | pos1 | 0.117 | 0.114 | 0.090 | 0.082 | 0.120 | 0.104 | |
| | | pos2 | 0.118 | 0.114 | 0.090 | 0.082 | (-) | (-) | |
| | | pos3 | 0.119 | 0.113 | (-) | 0.081 | (-) | (-) | |
| | 0.6H | pos1 | 0.415 | 0.414 | 0.302 | 0.290 | 0.428 | 0.410 | |
| | | pos2 | 0.417 | 0.414 | 0.302 | 0.288 | (-) | (-) | |
| | | pos3 | 0.420 | 0.411 | (-) | 0.287 | (-) | (-) | |
| | 0.85H | pos1 | 0.645 | 0.647 | 0.498 | 0.499 | 0.647 | 0.627 | |
| | | pos2 | 0.647 | 0.646 | 0.498 | 0.497 | (-) | (-) | |
| | | pos3 | 0.649 | 0.643 | (-) | 0.494 | (-) | (-) | |
| | 1.0H | pos1 | 0.755 | 0.756 | 0.606 | 0.618 | 0.740 | 0.724 | |
| | | pos2 | 0.756 | 0.755 | 0.606 | 0.615 | (-) | (-) | |
| | | pos3 | 0.759 | 0.750 | (-) | 0.611 | (-) | (-) | |
| (4) $-3 < K\_rel$ | | | −1.5 | −1.5 | −1.5 | 0.6 | −5.8 | −5.8 | closest to lower limit |
| (5) $0.7 < \Delta P$ | | | 0.86 | 0.86 | 0.86 | 0.75 | 3.82 | 3.82 | largest $\Delta P$ |
| (6) $\Delta P < -0.3$ | | | −0.49 | −0.49 | −1.28 | −0.49 | −0.49 | −0.49 | smallest $\Delta P$ |

TABLE 21-continued

| | | | Present Invention | | | | Patent Document 7 | | |
|---|---|---|---|---|---|---|---|---|---|
| | Conditional Expression | | First Embodiment | Second Embodiment | Third Embodiment | Fourth Embodiment | First Embodiment | Second Embodiment | Note |
| (7) | $|\Delta\alpha| < 45$ | | 20 | 20 | 34 | 20 | 60 | 60 | closest to upper limit |
| (8) | $-0.3 < \phi\_p1/\phi1 < 0.05$ | pos1 | −0.040 | −0.097 | −0.042 | (-) | 0.108 | 0.106 | |
| | | pos2 | −0.039 | −0.096 | −0.042 | (-) | (-) | (-) | |
| | | pos3 | −0.038 | −0.094 | (-) | (-) | (-) | (-) | |
| (9) | $-35 < \beta < 35$ | | −19.17 | −29.33 | −16.75 | (-) | −38.90 | −38.74 | |

Tables 22 and 23 and Tables 24 to 26 show values relating to items shown in Table 21. In Table 22, the refractive powers of the first and second optical systems and the curvature of field of the first optical system and the like are shown. Table 23 shows the names of glass materials available from HOYA corporation and OHARA corporation and their physical property values including the indices of refraction and the dispersion that are the closest to those used in the above-described embodiments. Conditional expressions (4), (5), (6), and (7) shown in Table 21 are derived using the values for the glass materials available from HOYA corporation. Tables 24 to 26 are referenced when the values for the "expression (9)" in Table 21 are computed. The values surrounded by bold lines in Tables 24 to 26 appear in Table 21.

TABLE 22

| | | | First Embodiment | Second Embodiment | Third Embodiment | Fourth Embodiment |
|---|---|---|---|---|---|---|
| | f | pos1 | 4.4365 | 4.4315 | 4.8409 | 6.0455 |
| | | pos2 | 4.4131 | 4.4174 | 4.8501 | 6.0596 |
| | | pos3 | 4.3705 | 4.4035 | (-) | 6.0711 |
| | $\phi$ | pos1 | 0.22541 | 0.22566 | 0.20657 | 0.16541 |
| | | pos2 | 0.2266 | 0.22638 | 0.20618 | 0.16503 |
| | | pos3 | 0.22881 | 0.22709 | (-) | 0.16472 |
| | $\phi1$ | pos1 | 0.02998 | 0.03 | 0.04779 | 0.02914 |
| | | pos2 | 0.03039 | 0.03033 | 0.04797 | 0.02932 |
| | | pos3 | 0.03105 | 0.03083 | (-) | 0.02947 |
| | F2 | | 43.83 | 43.831 | 27.324 | 39.735 |
| | $\phi2$ | | 0.02282 | 0.02282 | 0.0366 | 0.02517 |
| | $\phi1 + \phi2$ | pos1 | 0.0528 | 0.05281 | 0.08439 | 0.05431 |
| | | pos2 | 0.0532 | 0.05315 | 0.08457 | 0.05448 |
| | | pos3 | 0.05386 | 0.05364 | (-) | 0.05463 |
| | $\Delta \cdot \phi1 \cdot \phi2$ | pos1 | 0.2782 | 0.27847 | 0.29096 | 0.21972 |
| | | pos2 | 0.2798 | 0.27953 | 0.29075 | 0.21951 |
| | | pos3 | 0.28267 | 0.28074 | (-) | 0.21935 |
| | $\Delta$ | pos1 | 406.686 | 406.866 | 166.351 | 299.593 |
| | | pos2 | 403.598 | 403.902 | 165.608 | 297.519 |
| | | pos3 | 399.037 | 399.14 | (-) | 295.774 |
| | $\phi \cdot p1$ | | −0.00119 | −0.0029 | −0.002 | (-) |
| | $\phi1\_1$ | pos1 | −0.00923 | −0.00564 | −0.02188 | −0.00057 |
| | | pos2 | −0.00938 | −0.00572 | −0.02188 | −0.00059 |
| | | pos3 | −0.00956 | −0.00583 | (-) | −0.0006 |
| | $\phi1\_2$ | pos1 | 0.0053 | 0.00303 | 0.02664 | 0.00242 |
| | | pos2 | 0.00534 | 0.00304 | 0.02664 | 0.00242 |
| | | pos3 | 0.0054 | 0.00306 | (-) | 0.00242 |
| | $\phi1\_3$ | pos1 | 0.01922 | 0.01572 | 0.03359 | 0.01806 |
| | | pos2 | (-) | (-) | 0.03358 | (-) |
| | | pos3 | (-) | (-) | (-) | (-) |
| | L12 | pos1 | 308.901 | 307.689 | 121.018 | 192.317 |
| | | pos2 | 307.124 | 305.758 | 120.458 | 191.825 |
| | | pos3 | 304.585 | 302 | | 191.536 |
| AST | 0.3H | pos1 | −36.265 | −35.179 | −10.877 | −15.808 |
| | | pos2 | −36.166 | −34.876 | −10.804 | −15.642 |
| | | pos3 | −36.136 | −34.168 | (-) | −15.496 |
| | 0.6H | pos1 | −128.308 | −127.443 | −36.555 | −55.82 |
| | | pos2 | −127.984 | −126.516 | −36.358 | −55.314 |
| | | pos3 | −127.805 | −124.26 | (-) | −54.878 |
| | 0.85H | pos1 | −199.391 | −198.96 | −60.235 | −96.025 |
| | | pos2 | −198.627 | −197.492 | −59.99 | −95.249 |
| | | pos3 | −197.808 | −194.105 | (-) | −94.596 |
| | 1.0H | pos1 | −233.366 | −232.754 | −73.278 | −118.812 |
| | | pos2 | −232.313 | −230.729 | −73.039 | −117.88 |
| | | pos3 | −231.05 | −226.43 | (-) | −117.106 |
| | 0.3H | pos1 | −16.332 | −15.686 | −5.937 | −8.402 |
| | | pos2 | −16.345 | −15.616 | −5.908 | −8.335 |
| | | pos3 | −16.427 | −15.393 | (-) | −8.276 |
| | 0.6H | pos1 | −62.164 | −61.331 | −20.967 | −30.618 |
| | | pos2 | −62.178 | −61.039 | −20.871 | −30.383 |

TABLE 22-continued

|   |   |   | First Embodiment | Second Embodiment | Third Embodiment | Fourth Embodiment |
|---|---|---|---|---|---|---|
| ASS |  | pos3 | −62.401 | −60.214 | (-) | −30.181 |
|  |  | pos1 | −106.108 | −105.518 | −36.272 | −54.697 |
|  | 0.85H | pos2 | −105.985 | −105.015 | −36.118 | −54.29 |
|  |  | pos3 | −106.083 | −103.605 | (-) | −53.947 |
|  |  | pos1 | −129.826 | −129.285 | −45.36 | −69.55 |
|  | 1.0H | pos2 | −129.492 | −128.76 | −45.176 | −69.033 |
|  |  | pos3 | −129.298 | −127.086 | (-) | −68.604 |

TABLE 23

| ne | νe | Name of Glass Material |  | K_r | ΔP | α |
|---|---|---|---|---|---|---|
| 1.48914 | 70.44 | HOYA | FC5 | −1.5 | 0.86 | 93 |
|  |  | OHARA | SFSL5 | −1.1 | 0.78 | 90 |
| 1.59142 | 61.01 | HOYA | BACD5 | 3.7 | 0.01 | 57 |
|  |  | OHARA | SBAL35 | 3.3 | 0.10 | 57 |
| 1.81184 | 33.27 | HOYA | NBFD15 | 4.7 | −0.49 | 73 |
|  |  | OHARA | (-) | (-) | (-) | (-) |
| 1.85505 | 23.60 | HOYA | FDS90 | 0.6 | 0.79 | 90 |
|  |  | OHARA | STIH53 | −0.7 | 0.92 | 91 |
| 1.51872 | 64.00 | HOYA | BSC7 | 2.3 | 0.04 | 73 |
|  |  | OHARA | SBSL7 | 2.2 | 0.14 | 72 |
| 1.81263 | 25.25 | HOYA | FD60 | 0.5 | 0.75 | 93 |
|  |  | OHARA | STIH6 | −0.4 | 0.80 | 89 |
| 1.83930 | 37.09 | HOYA | NBFD10 | 8.5 | −0.62 | 59 |
|  |  | OHARA | SLAH60 | 6.4 | −0.81 | 56 |
| 1.77621 | 49.39 | HOYA | TAF1 | 4.9 | −1.09 | 59 |
|  |  | OHARA | SLAH66 | 3.7 | −0.97 | 62 |
| 1.81081 | 40.49 | HOYA | NBFD13 | 5.7 | −1.18 | 57 |
|  |  | OHARA | SLAH53 | 5.6 | −0.83 | 59 |
| 1.76167 | 27.31 | HOYA | EFD4 | 1.6 | 0.46 | 87 |
|  |  | OHARA | STIH4 | 0.7 | 0.62 | 85 |
| 1.74690 | 48.99 | HOYA | NBF1 | 7.9 | −1.28 | 53 |
|  |  | OHARA | SLAM60 | 6.4 | −0.92 | 54 |
| 1.62286 | 60.10 | HOYA | BACD16 | 2.4 | −0.13 | 60 |
|  |  | OHARA | SBSM16 | 1.4 | 0.14 | 67 |
| 1.65222 | 33.58 | HOYA | EFD2 | 1.4 | 0.05 | 88 |
|  |  | OHARA | STIM22 | 1.1 | 0.18 | 83 |
| 1.69980 | 55.25 | HOYA | LAC14 | 3.9 | −0.75 | 59 |
|  |  | OHARA | SLAL14 | 3.4 | −0.70 | 57 |
| 1.51978 | 52.15 | HOYA | ECF6 | 0.6 | 0.16 | 82 |
|  |  | OHARA | (-) | (-) | (-) | (-) |
| 1.57125 | 55.78 | HOYA | BAC4 | 7.0 | −0.06 | 54 |
|  |  | OHARA | SBAL14 | 1.3 | 0.01 | 80 |
| 1.62408 | 36.04 | HOYA | EF2 | 2.1 | 0.00 | 83 |
|  |  | OHARA | STIM2 | 1.9 | −0.12 | 81 |
| 1.73742 | 50.82 | HOYA | TAC4 | 6.7 | −0.96 | 52 |
|  |  | OHARA | (-) | (-) | (-) | (-) |
| 1.70444 | 29.81 | HOYA | EFD15 | 1.8 | 0.35 | 87 |
|  |  | OHARA | STIM35 | 2.3 | 0.38 | 75 |

TABLE 24

| h(mm) | Z(mm) | dZ/dh$^{(degree)}$ |
|---|---|---|
| S27 |  |  |
| 0.0 | 0.00000 | 0.00000 |
| 1.0 | 0.00053 | 0.06105 |
| 2.0 | 0.00215 | 0.12588 |
| 3.0 | 0.00496 | 0.19767 |
| 4.0 | 0.00911 | 0.27845 |
| 5.0 | 0.01474 | 0.36864 |
| 6.0 | 0.02202 | 0.46666 |
| 7.0 | 0.03105 | 0.56879 |
| 8.0 | 0.04186 | 0.66908 |
| 9.0 | 0.05435 | 0.75951 |
| 10.0 | 0.06826 | 0.83025 |
| 11.0 | 0.08316 | 0.87001 |
| 12.0 | 0.09838 | 0.86651 |
| 13.0 | 0.11308 | 0.80687 |
| 14.0 | 0.12615 | 0.67795 |
| 15.0 | 0.13626 | 0.46645 |
| 16.0 | 0.14187 | 0.15884 |
| 17.0 | 0.14117 | −0.25909 |
| 18.0 | 0.13209 | −0.80293 |
| 19.0 | 0.11230 | −1.49064 |
| 20.0 | 0.07909 | −2.34338 |
| 21.0 | 0.02934 | −3.38601 |
| 22.0 | −0.04053 | −4.64632 |
| 23.0 | −0.13467 | −6.15198 |
| 24.0 | −0.25774 | −7.92377 |
| 25.0 | −0.41474 | −9.96323 |
| 26.0 | −0.61064 | −12.23316 |
| 27.0 | −0.84942 | −14.62972 |
| 28.0 | −1.13255 | −16.94560 |
| 29.0 | −1.45635 | −18.82065 |
| S28 |  |  |
| 0.0 | 0.00000 | 0.00000 |
| 1.0 | 0.00174 | 0.19944 |
| 2.0 | 0.00699 | 0.40353 |
| 3.0 | 0.01587 | 0.61630 |
| 4.0 | 0.02857 | 0.84064 |
| 5.0 | 0.04530 | 1.07782 |
| 6.0 | 0.06627 | 1.32717 |
| 7.0 | 0.09169 | 1.58588 |
| 8.0 | 0.12167 | 1.84905 |
| 9.0 | 0.15624 | 2.10980 |
| 10.0 | 0.19528 | 2.35956 |
| 11.0 | 0.23853 | 2.58851 |
| 12.0 | 0.28552 | 2.78597 |
| 13.0 | 0.33561 | 2.94086 |
| 14.0 | 0.38795 | 3.04205 |
| 15.0 | 0.44152 | 3.07861 |
| 16.0 | 0.49508 | 3.03982 |
| 17.0 | 0.54722 | 2.91505 |
| 18.0 | 0.59636 | 2.69341 |
| 19.0 | 0.64068 | 2.36321 |
| 20.0 | 0.67819 | 1.91136 |
| 21.0 | 0.70663 | 1.32269 |
| 22.0 | 0.72347 | 0.57953 |
| 23.0 | 0.72584 | −0.33844 |
| 24.0 | 0.71051 | −1.45373 |
| 25.0 | 0.67379 | −2.78985 |
| 26.0 | 0.61160 | −4.36910 |
| 27.0 | 0.51941 | −6.20934 |
| 28.0 | 0.39232 | −8.32006 |
| 29.0 | 0.22518 | −10.69811 |
| 30.0 | 0.01273 | −13.32456 |
| 31.0 | −0.25020 | −16.16433 |
| 32.0 | −0.56857 | −19.17059 |

TABLE 25

| h(mm) | Z(mm) | dZ/dh$^{(degree)}$ |
|---|---|---|
| S25 |  |  |
| 0.0 | 0.00000 | 0.00000 |
| 1.0 | −0.00096 | −0.11003 |
| 2.0 | −0.00387 | −0.22492 |

TABLE 25-continued

| h(mm) | Z(mm) | dZ/dh$^{(degree)}$ |
|---|---|---|
| 3.0 | −0.00886 | −0.34944 |
| 4.0 | −0.01615 | −0.48821 |
| 5.0 | −0.02601 | −0.64568 |
| 6.0 | −0.03882 | −0.82619 |
| 7.0 | −0.05502 | −1.03412 |
| 8.0 | −0.07511 | −1.27403 |
| 9.0 | −0.09971 | −1.55087 |
| 10.0 | −0.12951 | −1.87013 |
| 11.0 | −0.16530 | −2.23798 |
| 12.0 | −0.20799 | −2.66117 |
| 13.0 | −0.25862 | −3.14690 |
| 14.0 | −0.31836 | −3.70244 |
| 15.0 | −0.38850 | −4.33472 |
| 16.0 | −0.47045 | −5.04987 |
| 17.0 | −0.56575 | −5.85300 |
| 18.0 | −0.67603 | −6.74854 |
| 19.0 | −0.80301 | −7.74144 |
| 20.0 | −0.94857 | −8.83987 |
| 21.0 | −1.11482 | −10.05994 |
| 22.0 | −1.30436 | −11.43301 |
| 23.0 | −1.52065 | −13.01594 |
| 24.0 | −1.76869 | −14.90419 |
| 25.0 | −2.05604 | −17.24590 |
| 26.0 | −2.39427 | −20.25178 |
| 27.0 | −2.80114 | −24.18786 |
| 28.0 | −3.30335 | −29.32618 |
| S26 | | |
| 0.0 | 0.00000 | 0.00000 |
| 1.0 | 0.00197 | 0.22573 |
| 2.0 | 0.00786 | 0.44726 |
| 3.0 | 0.01754 | 0.66038 |
| 4.0 | 0.03083 | 0.86086 |
| 5.0 | 0.04749 | 1.04442 |
| 6.0 | 0.06717 | 1.20670 |
| 7.0 | 0.08947 | 1.34319 |
| 8.0 | 0.11389 | 1.44919 |
| 9.0 | 0.13986 | 1.51975 |
| 10.0 | 0.16671 | 1.54964 |
| 11.0 | 0.19370 | 1.53335 |
| 12.0 | 0.21995 | 1.46520 |
| 13.0 | 0.24452 | 1.33937 |
| 14.0 | 0.26634 | 1.15017 |
| 15.0 | 0.28427 | 0.89223 |
| 16.0 | 0.29706 | 0.56071 |
| 17.0 | 0.30339 | 0.15156 |
| 18.0 | 0.30188 | −0.33848 |
| 19.0 | 0.29109 | −0.91200 |
| 20.0 | 0.26954 | −1.57146 |
| 21.0 | 0.23570 | −2.32022 |
| 22.0 | 0.18795 | −3.16418 |
| 23.0 | 0.12451 | −4.11420 |
| 24.0 | 0.04334 | −5.18921 |
| 25.0 | −0.05806 | −6.41991 |
| 26.0 | −0.18292 | −7.85275 |
| 27.0 | −0.33555 | −9.55326 |
| 28.0 | −0.52176 | −11.60725 |
| 29.0 | −0.74935 | −14.11762 |
| 30.0 | −1.02870 | −17.19285 |
| 31.0 | −1.37318 | −20.92311 |
| 32.0 | −1.79948 | −25.34194 |

TABLE 26

| h(mm) | Z(mm) | dZ/dh$^{(degree)}$ |
|---|---|---|
| S19 | | |
| 0.0 | 0.00000 | 0.00000 |
| 1.0 | −0.02860 | −3.26788 |
| 2.0 | −0.11381 | −6.44889 |
| 3.0 | −0.25380 | −9.44664 |
| 4.0 | −0.44508 | −12.14547 |
| 5.0 | −0.68181 | −14.39960 |
| 6.0 | −0.95487 | −16.01920 |

TABLE 26-continued

| h(mm) | Z(mm) | dZ/dh$^{(degree)}$ |
|---|---|---|
| 7.0 | −1.25054 | −16.74967 |
| 8.0 | −1.54896 | −16.23984 |
| 9.0 | −1.82236 | −13.99948 |
| 10.0 | −2.03353 | −9.37901 |
| 11.0 | −2.13568 | −1.72989 |
| S20 | | |
| 0.0 | 0.00000 | 0.00000 |
| 1.0 | −0.02471 | −2.82633 |
| 2.0 | −0.09850 | −5.59847 |
| 3.0 | −0.22024 | −8.25718 |
| 4.0 | −0.38786 | −10.73262 |
| 5.0 | −0.59792 | −12.93768 |
| 6.0 | −0.84516 | −14.75939 |
| 7.0 | −1.12166 | −16.04685 |
| 8.0 | −1.41583 | −16.59327 |
| 9.0 | −1.71113 | −16.10761 |
| 10.0 | −1.98439 | −14.17135 |
| 11.0 | −2.20396 | −10.18315 |
| 12.0 | −2.32754 | −3.34007 |
| 13.0 | −2.29990 | 7.14377 |

By using the above-described features and effects appropriately, a projection optical system can be provided that has a small depth, a small length above or below the screen and that can suitably correct an imaging performance and image distortion regardless of the projection image size and reduce a focus change in accordance with an environmental change. In addition, since the projection optical system employs only one reflecting surface, the manufacturing cost and the size of the projection optical system can be reduced.

Although the descriptions above contain many specifications, such as shapes and values of parts, these should not be construed as limiting the scope of the invention but as merely providing illustrations of some of the presently preferred embodiments of this invention.

It should be understood by those skilled in the art that various modifications, combinations, sub-combinations and alterations may occur depending on design requirements and other factors insofar as they are within the scope of the appended claims or the equivalents thereof.

What is claimed is:

1. A projection optical system for magnifying an image on a primary imaging plane on a reduction side onto a secondary imaging plane on a magnification side, comprising:
   a first optical system configured to form an intermediate image of the primary imaging plane, the first optical system including a first lens group having a negative refractive power, a second lens group having a positive refractive power, an aperture, and a third lens group having a positive refractive power in this order in a direction from the intermediate image towards the aperture; and
   a second optical system including a concave reflecting surface disposed between the intermediate image and the secondary imaging plane;
   wherein each of surfaces of the first optical system and the second optical system has rotational symmetry with respect to a light axis that is common to all of the surfaces, a light ray traveling from the center of the primary imaging plane to the center of the secondary imaging plane intersects the light axis, is reflected off the concave reflecting surface, intersects the light axis again, and reaches the secondary imaging plane, and wherein the following conditional expressions are satisfied:

$$0.5 < \phi1/\phi2 < 3 \quad (1)$$

$$1 < AST/ASS < 5 \quad (2)$$

$$|AST|/L12 < 1 \quad (3)$$

where
$\phi1$=refractive power of the first optical system,
$\phi2$=refractive power of the second optical system,
AST=position at which the intermediate image is formed in the tangential plane by the first optical system,
ASS=position at which the intermediate image is formed in the sagittal plane by the first optical system, and
L12=distance between the first optical system and the second optical system on the light axis,
and wherein all lenses included in the first optical system and having a positive refractive power satisfy the following conditional expression:

$$-3 < K\_rel \quad (4)$$

where
K_rel=temperature coefficient of the index of refraction.

2. The projection optical system according to claim 1, wherein at least one positive lens included in the third lens group satisfies the following conditional expression:

$$0.7 < \Delta P \quad (5)$$

and at least one negative lens included in the third group satisfies the following conditional expression:

$$\Delta P < -0.3 \quad (6)$$

where
$\Delta P = \{v - (-0.001917 \times P + 0.6568)\} \times 100$,
$v = (nd-1)/(nF-nC)$,
$P = (ng-nF)/(nF-nC)$,
ng=the index of refraction of the g-line having a wavelength of 435.83 nm,
nF=the index of refraction of the F-line having a wavelength of 486.13 nm,
nd=the index of refraction of the d-line having a wavelength of 587.56 nm, and
nC=the index of refraction of the C-line having a wavelength of 656.27 nm.

3. The projection optical system according to claim 2, wherein the first optical system includes at least one pair of cemented lenses and satisfies the following conditional expression:

$$|\Delta\alpha| < 45 \quad (7)$$

where
$\Delta\alpha$=a difference in coefficient of linear expansion between adjacent glass pieces having a contact surface therebetween.

4. The projection optical system according to claim 1, wherein an aspherical plastic lens is disposed in any one of the first lens group to the third lens group of the first optical system and the following conditional expressions are satisfied:

$$-0.3 < \phi\_p1/\phi1 < 0.05 \quad (8)$$

$$-35 < \beta < 35 \quad (9)$$

where
$\phi\_p1$=the refraction power of the aspherical plastic lens,
$\phi1$=the refraction power of the first optical system, and
$\beta$=a maximum angle of tangent of the curved surface of the aspherical plastic lens.

5. The projection optical system according to claim 1, wherein, when a projection screen size is changed, a distance between the second optical system and the secondary imaging plane is changed, and at least one of the lens groups of the first optical system or some of the lenses of the lens groups and the concave reflecting surface of the second optical system are moved along the light axis parallel to the light axis.

6. A projection image display apparatus comprising:
a light source;
modulating means for modulating light emitted from the light source on the basis of a video signal and outputting the modulated light; and
a projection optical system for magnifying an image on a primary imaging plane on a side of the modulating means onto a secondary imaging plane on a side of a screen;
wherein the projection optical system is the projection optical system according to any one of claims 1 to 5.

7. A projection image display apparatus comprising:
a light source;
a modulating unit configured to modulate light emitted from the light source on the basis of a video signal and output the modulated light; and
a projection optical system configured to magnify an image on a primary imaging plane on a side of the modulating unit onto a secondary imaging plane on a side of a screen;
wherein the projection optical system is the projection optical system according to any one of claims 1 to 5.

* * * * *